United States Patent [19]

Yamanaka et al.

[11] 4,143,370
[45] Mar. 6, 1979

[54] VEHICLE COLLISION ANTICIPATING METHOD AND DEVICE

[75] Inventors: Teruo Yamanaka, Seto; Takayuki Kato, Aichi; Osamu Ozeki, Nagoya; Kazuo Sato; Minoru Bito, both of Toyota, all of Japan

[73] Assignees: Toyota Kogyo Kabushiki Kaisha; Kabushiki Kaisha Toyota Chuo Kenkyusho, both of Japan

[21] Appl. No.: 809,878

[22] Filed: Jun. 24, 1977

Related U.S. Application Data

[63] Continuation of Ser. No. 524,651, Nov. 18, 1974, abandoned, which is a continuation-in-part of Ser. No. 311,909, Jan. 18, 1973, abandoned.

[30] Foreign Application Priority Data

May 20, 1972 [JP] Japan .................................. 47-50189

[51] Int. Cl.² .............................................. G01S 9/44
[52] U.S. Cl. ................................. 343/7 VM; 343/9; 343/112 CA
[58] Field of Search ................. 343/9, 7 VM, 112 CA

[56] References Cited

U.S. PATENT DOCUMENTS

| | | | |
|---|---|---|---|
| 3,095,566 | 6/1963 | Dethloff et al. | 343/112 CA |
| 3,208,064 | 9/1965 | Morrel | 343/7 ED X |
| 3,394,342 | 7/1968 | Walker | 343/5 PD |
| 3,512,155 | 5/1970 | Bloice | 343/7.7 |
| 3,611,385 | 10/1971 | McHenry | 343/112 CA |
| 3,757,325 | 9/1973 | Sato et al. | 343/9 X |
| 3,760,415 | 9/1973 | Holmstrom et al. | 343/112 CA X |

*Primary Examiner*—Malcolm F. Hubler
*Attorney, Agent, or Firm*—Blum, Moscovitz, Friedman & Kaplan

[57] ABSTRACT

An improvement of a vehicle collision anticipating method and device using transmitted and reflected frequency-modulated continuous waves is provided. A low frequency wave is produced by mixing a part of transmitted wave and a reflected wave from the object. The low frequency wave and a Doppler signal obtained from the low frequency wave are signal processed so as to generate signals. A predetermined distance range is obtained by multiplying a time which is determined by the distance between the vehicle and object and the velocity of said object with respect to the vehicle obtained from the Doppler signal, by a relative velocity of the object with respect to the vehicle. A collision of the object against the vehicle is anticipated by detecting the object entering the predetermined distance range in front of the vehicle.

60 Claims, 39 Drawing Figures

R IN METER

FIG. 8
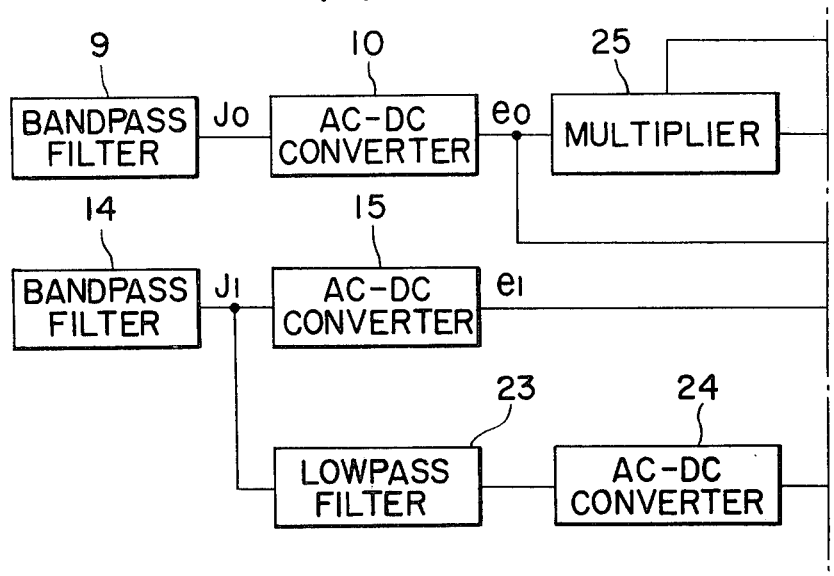
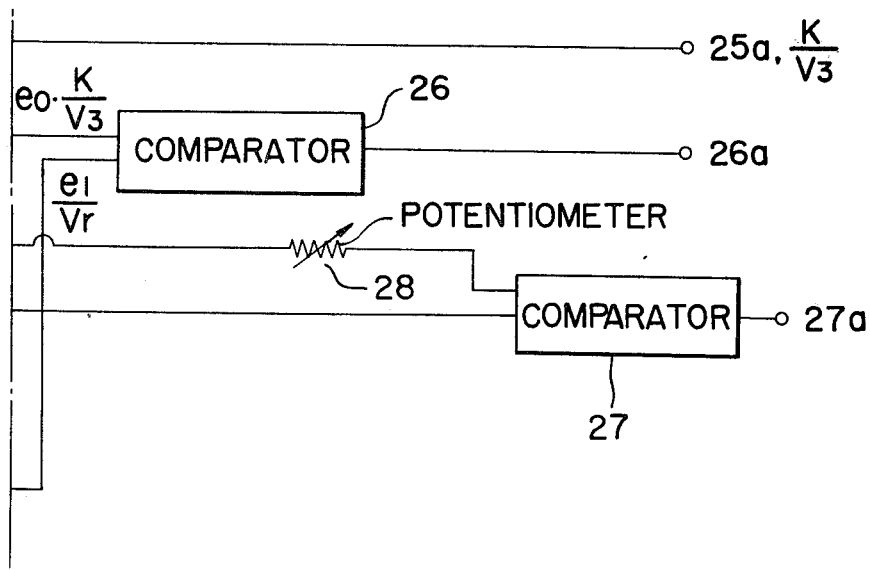

FIG. 10
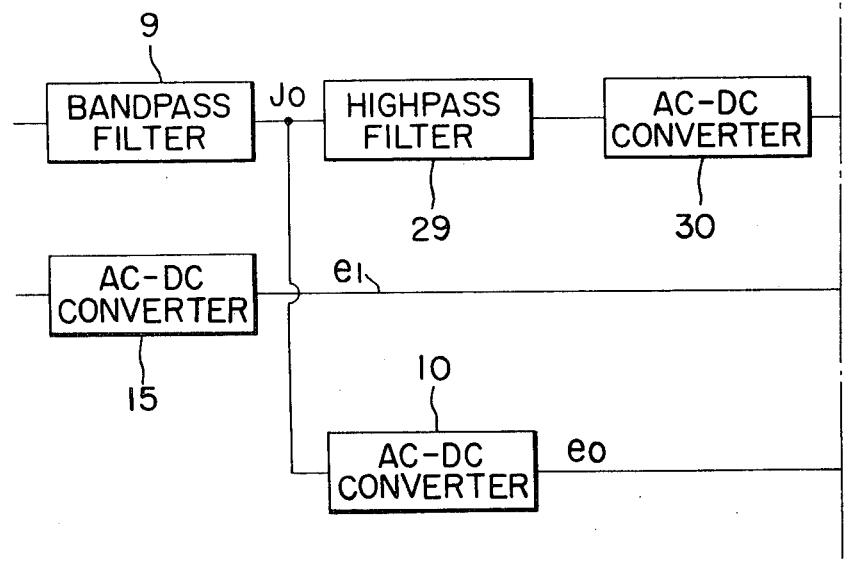
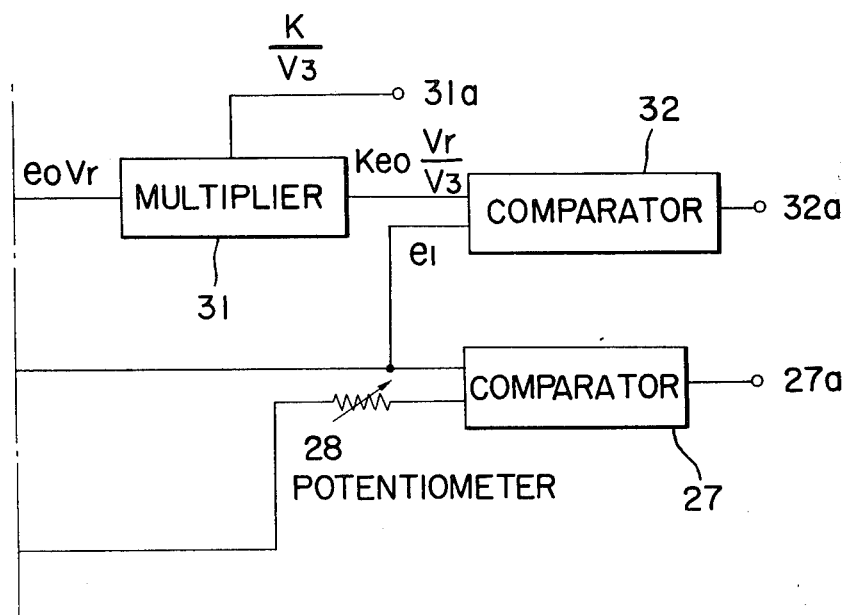

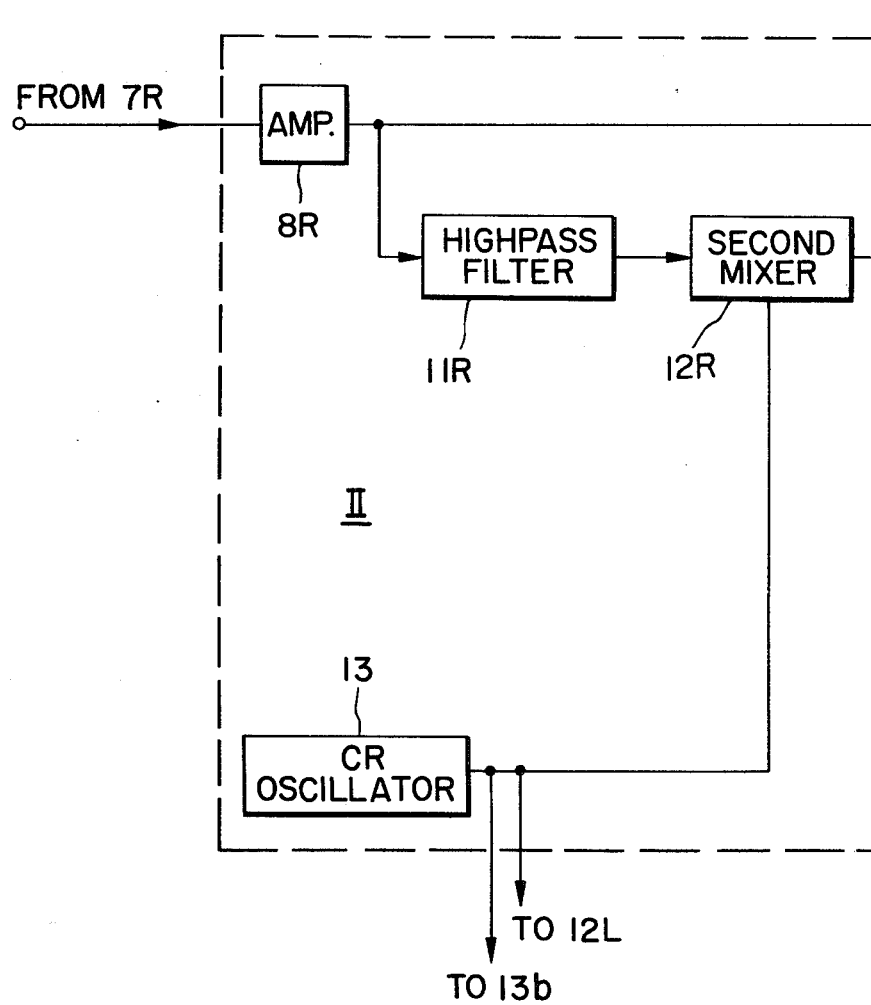

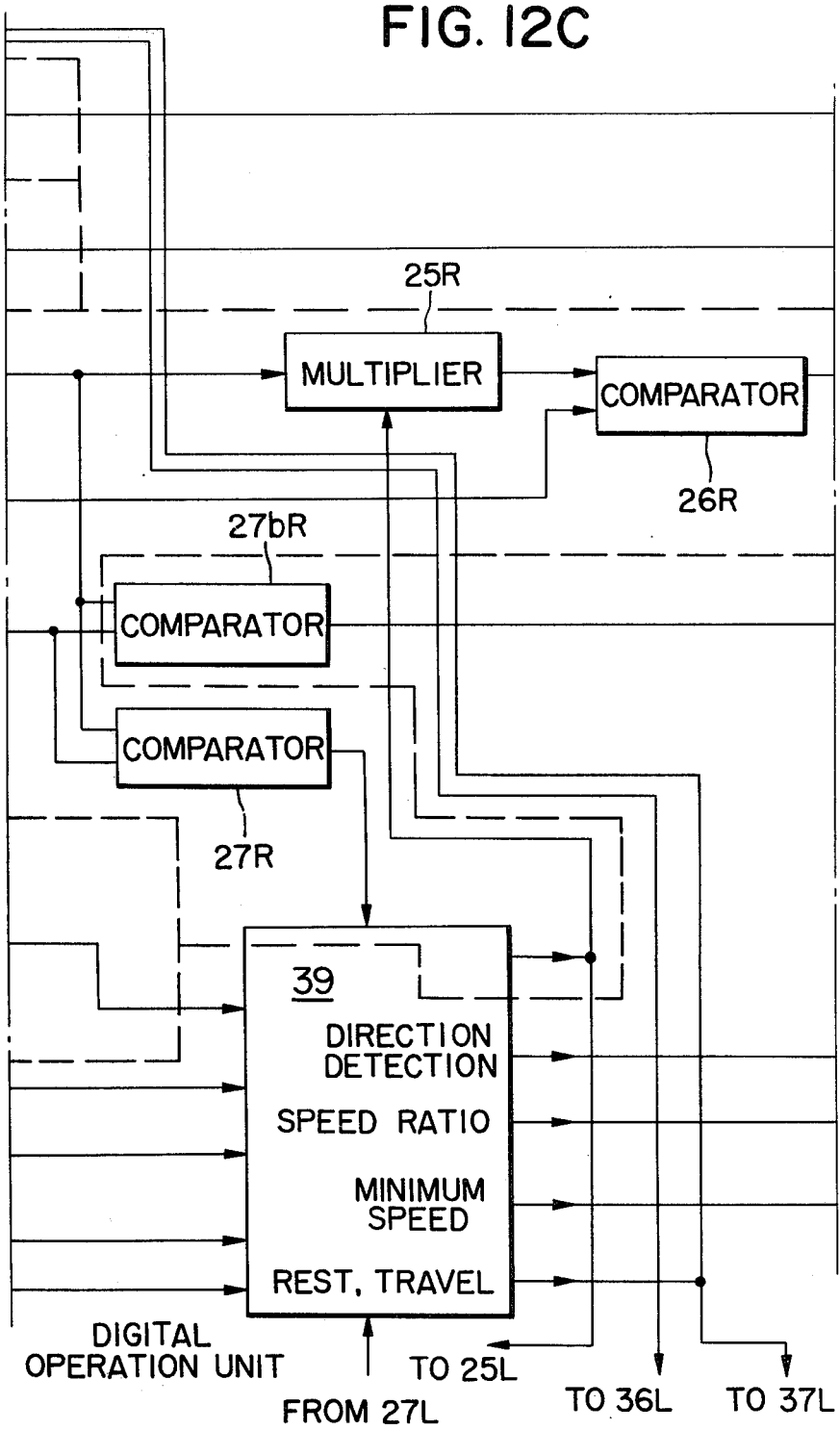

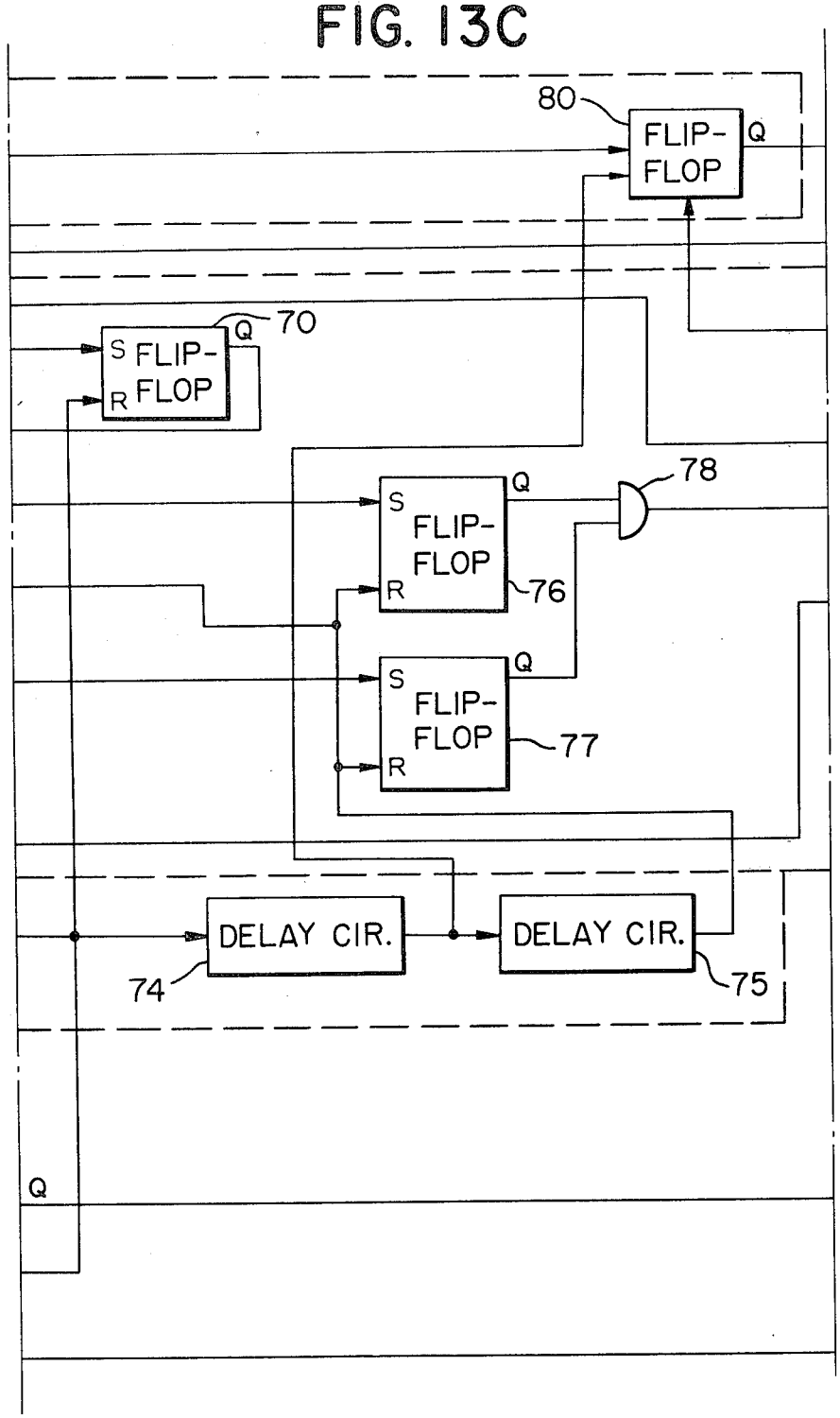

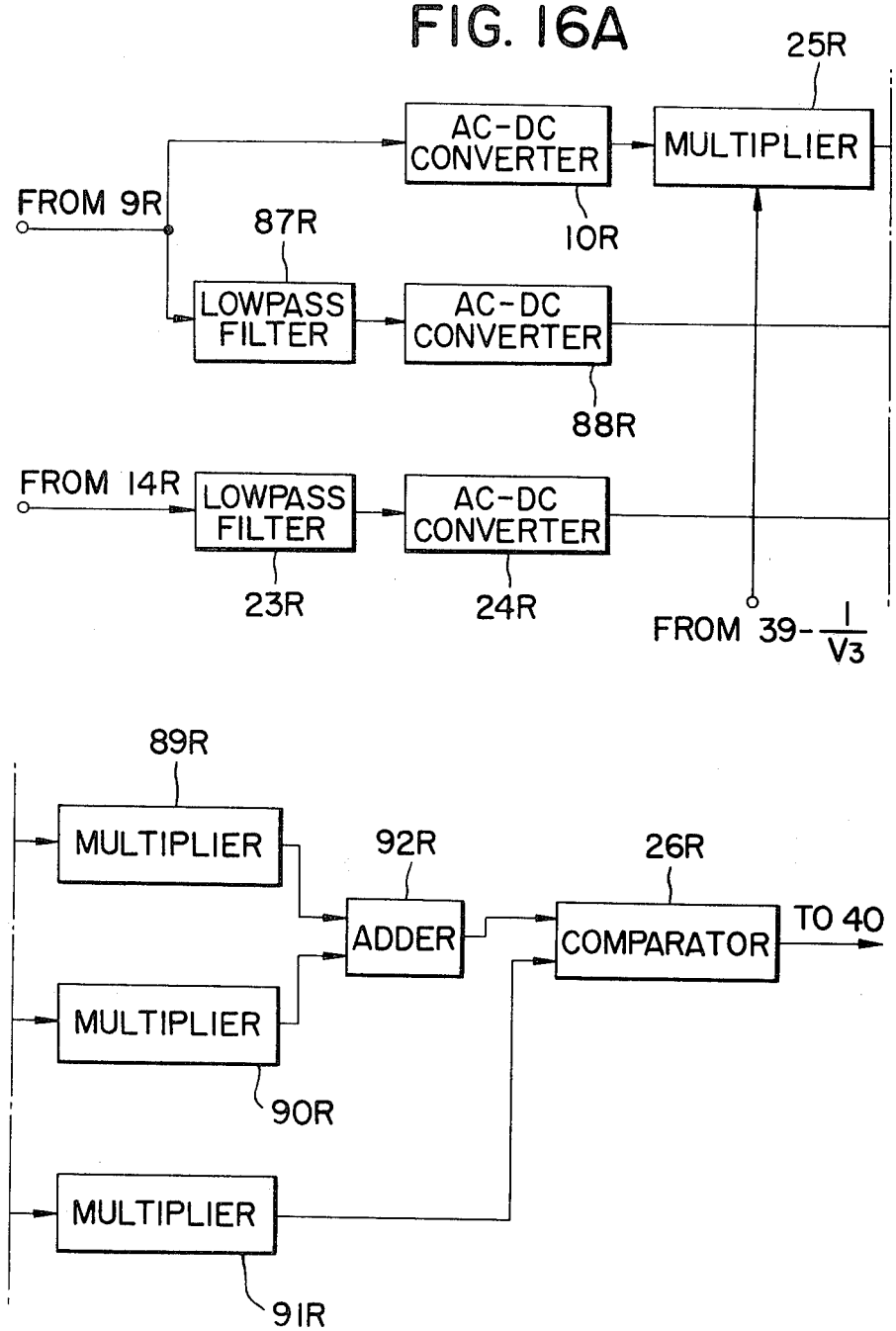

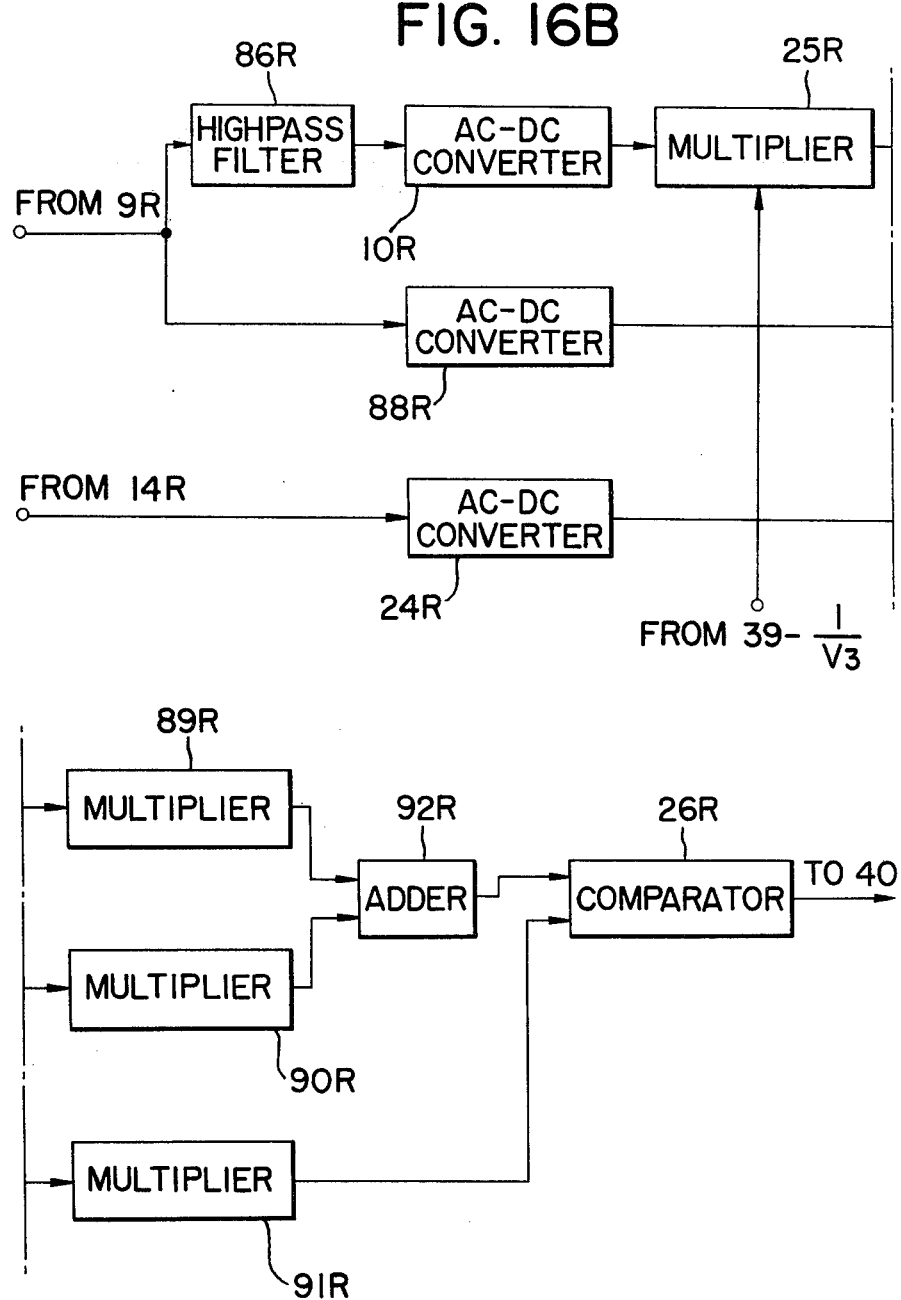

FIG. 19
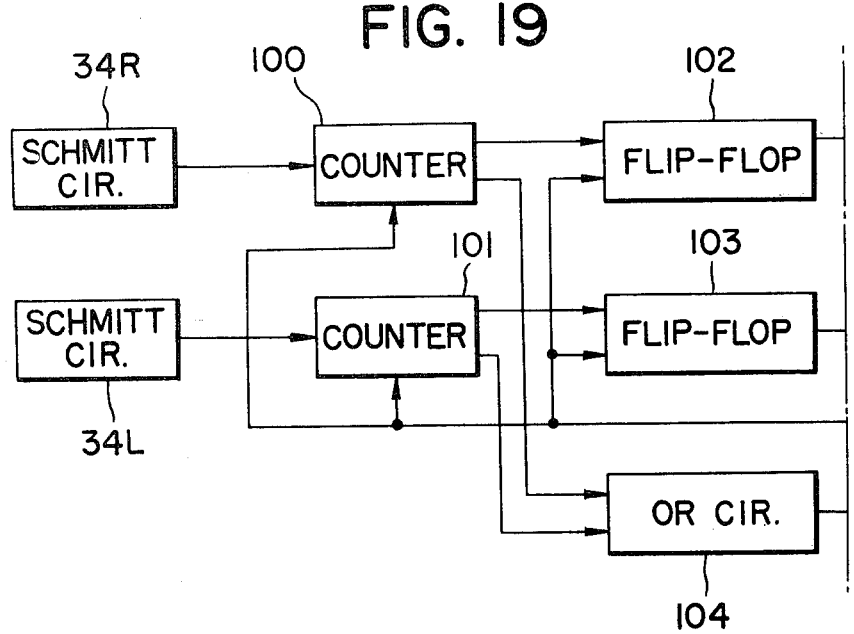
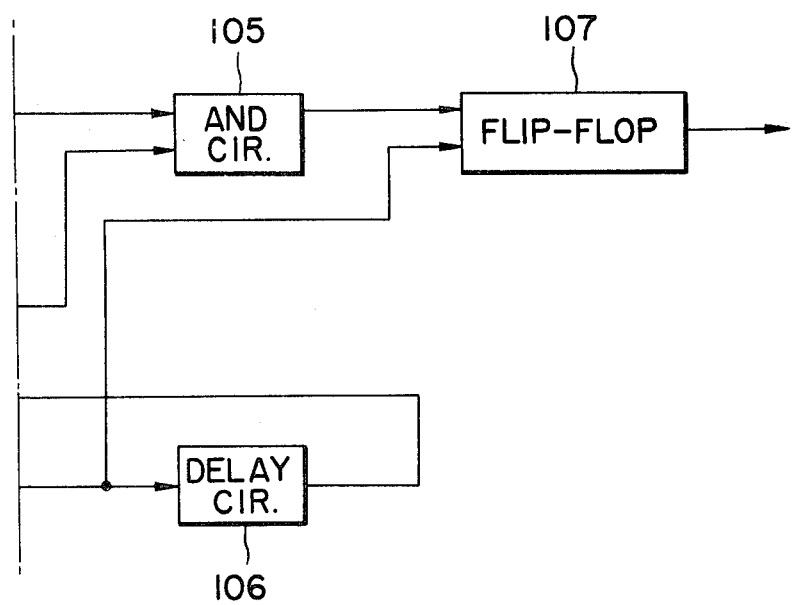

$\theta_0$ : THE DIRECTION OF THE VELOCITY $V/_o$ OF THE OBJECT, i.e. THE APPROACHING ANGLE OF THE OBJECT TO THE VEHICLE.

$\theta_1$ : THE DIRECTION OF THE RELATIVE VELOCITY.

$\theta$ : THE DIRECTION OF THE VELOCITY $V/_r$ DETECTED.

VEHICLE COLLISION ANTICIPATING METHOD AND DEVICE

This is a continuation, of application Ser. No. 524,651, filed Nov. 18, 1974, which is a continuation-in-part application of application Ser. No. 311,909, filed Jan. 18, 1973, now abandoned.

The present invention relates to generally a device for protecting a driver in case of collision hazard such as a passive restraint system, for example, a gas bag system which is actuated before the collision so as to surround the driver (to be referred to as "the safeguarding device" in this specification), thereby preventing him from directly hitting the body of a vehicle or the like by the inertia and being seriously injured, and more particularly a device for anticipating the collision of a vehicle which is capable of detecting or anticipating the collision hazard from a signal transmitted from the vehicle and received by the receiving antenna or antennas of the collision anticipating device in order to give a collision signal to actuate the safeguarding device at the optimum time.

In order to anticipate or detect the collision of a vehicle, it is necessary to measure the distance to a target or object from a vehicle with a high degree of accuracy. The conventional radar systems cannot measure the distance to an object at a very close range of one or two meters away from a vehicle with the required accuracy so that they cannot be used in the collision anticipating or detecting devices which must be extremely reliable and dependable in operation. For example, the frequency deviation of the FM-CW radar system must be in excess of 100 MHz in order to measure an object at a very close range so that there arise various difficult technical problems. If the frequency deviation is decreased, the system becomes extremely complex in construction because high accuracy techniques are required in order to avoid the fixed error. In the case of the pulse radar system, the rise time of the pulses must be less than a few nanoseconds so that there also arise various difficult technical problems. Furthermore, it is required for the collision anticipating device or detecting device to detect whether an object is closing to or receding away from a vehicle, but the devices used for this purpose are of the type detecting the closing or receding target from the difference of a signal in phase between two points thereof spaced apart by 90°, are complex in construction and very expensive to manufacture.

The present invention was made to overcome the above and other problems encountered in the prior art collision anticipating or detecting devices.

According to the present invention a predetermined distance range is set in front of a vehicle, the range being defined by multiplying a time which is determined by a distance between the vehicle and object and a velocity of said object with respect to the vehicle obtained from a Doppler signal, by a real relative velocity which is the magnitude of a relative vector velocity of said object with respect to the vehicle along the direction of the relative vector velocity i.e., independent of the approach angle between the object and vehicle, and said object entering said predetermined distance range is detected so that the collision signal is given only when the collision is unavoidable, thereby preventing the secondary collision in which a driver hits against the body of the vehicle or the like by inertia and is seriously injured. When the approaching angle of an object with respect to a vehicle is so great that the vehicle and the object pass each other in the opposite direction and no collision take place, the safeguarding device for protecting a driver will not be actuated. (In this specification the operation of the safeguarding device when it is not required to be actuated at all will be referred to as the "inadvertent operation" hereinafter). Moreover, the failure in operation of the safeguarding device so that it is not actuated when it must be actuated may be prevented. Thus, the present invention provides the method and device for anticipating the collision of a vehicle in a very reliable and dependable manner.

One of the objects of the present invention is therefore to provide a method and device of a simple construction for anticipating the collision of an object against a vehicle by detecting the object entering a predetermined distance range set in front of the vehicle which is obtained by multiplying a time which is determined by a distance between the vehicle and object and the velocity of said object with respect to the vehicle obtained from a Doppler signal, by the "real" relative velocity which is the magnitude of a relative vector velocity of said object with respect to the vehicle along the direction of the relative velocity vector (i.e., independent of approach angle) so that the inadvertent operation of the safeguarding device when the object is merely passing across the course of the vehicle can be prevented, the failure in operation of the safeguarding device when it must be actuated can be prevented, and the safeguarding device can be actuated at the optimum time when it must be actuated.

Another object of the present invention is therefore to provide a method and device of a simple construction for anticipating a collision of the object against the vehicle by detecting the object within the predetermined distance range set in front of the vehicle which is obtained by multiplying a time determined by a distance between the vehicle and object and a first velocity of said object with respect to the vehicle obtained from a Doppler signal, by a second velocity of the object which is detected at a predetermined distance from the vehicle from a Doppler signal as a real relative velocity which is the magnitude of a relative vector velocity of the object with respect to the vehicle along the direction of the relative vector velocity so that the inadvertent operation of the safeguarding device when the object is merely passing across the course of the vehicle can be prevented, the failure in operation of the safeguarding device when it must be actuated can be prevented, and the safeguarding device can be actuated at the optimum time only when it must be actuated.

Another object of the present invention is to provide a method and device for anticipating or detecting the collision of a vehicle with respect to the vehicle, so that when the vehicle is running at a slow speed or at rest and a driver will not be seriously injured even in case of collision, the inadvertent operation of the safeguarding device may be prevented.

Another object of the present invention is to provide a collision anticipating device which detects the ground speed of a vehicle carrying the collision anticipating device so that when the vehicle is running at a slow speed or at rest, the safeguarding device is actuated only when the relative velocity of an object is several times the relative velocity of the object when the vehicle is running, and that the inadvertent operation when an object is merely passing across the course of the vehicle or the vehicle is at rest at, for example, an intersection waiting for a green signal or the inadvertent operation just for fun may be prevented.

When the collision of a vehicle is unavoidable, the intensity of the signal reflected by an object at a very close distance from the vehicle is in excess of a predetermined level. Another object of the present invention is therefore to provide a highly reliable and dependable collision anticipating device which detects an object entering the right and left small sensitive ranges defined in front of the vehicle from the intensity of the signals reflected by the object in said sensitive ranges for giving the collision signal so as to actuate the safeguarding device at the optimum time.

Another object of the present invention is to provide a collision anticipating device which detects the approaching angle of an object with respect to a vehicle so that when the approaching angle is far away from the head-on collision angle the safeguarding device may be prevented from being actuated because it is not effective in case of such a collision and that the inadvertent operation of the safeguarding device when the vehicle and object pass each other may be prevented.

Another object of the present invention is to provide a collision anticipating device which detects whether an object is moving toward or away from a vehicle so that the inadvertent operation of the safeguarding device when the object is merely passing across the course of the vehicle, when the vehicle is passing past the object or when the object is moving away from the vehicle may be prevented.

Another object of the present invention is to provide a collision anticipating device which may detect an object entering a range defined by the transmitted and received beams so that the inadvertent operation of the safeguarding device due to the reflection factor and shape or dimension of an object or due to a defect of the radar system that the same intensity ratio signal gives two different distances to the same object may be prevented.

The above and other objects, features and advantages of the present invention will become more apparent from the following description of some preferred embodiments thereof taken in conjunction with the accompanying drawings wherein:

FIG. 8 is a block diagram of a variation of the first embodiment shown in FIG. 5;

FIG. 10 is a block diagram of another variation of the first embodiment shown in FIG. 5;

FIGS. 12A-12D show a block diagram of an 11th embodiment of the present invention;

FIGS. 13A-13D show block diagram of a digital arithmethic unit in the 11th embodiment shown in FIGS. 12A-12D;

Figure 18:
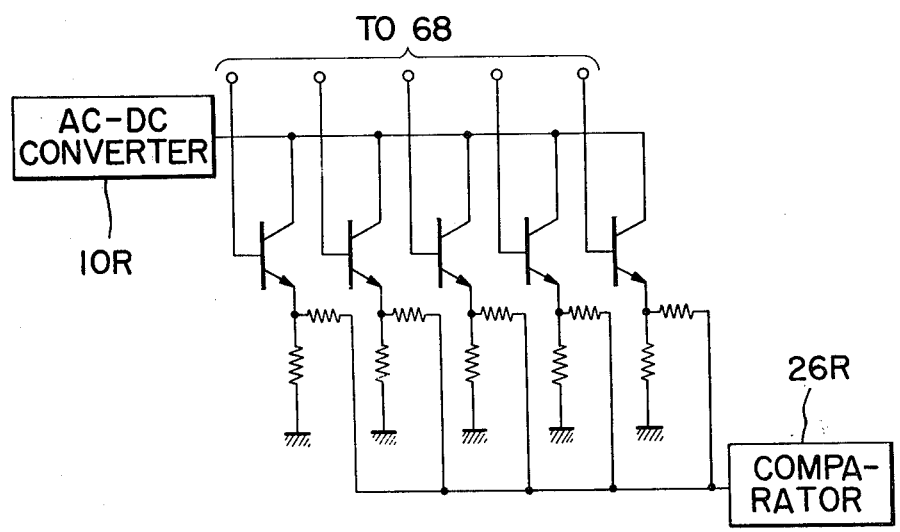
Figure 20:
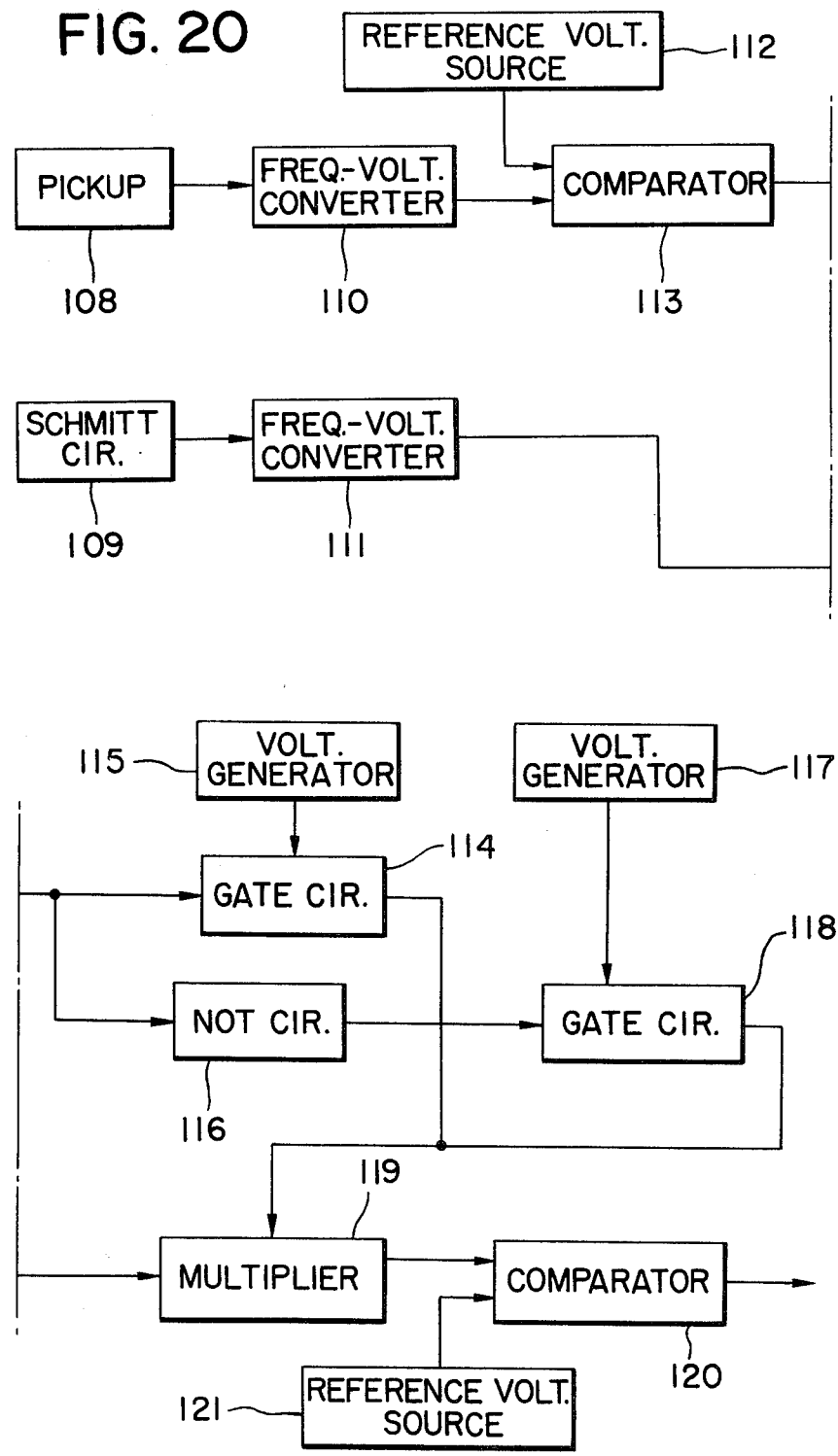
Figure 21:
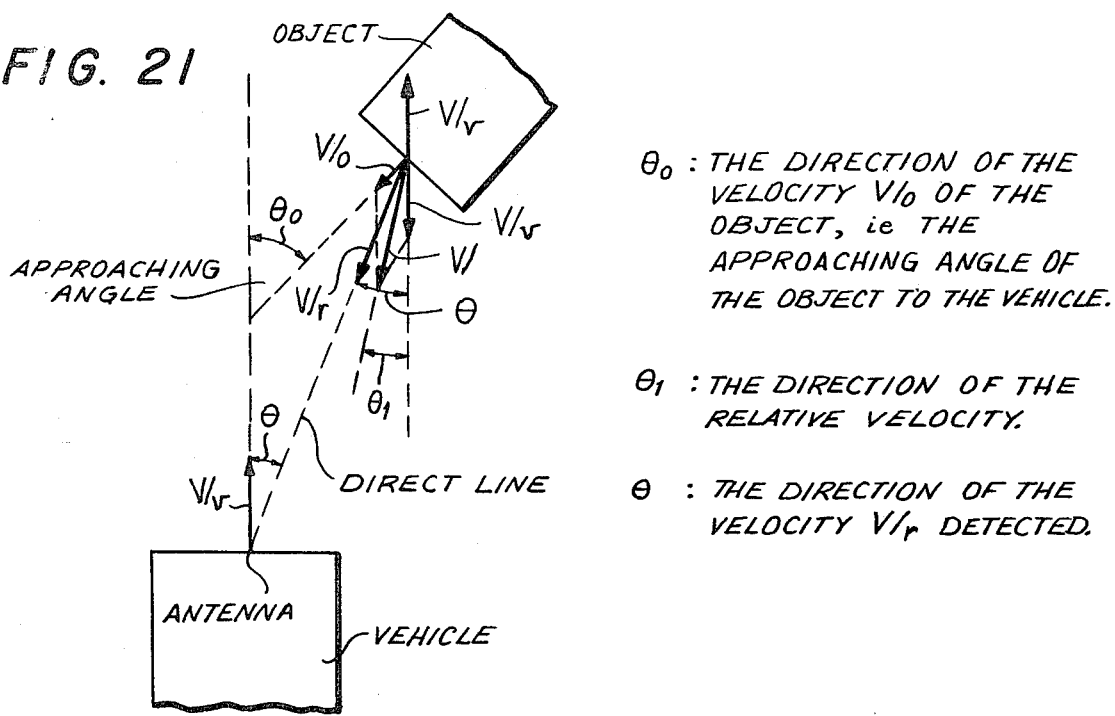
Figure 22:
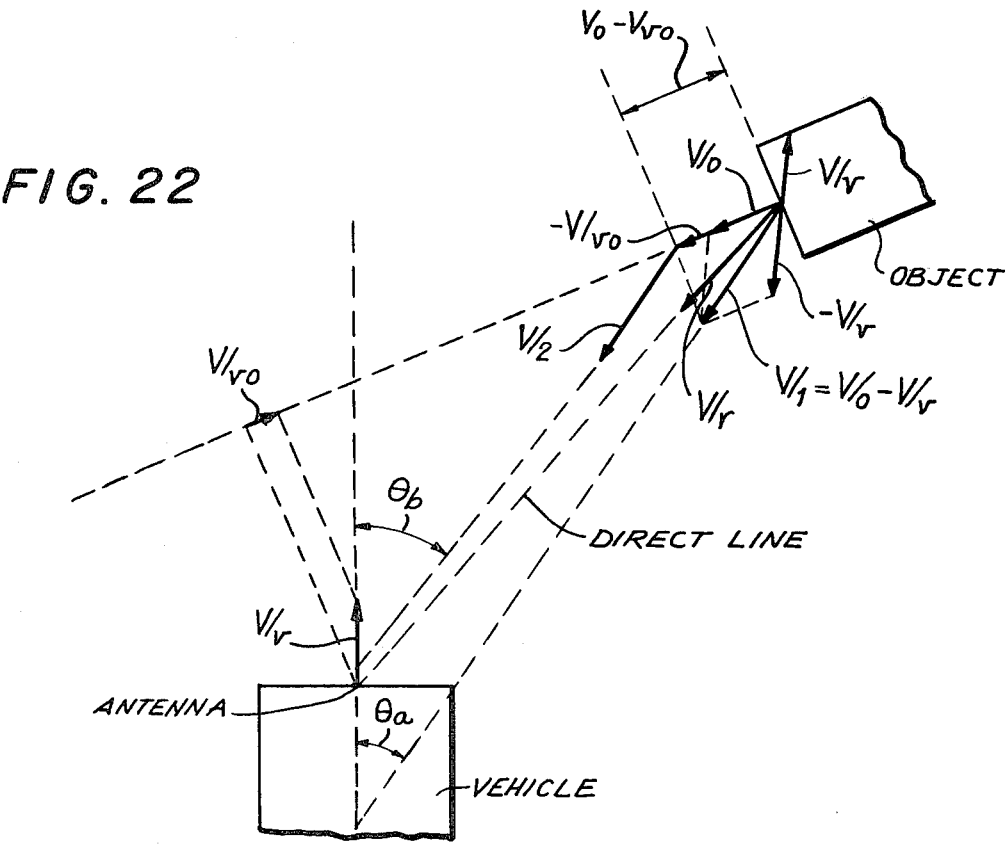

FIGS. 16-A and 16-B are block diagrams of two variations of a part of the 11th embodiment shown in FIGS. 12A-12D;

FIGS. 17A-17H show the block diagram of the preferred embodiments of the present invention;

FIG. 18 is a circuit diagram of a multiplier in the 11th embodiment shown in FIGS. 12A-12D;

FIG. 19 is a block diagram of an approaching angle detecting unit;

FIG. 20 is a block diagram of a ground speed detecting unit;

FIG. 21 is an illustration of one definition of the real relative velocity, as employed in this invention; and FIG. 22 is an illustration of another explanation of the real relative velocity, as employed in this invention.

The underlying principle of the present invention and the principle of the measurements of the distance to an object and the relative velocity of an object with respect to a vehicle will be described.

A wave which is frequency-modulated by a sine wave is transmitted toward an object, reflected by the object and received by a receiving antenna 10. The reflected wave is mixed with a portion of the transmitted wave or reference wave to obtain the low frequency wave or difference frequency signal given by:

$$e = r \cos\{\omega_c \Delta t + 2m_f \sin \frac{\omega_m \Delta t}{2} \cos(\omega_m t + \frac{\omega_m \Delta t}{2})\} \quad (1)$$

$$= r \cos\omega_c \Delta t \{J_0(m_r) + 2 \sum_{n=1}^{\infty}(-1)^n \cos 2n(\omega_m t + \frac{\omega_m \Delta t}{2})J_{2n}(m_r)\}$$

$$- r \sin\omega_c \Delta t [2 \sum_{n=0}^{\infty}(-1)^n \cos\{(2n+1)(\omega_m t + \frac{\omega_m \Delta t}{2})\}J_{2n+1}(m_r)]$$

were r = coefficient which is determined depending upon the reflection factor of an object, characteristics of a mixer and the like;

$\omega_c$ = angular frequency of the carrier;

$\Delta t$ = time interval between the time the wave is transmitted and the time the wave reflected back from the object is received;

$m_f = 2 f/\omega_m$, frequency modulation index;

$\omega_m$ = angular frequency of modulated wave;

$J_{2n}$ = Bessel function of order 2n of first kind;

$m_r = 2m_f \sin \omega_m \Delta t/2$ $\Delta t = 2R/C$

R = distance to an object;

C = velocity of radiation wave; and $\Delta f$ = frequency deviation.

The low frequency wave given by q. (1) consists of a Doppler signal component a fundamental wave component and harmonic components. When an object is moving at a relative velocity v with respect to a vehicle, the first and second terms $$rJ_0(m_r)\cos\omega_c\Delta t \text{ and } -2rJ_1(m_r)\cos(\omega_m t + \frac{\omega_m\Delta t}{2})\sin\omega_c\Delta t \text{ become}$$

$$rJ_0(m_r)\cos\omega_d t \text{ and } -2rJ_1(m_r)\cos(\omega_m t + \frac{\omega_m\Delta t}{2})\sin\omega_d t,$$

where $\omega_d = \frac{2v}{C}\omega_c$, the Doppler angular frequency.

The first term is a Doppler signal component and the Doppler signal component $-2rJ_1(m_r)\sin\omega_d t$ may be also obtained from the second term by demodulation. The ratio between the maximum intensities of the first and second terms is given by $$J_0(m_r)/2J_1(m_r)$$

and is a function of only $m_r$, that is, of the distance to an object.

This follows from the fact that $m_r$ is a function of $\Delta t$ which is proportional to R.

The embodiments of the present invention to be described hereinafter are based upon the above principle that the distance to an object may be measured from the ratio of the amplitudes between the components of the low frequency wave or the difference frequency signal given by Eq. (1).

Next the principle of the measurement of the relative velocity of an object with respect to a vehicle will be described. The Doppler angular frequency, $_d$ is proportional to the relative velocity v so that it is directly converted into voltage in an analog manner, thereby to obtain a voltage which is proportional to relative velocity. Thus the relative velocity may be measured in terms of the voltage.

Figure 1:
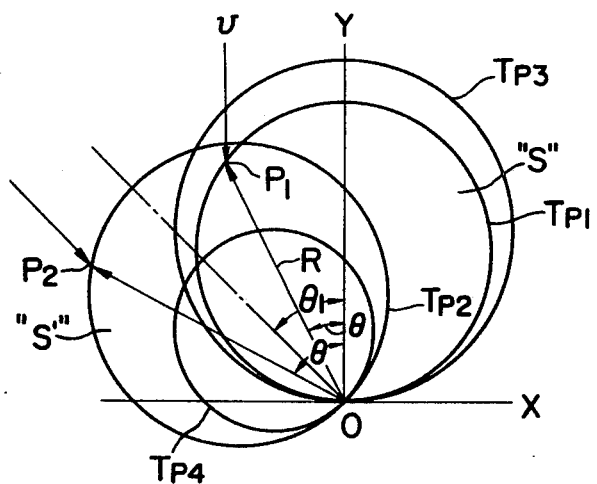
FIG. 1 shows a collision or margin time circle used for the explanation of the principle for setting a predetermined distance range or collision range in accordance with the invention.

Next will be described the principle of the collision anticipating or detecting method of the present invention. First, the time $R/v_r = C_1$ which is defined by a distance R between the object and the vehicle and the velocity $v_r$ of the object with respect to the vehicle when the object moves at a velocity $v_r$ at the distance R will be described. In the coordinate system shown in FIG. 1, it is assumed that the point of observation is located at the origin O and that the point P moves at a "real" relative velocity v (v: the magnitude of the relative velocity) and at a certain angle relative to a vehicle. The velocity $v_r$ observed at the point O when the point $P_1$ moves in the direction in parallel with the Y-axis is given by $$V_r = v \cos\theta \quad (5)$$

The velocity $v_r$ is the relative velocity between the object and the vehicle along the direct straight line between the object and the vehicle, and is hence the relative velocity that is normally obtained from a Doppler signal. This velocity $v_r$ is hence dependent upon the approach angle between the object and the vehicle, i.e., the velocity changes with changes in approach angle, such as occur when the object approaches closely to the vehicle. This velocity $v_r$ will hence be referred to as the "observed", "direct line" or "approach angle dependent" relative velocity or as the "apparent velocity" in the real following disclosure. The relative velocity v will be discussed in greater detail in the following paragraphs.

The locus of the point $P_1$ obtained from the relation $R/v_r = C_1$ (where $C_1$ is an arbitrary constant) is a circle $T_{p1}$ whose center is located on the Y-axis and which passes through the origin O (the circle $T_p$ will be referred to as the "collision or margin time circle" and the region defined by the circle $T_{p1}$ with $R = v \cos\theta C_1$ will be referred to as the "range S" in this specification). When an object is approaching at a real relative velocity v at an approaching angle $\theta_1$, (i.e., along the direction of the relative vector velocity) the locus of the point $P_2$ which satisfies the relation $R/v_r = C_1$ is a circle $T_{p2}$ shown by $R = v \cos(\theta - \theta_1)$ which passes through the origin O and whose center is located on the line passing through the origin O in parallel with the direction of the movement of the point $P_2$. The range "S" is observed at the origin O as if it were directed toward the moving point P. The radius of the circle $T_p$ in which $R/v_r$ is constant is different depending upon the real relative velocity of an object. That is, the higher the real relative velocity v, the larger the circle $T_p$ (as shown at $T_{p3}$), and the lower the real relative velocity v, the smaller the circle $T_p$ (as shown at $T_{p4}$). Therefore when an object is moving at a relatively low real relative velocity toward the left or right front end portion of a vehicle, it frequently happens that the object will not pass through the range "S" so that the collision anticipating device is "insensitive". As a result the safeguarding device will not be actuated at all. In view of the above the inventors conducted extensive studies and experiments and succeeded in overcoming the above defect. That is, in the method of the type in which the collision or margin time is constant, the collision or margin time circle $T_p$ is proportional to the velocity $v_r$ of an object with respect to a vehicle as shown by $R = v_r C_1$. Therefore the inventors decided to define the range in front of a vehicle by maintaining constant at a predetermined value the product of the collision or margin time ($R/v_r$) multiplied by the "real" relative velocity v of an object with respect to the vehicle. This product is independent of the apparent velocity $v_r$ of the object, so that the object entering this range and the ensuing collision may be detected, with an extremely high accuracy.

The velocity $v_r$ and the real relative velocity v to be employed in the present invention will be further explained by way of FIG. 21. In FIG. 21, the vector V/$_v$ corresponds to the velocity of the vehicle. The vector V/$_O$ corresponds to the velocity of the object. The relative velocity vector V/ of the object with respect to the vehicle is determined by the directions and magnitudes of the velocities V/$_O$ and −V/$_v$ of the object and the vehicle. The relative velocity V/ is detected by the antenna of the radar system and/or other equipment of the vehicle as the velocity V/$_r$. The magnitude $v_r$ of the velocity V/$_r$ is represented by $v_r = v \cos(\theta - \theta_1)$. (v is the magnitude of the relative velocity V/). We employ the magnitude v of the relative velocity V/ (vector) as the real relative velocity. Namely, the real relative velocity v is obtained by detecting the relative velocity V/ along the direction of this vector velocity. We employ the magnitude of the relative velocity in the operation (calculation) of the present invention to set a predetermined distance range in front of the vehicle as the "real" relative velocity.

In the principle of the present invention, it is necessary to detect the magnitude v of the relative velocity V/ as the real relative velocity. Then, the margin time $R/v_r$ defined by the distance to the object and the velocity $v_r$ of the object to the vehicle detected is multiplied by the real relative velocity v, thereby to set a predetermined and characteristic distance range in front of the vehicle.

Furthermore, this "real" relative velocity v which is the magnitude of the relative velocity V/ may be defined as follows. As described above, the magnitude $v_r$ of the vector velocity V/r detected by the antenna of the radar system of the vehicle is dependent on the approach angle of the object to the vehicle ($v_r = v \cos \theta$). The angle $\theta$ is decided by the approach angle of the object to the vehicle.

The "real" relative velocity v which is the magnitude of the relative velocity V/ between the vehicle and object is independent of the approach angle of the object to the vehicle. Namely, the "real" relative velocity may be defined by the expression of "velocity being independent of the approach angle of the object to the vehicle."

Accordingly, we employ the expression of the magnitude of the relative velocity V/ or the velocity being independent of the approach angle of the object to the vehicle as the "real" relative velocity.

That the product of the collision or margin time $R/v_r$ multiplied by the real relative velocity v which is the magnitude of the relative vector velocity along the direction of the relative vector velocity is constant is shown by $$R/v_1 v = C_2 \qquad (6)$$

where $C_2$ is a constant. Substituting Eq. (5) into Eq. (6), and eliminating the real relative velocity v, we have $$R = C_2 \cos \theta \qquad (7)$$

Figure 4:
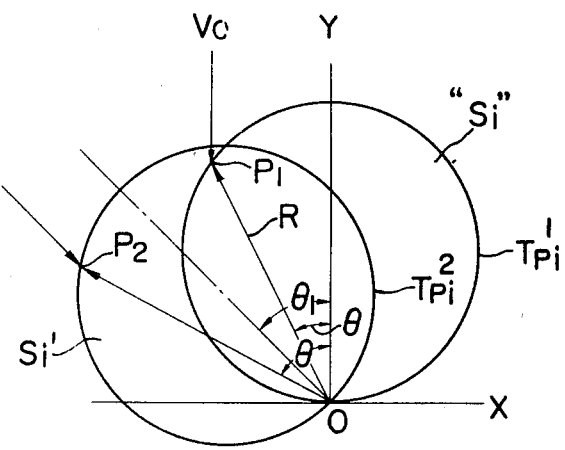
FIG. 4 is a view used for the explanation of the predetermined distance range which may be fixed in space.

As is clear from Eq. (7), the locus of the point P is a circle $T^1_{pi}$ which passes through the origin O and has its center on the Y-axis as shown in FIG. 4. The range defined by the circle $T^1_{pi}$ is denoted by "$S_i$", and is dependent upon the constant $C_2$ irrespective of the velocity. The constant $C_2$ in turn depends upon the width of a vehicle carrying the collision anticipating device, the accuracy with which the collision anticipating device is made, and the like. The collision or margin time circle $T^2_{pi}$ and the range "$S^1_i$" is given by $R = C_2 \cos(\theta - \theta_1)$ and is observed at the origin O as if the collision or margin time circle were directed toward the moving point P. For the sake of convenience, the above described principle has been explained by use of a monostatic radar system, but a bistatic radar system may be employed in the same manner.

As described above, according to the embodiments of the present invention the velocity is detected only in terms of $v \cos \theta$. Therefore the range to be defined in front of the vehicle is obtained by the collision or margin time $R/v_r$ weighted by the velocity $v_r$ of an object with respect to a vehicle at a predetermined distance away from the vehicle this detected value of the apparent velocity $v_r$ representing one approximation of the real relative velocity.

As aforenoted, the "real" relative velocity v of the object with respect to the vehicle is that velocity $v_r$ which is independent of the approach angle. As an example, when the object is quite distant from the vehicle, and assuming no changes in the absolute directions of movement of either the vehicle or the object occur, then it is apparent that, even though changes in approach angles may occur, there is substantially no change in the velocity $v_r$. For this reason, the velocity $v_r$ may hereinafter be considered to be the "real" relative velocity between the object and the vehicle, as well as the real relative velocity between the object and the vehicle that is independent of the approach angle therebetween. In some instances, the real relative velocity v may be considered to be the maximum velocity v ($\theta = 0$, $\cos \theta = 1$) between the object and the vehicle, since the "observed" or apparent velocity $v_r$ ($v_r = v \cos \theta$) will be less than the "real" relative velocity at distances of the object close to the vehicle, as is apparent in FIG. 1. Further, as will be discussed in the following paragraphs, the "real" relative velocity will be substantially equal to the "direct line" velocity $v_r$ obtained from a Doppler signal at distances from the vehicle greater than about 2 or 3 times the width of the vehicle, and hence the real relative velocity may be approximately determined in some embodiments of the invention from the Doppler signal when the distance between the object and the vehicle exceeds a predetermined distance. Here, the direct line shows the direction of the velocity V/r which is obtained by detecting the relative velocity V/ by the antenna of the radar system.

The latter explanation of the real relative velocity can more readily be seen from FIG. 22, which illustrates the motions of the vehicle and object on an absolute reference. Vector V/o represents the absolute velocity of the object, and vector V/v represents the velocity of the vehicle. The vector V/vo is the projection of the vehicle velocity V/v in the direction of the vector V/o and hence the relative velocity V/₁ may be divided into the velocity V/o-V/vo in the direction of the absolute object motion vector V/o. In the illustration in FIG. 22, the lengths of the illustrated vectors represent the movement of the object and the vehicle in a given time.

Figure 2:
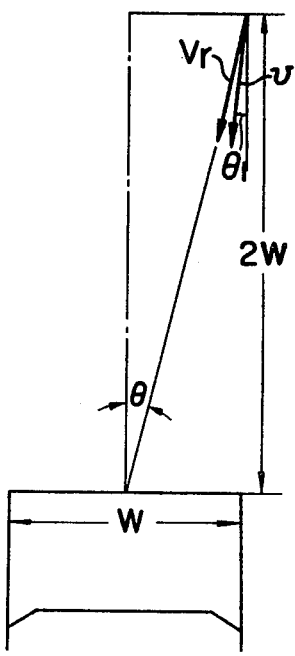
FIG. 2 is a view used for the explanation of the principle of the present invention for measuring the velocity of an object at a distance 2W away from the transmitting and receiving antennas installed at the center of the front of a vehicle.

FIG. 22 also illustrates the observed relative velocity V/₁ at the beginning of the represented time period, and the vector V/₂ at the end of the represented time. It is to be noted that these observed relative velocities have different magnitudes, and different approach angles $\theta_a$ and $\theta_b$ respectively. For example when an object is observed to be moving toward a vehicle as shown in FIG. 2 at an approach angle $\theta_1$, and at a real relative velocity v, the velocity $v_r$ at a distance 2W away from the vehicle having a width W is given by $$v_r = v \cos(\theta - \theta_1) = v \frac{2W}{\sqrt{(\frac{W}{2})^2 + (2W)^2}} \approx v. \qquad (8)$$

It is seen from this that even when the velocity $v_r$ detected at the distance 2W away from the vehicle is approximated to the relative velocity v, the error is very small and negligible. The velocity $v_r$ of an object with respect to a vehicle at a predetermined distance 2W or 3W will be referred to as "the velocity $v_3$" in this specification. The range to be covered by the collision anticipating device mounted on a vehicle is a limited range in front of the vehicle slightly wider than the width thereof so that the velocity detected at a distance a few times the width of the vehicle may be regarded as the real relative velocity or the collision velocity. In this respect the inventors also made extensive studies and experiments and found out that even if the apparent velocity at a predetermined distance away from a vehicle is taken as the real relative velocity or the collision velocity and then when the relative velocity is varied because of the sudden deceleration or acceleration after said relative velocity has been detected, such variation will not adversely affect the operation of the collision anticipating device in accordance with the present invention.

In the above, the real relative velocity v of the object with respect to the vehicle is obtained by approximating it with the velocity $v_r$ at a predetermined distance from the vehicle. But, the real relative velocity v (the magnitude of the relative velocity $V/$) may also be obtained, for example, by detecting the existence of an object by the intensity of the reflected wave from the object, starting the detection of the velocity $v_r$ when the intensity reaches a predetermined level, and approximating the real relative velocity by the maximum velocity of the apparent velocity $v_r$ which changes with time. It is understood that other various methods for directly and approximately detecting the real relative velocity are possible based upon the principle of the present invention.

The collision anticipating method of the present invention comprises transmitting a wave toward an object and receiving the wave reflected by said object; processing the transmitted and reflected waves in order to define a predetermined distance range in front of a vehicle by determining the time which remains before said vehicle collides against said object said time being the distance to said object divided by the apparent velocity of said object with respect to said vehicle, and multiplying said time by the relative velocity which is the magnitude of the relative velocity (vector) of said object with respect to the vehicle; and detecting said object entering said range. According to the above defined method, the inadvertent operation of the safeguarding device can be prevented when an object is merely passing by a vehicle, and the failure of the safeguarding device to operate in case of collision can be also prevented. Thus, there may be provided a highly reliable collision anticipating method which may actuate a safeguarding device at the optimum time only in case of collision.

First Embodiment, FIGS. 5A–5D and 17A

Next the first embodiment of the collision anticipating device will be described in detail hereinafter with reference to FIGS. 5A–5D and 17A.

Figure 17A:
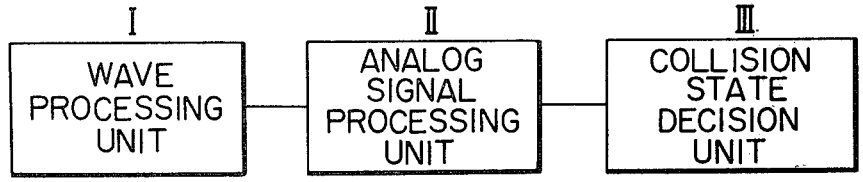

As shown in FIG. 17A, the first embodiment generally comprises a wave processing unit I, an analog signal processing unit II and a collision state decision circuit III.

Wave Processing Unit I

The wave processing unit I (FIGS. 5B and 5A) generally comprises an oscillator 1, a frequency modulator 2, a coupler 3, an isolator 5, a transmitting antenna 4, a receiving antenna 6 and a mixer 7.

The oscillator 1 generates a carrier of a frequency of 10.525 GHz, and the frequency modulator 2 which has the input terminal connected to the output terminal of the oscillator 1 frequency-modulates the carrier. The coupler 3 which has the input terminal connected to the output terminal of the frequency modulator 2 derives a portion of the transmitted wave to be mixed or homodyned with the reflected wave as will be described in more detail hereinafter. The isolator 5 interconnected between the coupler 3 and the transmitting antenna 4 serves to prevent the reflection of the transmitted signal. The transmitting antenna 4 which is connected through the isolator 5 to the coupler 3 transmits the frequency-modulated microwave whose carrier frequency is 10.525 GHz. The receiving antenna 6 receives the wave reflected by the object. In a instant embodiment, the bistatic radar system in which separate antennas are used for transmission and reception is employed. The transmitting and receiving antennas 4 and 6 are so positioned on a vehicle that the vertically directed beam transmitted by the transmitting antenna 4 may intersect the vertically directed beam received by the receiving antenna 6. When an object enters the range defined by the intersection of said beams, the intensity of the reflected wave is considerably increased. The first mixer 7 mixes or homodynes the reflected wave with a portion of the transmitted wave to give a low frequency wave or difference frequency signal to be referred to as the "received signal" hereinafter in this specification.

Analog Signal Processing Unit II

The analog signal processing unit II (FIGS. 5B and 5C) comprises an amplifier 8, a bandpass filter 9, an AC-DC converter 10, a highpass filter 11, a second mixer 12, an oscillator 13, a bandpass filter 14 and an AC-DC converter 15.

The amplifier 8 which has the input terminal connected to the output terminal of the first mixer 7 in the wave processing unit I amplifies the received signal. The bandpass filter 9 which has the input terminal connected to the output terminal of the amplifier 8 has a roll-off rate of −40db/dec. at the lower cut-off frequency of 300 Hz and a roll-off rate of −60db/dec. at the higher cut-off frequency of 5 KHz, so that the Doppler signal frequency $f_d$ in proportion to $rJ_0(m_r)$ of the received signal may be passed. The AC-DC converter 10 which has the input terminal connected to the output terminal of the bandpass filter 9 converts the output signal of the latter into a DC voltage $e_0$ in proportion to the amplitude $rJ_0(m_r)$.

The highpass filter 11 which has its input terminal connected to the output terminal of the amplifier 8 has a roll-off rate of −40db/dec. at the cut-off frequency of 15 KHz so that the signal obtained from the fundamental wave which has the angular frequency $=\omega_m$ and the amplitude $=2rJ_1(m_r)$ and which is frequency modulated by the Doppler angular frequency $\omega_d$ may be passed. The CR oscillator 13 oscillates at 60 KHz with a distortion less than 2.5%. The output terminal of the CR oscillator 13 is connected to the frequency modulator 2. The second mixer 12 has input terminals connected to the output terminals of the highpass filter 11 and of the oscillator 13, and is adapted to demodulate the output signal of the highpass filter 11 by the angular frequency $\omega_m$ of the fundamental wave to give the Doppler signal whose amplitude is proportional to $2rJ_1(m_r)$. The bandpass filter 14 which is similar in construction and function to the bandpass filter 9 and which has its input terminal connected to the output terminal of the mixer 12 is adapted to pass only the Doppler signal whose maximum is $2rJ_1(m_r)$. The AC-DC converter 15 which has the input terminal connected to the output terminal of the bandpass filter 14 converts the output signal of the bandpass filter 14 into the DC voltage $e_1$ in proportion to the amplitude of said signal. The output signals of the AC-DC converters 10 and 15 have the amplitudes in proportion to $rJ_0(m_r)$ and $2rJ_1(m_r)$ respectively and the ratio of the former to the latter is a function of distance to an object. Since the frequency deviation $\Delta f$ is constant, the relation between $e_1/e_0$ and the distance R is nearly linear as shown in solid line in FIG. 7.

Collision State Decision Unit III

The collision state decision unit III generally comprises a divider 16 (FIG. 5C), a frequency-voltage converter 18 (FIG. 5D), a divider 19, a comparator 16-1, a potentiometer 16-2, a frequency-voltage converter 19-1, a voltage hold circuit 19-2, a multiplier 19-3, a comparator 20 and a potentiometer 21.

The divider 16 has input terminals connected to the output terminals of the AC-DC converters 10 and 15, and gives $e_R = e_1/e_0$ which represents the distance R to an object. The frequency-voltage converter 18 has an input terminal 17 connected to the output terminal of the bandpass filter 9 or 14 and comprises a Schmitt circuit, a monostable multivibrator and a filter for giving a DC voltage $e_v$ in proportion to the frequency $f_d$ of the Doppler signal, that is, to the velocity $v_r$ or collision velocity of the vehicle. In the instant embodiment the output signals of the bandpass filters 9 and 14 are different in amplitude and in phase by 90° depending upon the distance to an object as described hereinbefore, but are equal in frequency so that either of the output signals of the bandpass filters 9 and 14 may be fed into the frequency-voltage converter 18.

The divider 19 has one input terminal connected to the output terminal of the divider 16 and the other input terminal to the output terminal of the frequency-voltage converter 18 and gives $e_R/e_v = e_T$ which represents the collision or margin time which is determined by the distance R to an object and the velocity $v_r$. The comparator 16-1 has one input terminal connected to the output terminal of the first divider 16 and the other input terminal connected to a reference voltage terminal 16-2a of the potentiometer 16-2 which functions to determine a reference voltage, and gives an output voltage when the signal $e_R$ representing the distance between an object and a vehicle reaches a predetermined level, that is, when the object is within a predetermined distance from the vehicle. The reference voltage terminal or the slider 16-2a of the potentiometer 16-2 may be displaced to vary the reference voltage depending upon a preset distance between the object and the vehicle, and in the instant embodiment such distance is set to be 2W where W = width of the vehicle.

The frequency-voltage converter 19-1 has the input terminal 19-1a connected to the output terminal of the bandpass filter 9 or 14, and is similar in construction and function to the frequency-voltage converter 18 so that it gives a DC output voltage which is proportional to the frequency $f_d$ of the Doppler signal, that is, to the apparent velocity $v_r$ of the object with respect to the vehicle. The voltage hold circuit 19-2 comprises a conventional sample hold circuit which has the input terminal connection to the output terminal of the frequency-voltage converter 19-1 and the control terminal 19-2a connected to the output terminal of the comparator 16-1 through a monostable multivibrator. When the output signal "1" of the comparator 16-1 is applied to the control terminal 19-2a of the voltage hold circuit 19-2, the latter holds the output voltage $Ke_{v3}$ of the frequency-voltage converter 19-1. There is no output from voltage hold circuit 19-2 until comparator 16-1 signals that R is equal to or smaller than the value preset by potentiometer 16-2.

The multiplier 19-3 has one input terminal connected to the output terminal of the divider 19 and the other input terminal connected to the output terminal of the voltage hold circuit 19-2, and gives $e_R/e_v \times Ke_{v3}$. The proportional constant K may be adjusted depending upon the gains of the voltage hold circuit 19-2 and the frequency-voltage converter 19-1, the setting of the potentiometer 21, the gain of the divider 19 and the like.

The potentiometer 21 serves to give a reference voltage with respect to the output signal $e_R/e_v \times Ke_{v3}$ of the multiplier 19-3. This reference voltage may be adjusted depending upon the width of the predetermined distance range formed in front of the vehicle, and in the instant embodiment it is so adjusted that the width of the range becomes substantially equal to the width of the vehicle. The comparator 20 has one input terminal connected to the output terminal of the multiplier 19-3 and the other input terminal connected to the reference voltage terminal or the slider 21a of the potentiometer 21, and gives an output signal when the output signal voltage $e_R/e_v \times Ke_{v3}$ of the multiplier 19-3 is higher than the reference voltage. That is, when the object enters the predetermined distance range, the safeguarding device may be actuated.

Figure 5A:
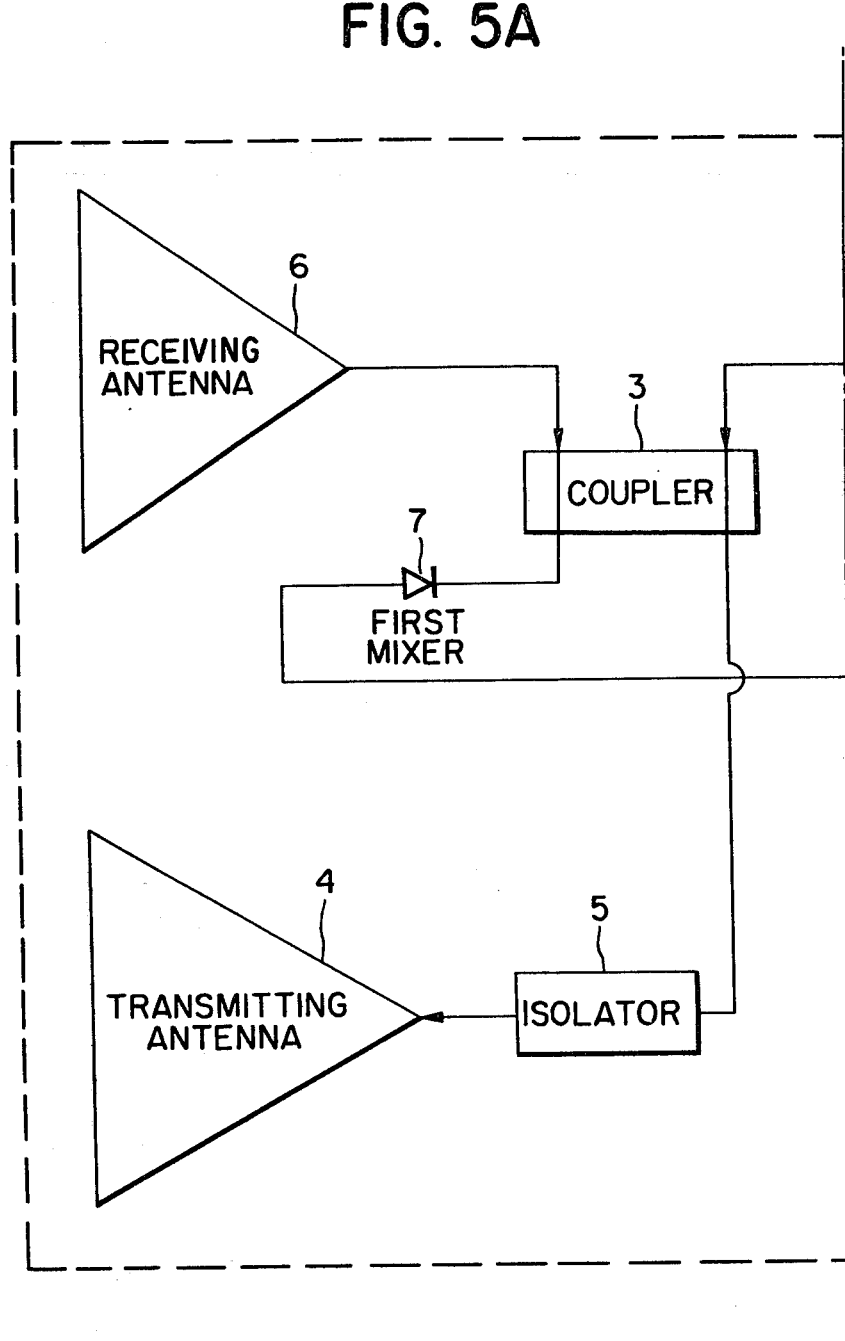
FIGS. 5A to 5D show block diagrams of a first embodiment of the present invention.
Figure 5B:
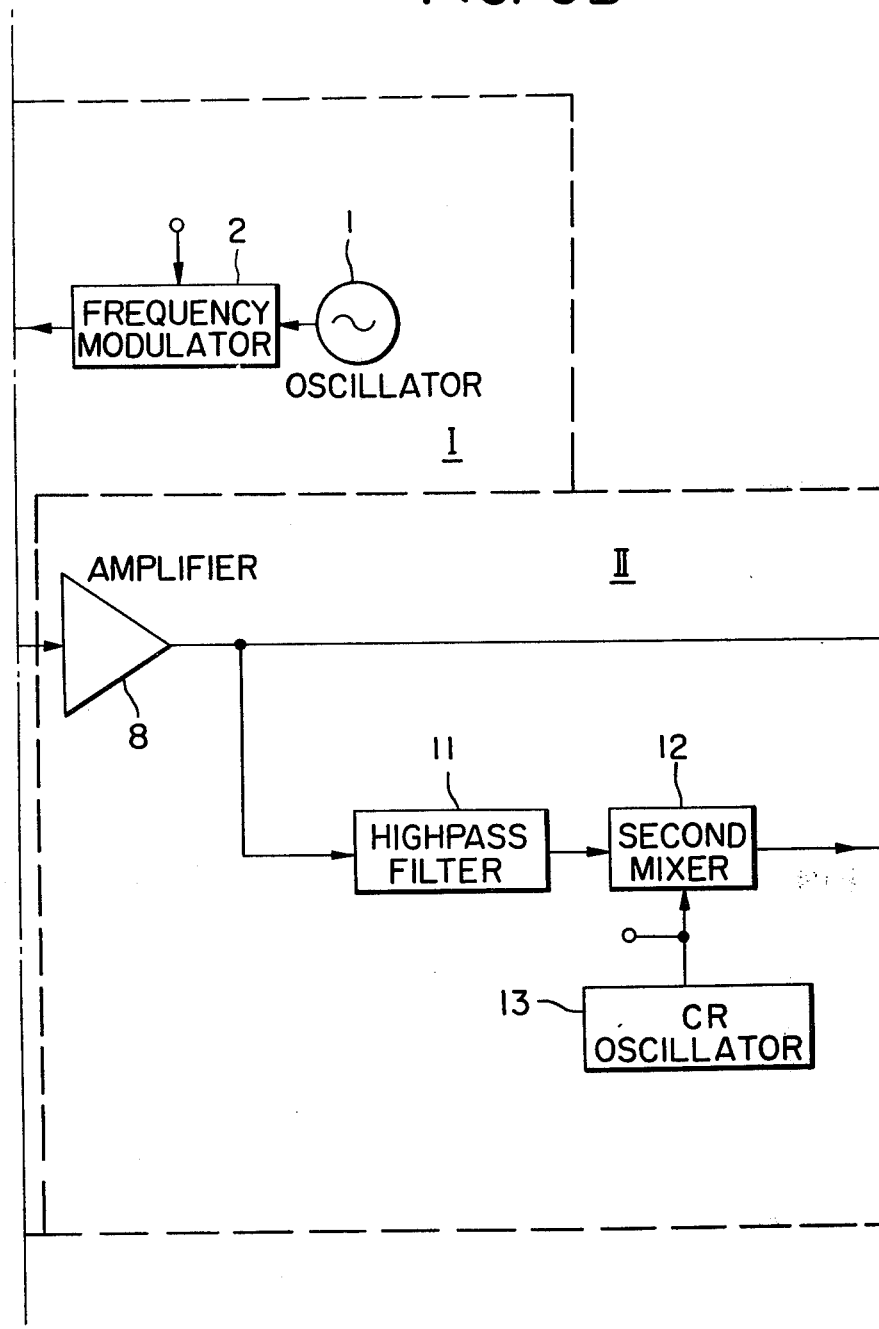
Figure 5C:
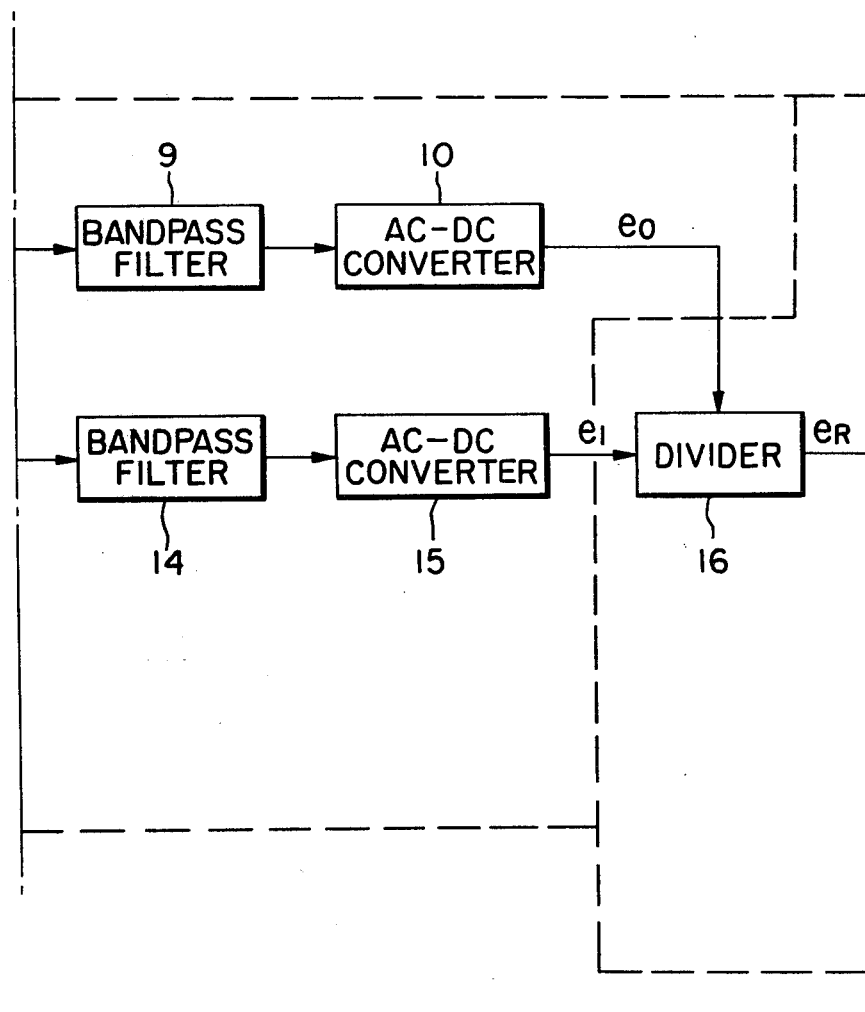
Figure 5D:
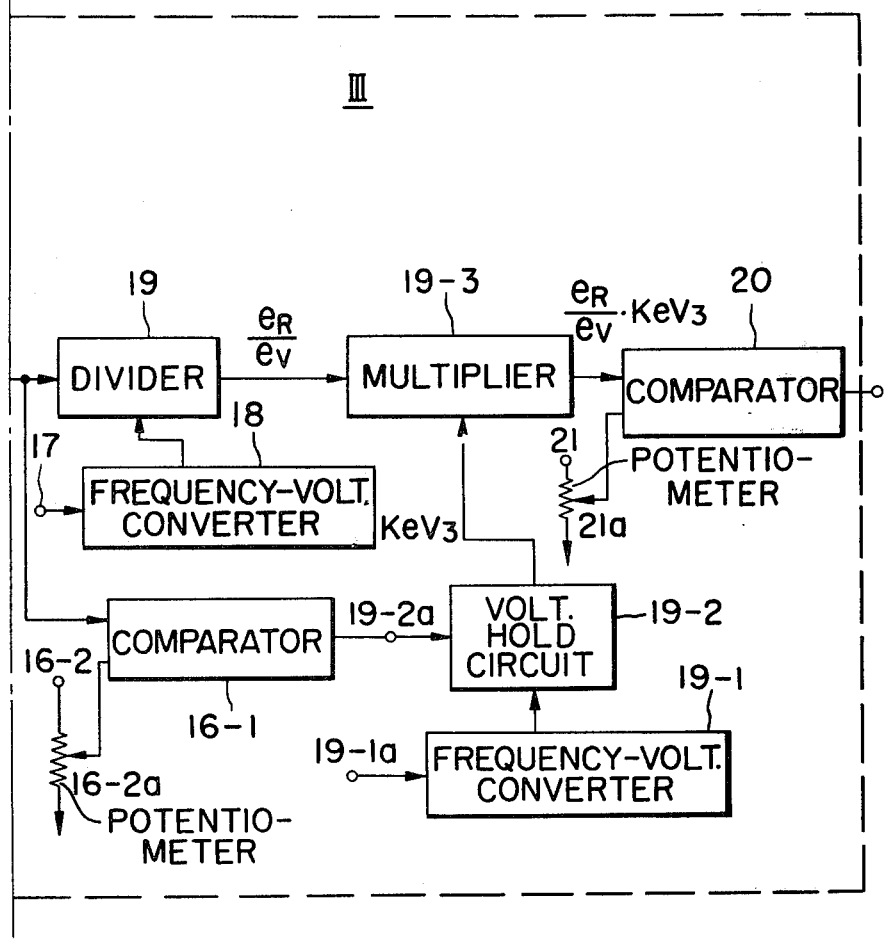
Figure 6:
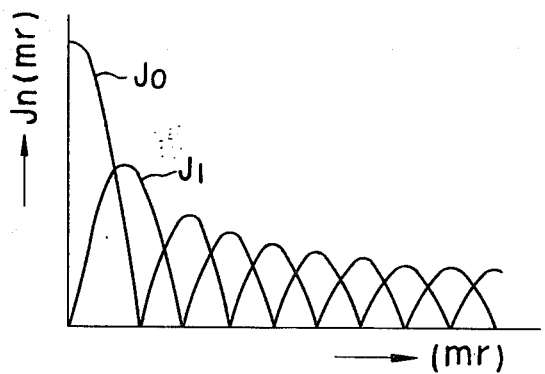
FIG. 6 is a plot of Bessel functions $J_n(m_r)$.

Next the predetermined distance range S defined by the collision anticipating device with the construction described hereinabove and mounted on a vehicle will be described with reference to FIG. 3. Two pairs of transmitting and receiving antennas of the bistatic radar system are installed at right and left points $O_R$ and $O_L$ on the forward end portion of the vehicle so that ranges are defined with respect to moving objects $MT_1$ and $MT_2$. More particularly, for the moving object $MT_1$ with the approaching angle $\theta = 0$, the ranges $S_R$ and $S_L$ are defined, and the predetermined distance range or the range $S_{RL}$ common to the right and left ranges $S_R$ and $S_L$ has a width equal to that of the vehicle in the instant embodiment. When the object $MT_1$ is approaching the vehicle, the distance R to the object $MT_1$ and the velocity $v_r$ of the object are obtained by the divider 16 and the frequency-voltage converter 18 in the collision state decision unit III (FIG. 17A), and then the collision or margin time T is obtained by the divider 19 (FIG. 5D). In the first embodiment, whether the product of the collision time T multiplied by the constant K and the velocity $v_3$ of the object $MT_1$ when the latter reaches the distance 2W away from the vehicle (where W = width of the vehicle) is in excess of a predetermined level $C_3$ or not is detected in order to define the ranges $S_R$ and $S_L$.

Figure 3:
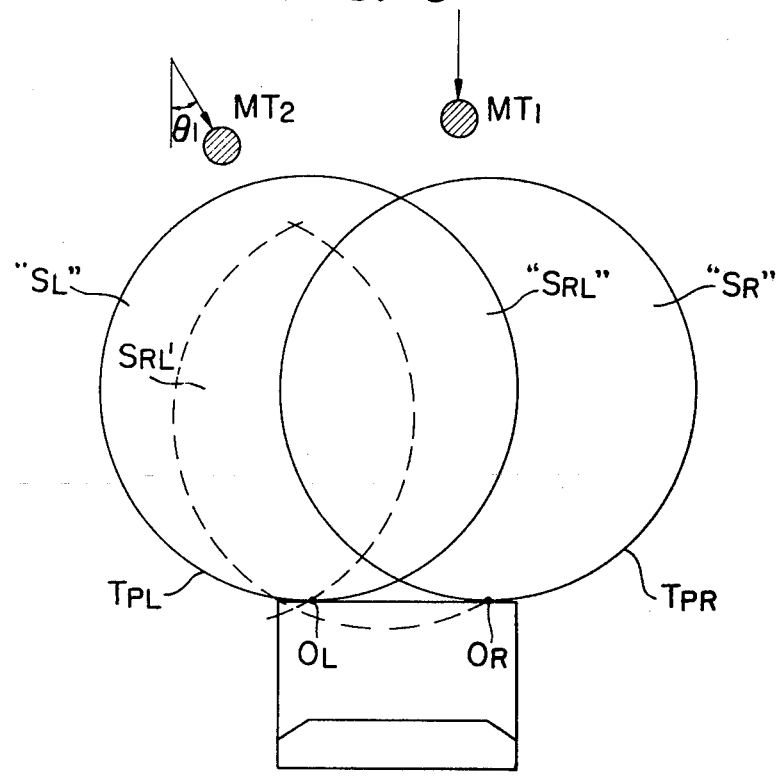
FIG. 3 shows the predetermined distance range $S_{RL}$ common to the ranges $S_R$ and $S_L$ defined by the transmitting and receiving antennas installed on the right and left front sides of a vehicle.

When the moving object $MT_2$ is approaching the vehicle with the approaching angle $\theta = \theta_1$, the common range $S_{RL}'$ is defined as indicated by the broken lines in FIG. 3. As a result, the chance of the object $MT_2$ passing through the common range $S_{RL}'$ when no collision is expected may be minimized so that the inadvertent operation of the safeguarding device may be prevented. The predetermined distance range S may be adjusted by varying the constant K and the constant $C_3$ which may be varied by adjusting the reference voltage obtained by the potentiometer 21, and in the instant embodiment the width of the range $S_{RL}$ is set to be equal to that of the vehicle as shown in FIG. 3.

In the first embodiment with the construction and function described above, a collision signal is given at a relatively long distance away from a vehicle when the object is approaching with an approaching angle almost equal to zero or when a head-on collision is expected, but as the approaching angle of the object becomes larger, it is given at a distance nearer the vehicle. Therefore, when the object collides with the vehicle at one side thereof so that the primary collision will not cause a secondary collision, the safeguarding device is actuated only when the object is immediately before the vehicle. When an object is merely passing across the course of the vehicle at such an angle that no collision is expected, the inadvertent operation of the safeguarding device may be prevented. In summary, in the first embodiment the possibility of a collision is measured depending upon the approaching position and angle and the distance of an object so that the safeguarding device may be actuated at the optimum time only when the actuation of the safeguarding device is required.

The inadvertent operation of the safeguarding device may be securely prevented when an object is merely passing across the course of a vehicle so that the collision will not take place or when the collision is sufficiently mild so that no secondary collision will follow. Thus, the reliability of the collision anticipating device in accordance with the present invention can be remarkably improved to an extent hitherto unattainable by the prior art devices.

The predetermined distance range defined by the first embodiment is not influenced by the relative velocity of an object with respect to a vehicle, and is always maintained constant so that even an object which approaches the right or left side of the vehicle at a low relative velocity can be detected with an extremely high degree of accuracy. Thus the problem of the prior art device that the safeguarding device is not actuated even when the collision of an object with a low relative velocity against a vehicle is unavoidable can be overcome completely. Thus, the highly reliable operation of the safeguarding device can be ensured so that a driver may be positively prevented from being seriously injured.

From the foregoing description it is seen that the first embodiment of the present invention may detect or anticipate the collision with an extremely high accuracy in a very reliable manner as compared with the prior art methods and devices in which only the distance to an object is detected, or the collision time is determined from the distance to an object and the relative velocity of an object with respect to a vehicle. It should be understood that even though a special radar system is employed in the first embodiment, the present invention is not limited to this system and that any other suitable radar system such as an AM, two-frequency or pulse-Doppler radar system may be employed, but the features, effects and advantages are substantially the same.

Also, the present invention is not limited to a bistatic radar system, and a monostatic radar system may be employed with the same features, effects and advantages.

It should be also noted that in the first embodiment the position of an object and the distance to the object are not always measured, but whether an object enters a predetermined distance range or not is detected to anticipate the collision with an extremely high accuracy. As a result the safeguarding device may be actuated at the optimum time when the collision is unavoidable, but the safeguarding device will not be actuated at all when a collision is avoided. Therefore the electronic circuits may be made simple in construction, highly reliable and dependable in operation and inexpensive to manufacture as compared with the prior art devices of the type which always measure the velocity of an object and detect the position of the object.

In the instant embodiment, the velocity of an object has been described as being $v_3$ at the distance 2W away from a vehicle, and from the foregoing description it is seen that the velocity $v_3$ measured at the distance 2W is almost equal to the relative velocity v of the object. In the foregoing description, the relative velocity v has been described as being constant, but no problem arises in practice from this assumption because when the relative velocity v is in excess of 25 Km/h at a distance three meters away from the vehicle and even if the brake is applied to exert the maximum retarding force or deceleration, the relative velocity may be reduced only by 3 Km/h at most.

In the first embodiment, the velocity $v_3$ which is fixed in the predetermined distance range may be measured by a circuit consisting of conventional circuit components used in conventional circuits. Therefore conventional circuit components may be used in the design of the circuit for measuring the velocity $v_3$, and no other specially designed circuit component is required. Thus the collision anticipating device may be manufactured at a low cost.

In the first embodiment, in order to measure the relative velocity v, the velocity $v_r$ of an object at a distance 2W away from the vehicle is detected as the velocity $v_3$. The velocity $v_r$ is taken as an approximation of the relative velocity v. However, it is understood that the present invention is not limited to the above described method, but any other suitable method for measuring the relative velocity v may be used. Moreover the velocity $v_r$ may be measured at a distance greater or less than the distance 2W.

So far the electronic circuits for the collision anticipating device in accordance with the present invention which define the predetermined distance range have been theoretically described, but it should be understood that various modifications and variations of the electronic circuits are possible based upon the above described theory of the present invention.

Second Embodiment, FIG. 8

Figure 9:
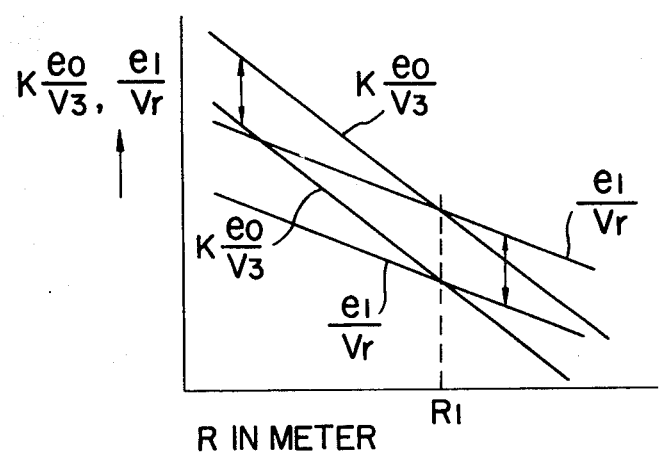
FIG. 9 is a graph used for the explanation of the mode of operation thereof.

Next referring to FIG. 8, a modification of the first embodiment will be described in which the dividers 16 and 19 and the multiplier 19-3 in the first embodiment are eliminated, but the same effects and functions may be attained. Reference numeral 23 denotes a lowpass filter having a roll-off rate of −20 db/dec. within the frequency of the Doppler signal; 24, an AC-DC converter which is adapted to give a DC voltage in inverse proportion to the frequency of the output signal ($J_1$ signal) of the bandpass filter 14. This DC voltage is lower as the velocity $v_r$ is higher. Reference numeral 25 denotes a multiplier for giving the product of the output voltage $e_0$ of the AC-DC converter 10 multiplied by the voltage $K/V_3$, that is a voltage in inverse proportion to the velocity $V_3$ which is measured at a predetermined distance range. The ratio between the output voltages $e_0$ and $e_1$ is compared with a reference voltage set by a potentiometer 28 in the comparator 27 so that when the voltage ratio reaches a predetermined voltage, for example, a voltage corresponding to the distance 2W, the comparator 27 outputs the signal "1" at an output terminal 27a. When this output signal "1" is applied to a voltage hold circuit, it holds a voltage $V_3$ relating to the velocity $v_3$ at the distance 2W, which is then applied to the terminal 25a. If the voltage $V_3$ is in inverse proportion to the velocity $v_3$, the multiplier 25 must be replaced with a divider. The faster the velocity $v_3$, the lower the output voltage of the multiplier 25 becomes. This relation is illustrated in FIG. 9. The point $R_1$ of intersection of the curves $K(e_0/v_3)$ and $e_1/v_r$ is independent of the velocity so that the range "S" is fixed. A comparator 26 is used to detect this point $R_1$ of intersection, and gives the output signal "1" at the terminal 26a when an object enters the range "S" across the circle $T_p$.

Figure 11:
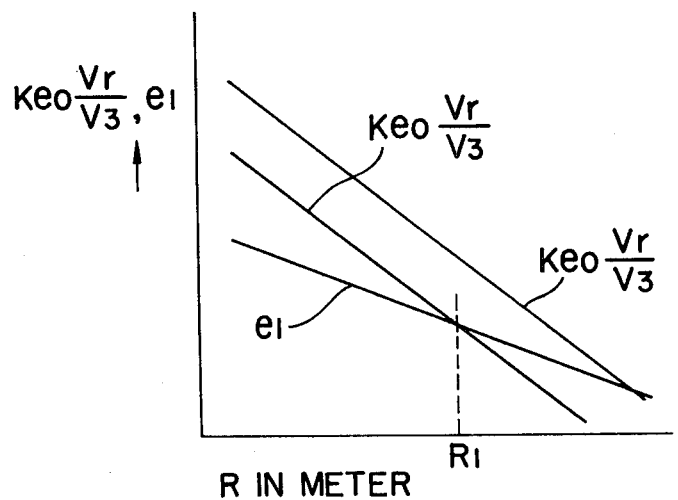
FIG. 11 is a graph used for the explanation of the mode of operation thereof.
Figure 12B:
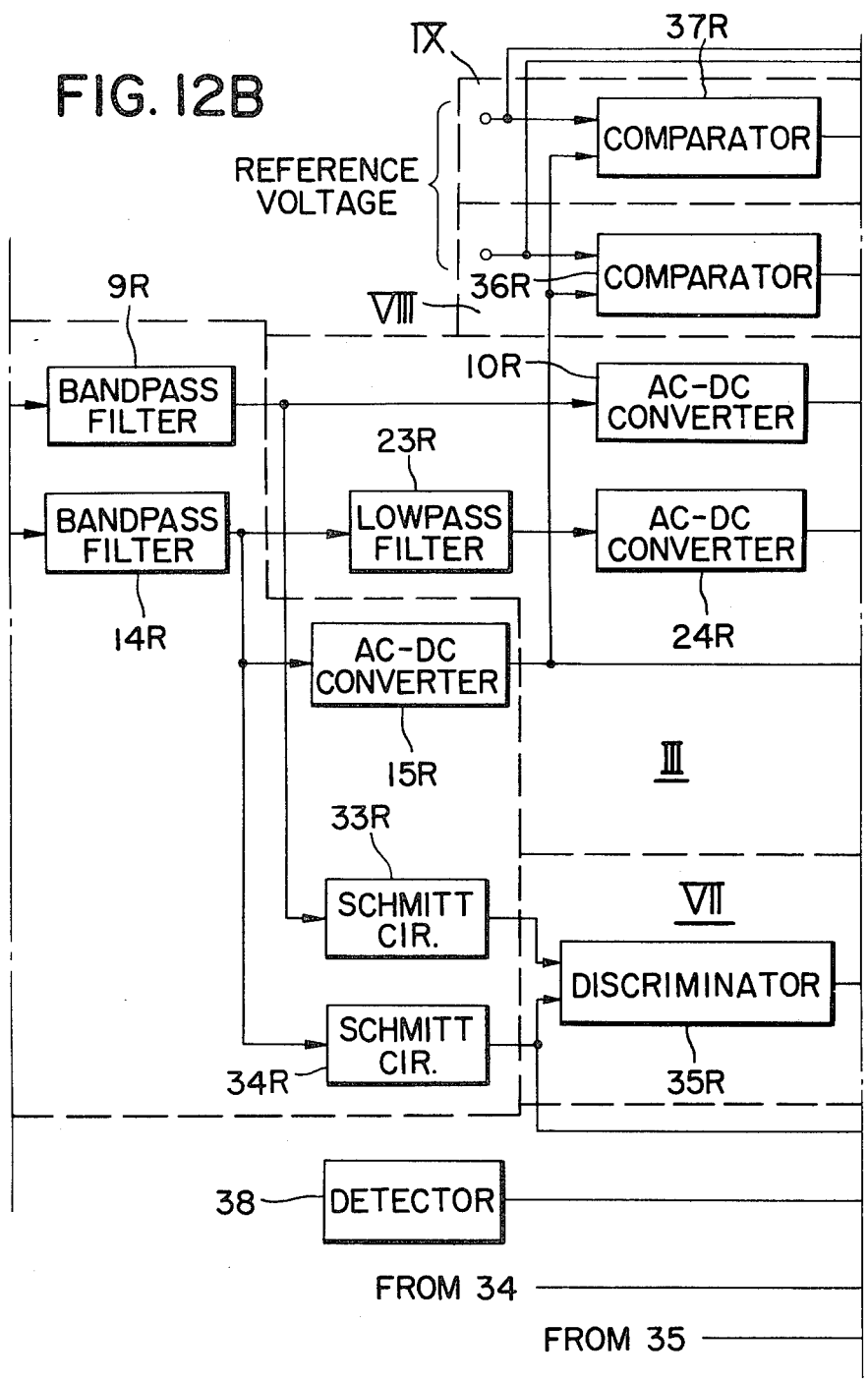
Figure 12D:
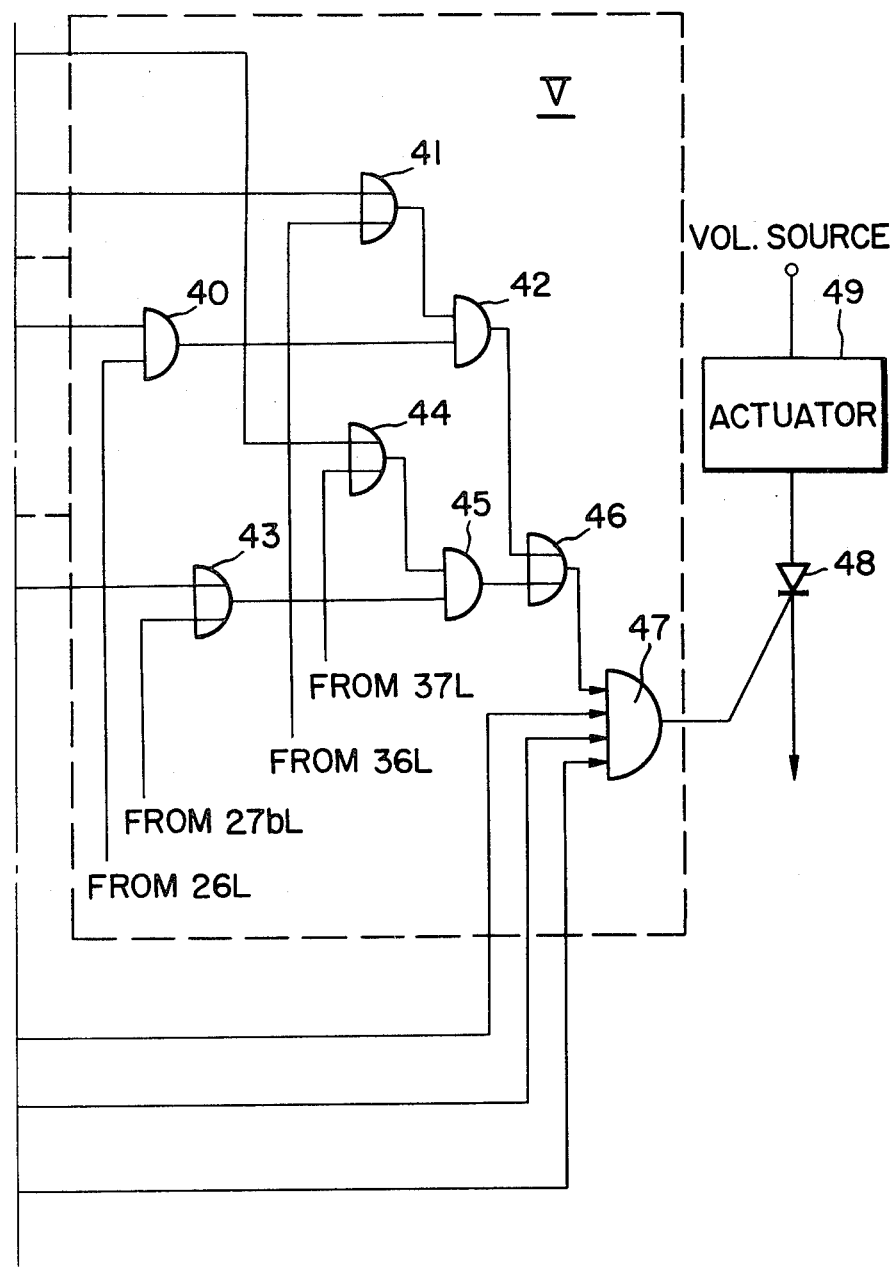
Figure 13A:
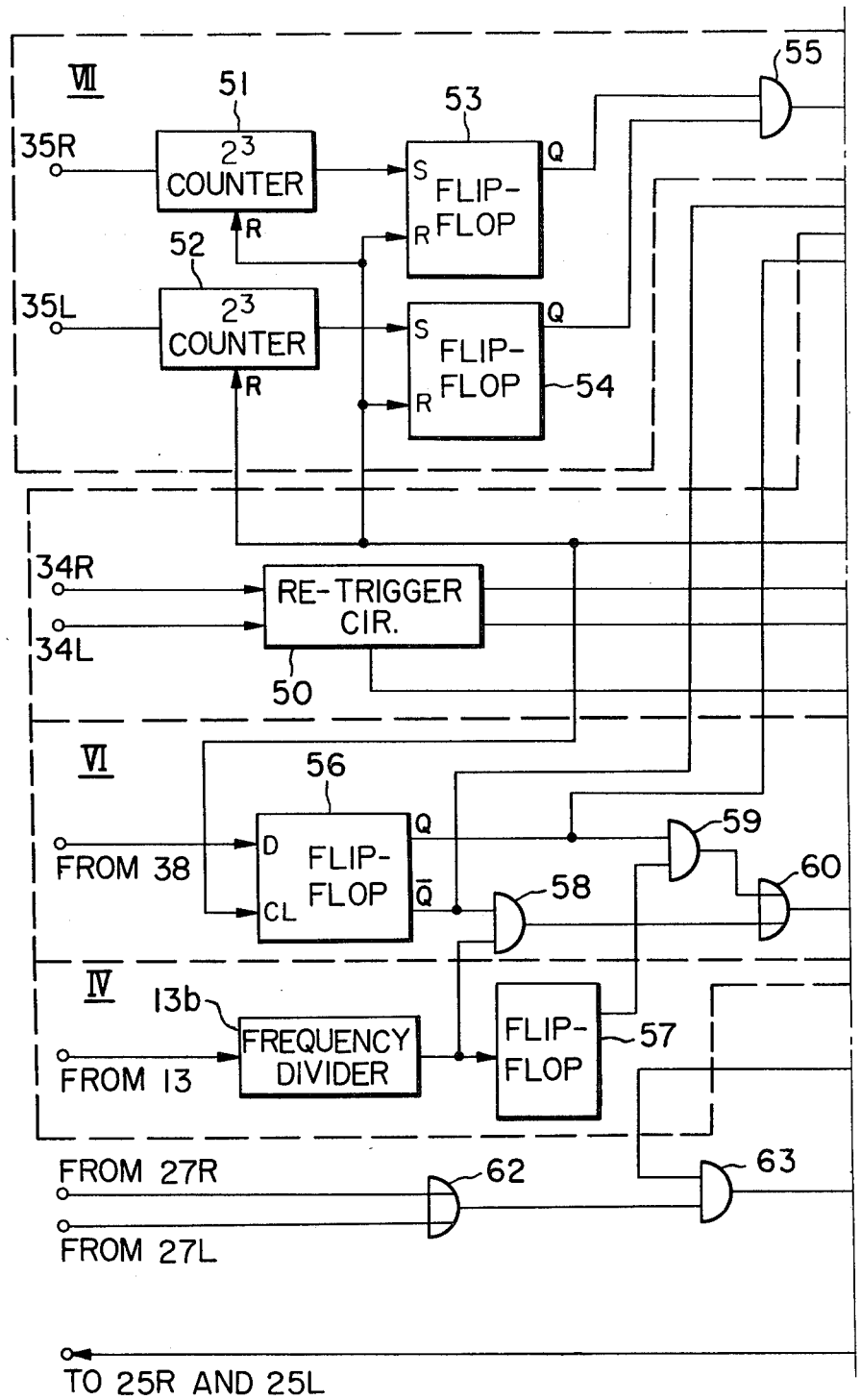
Figure 13B:
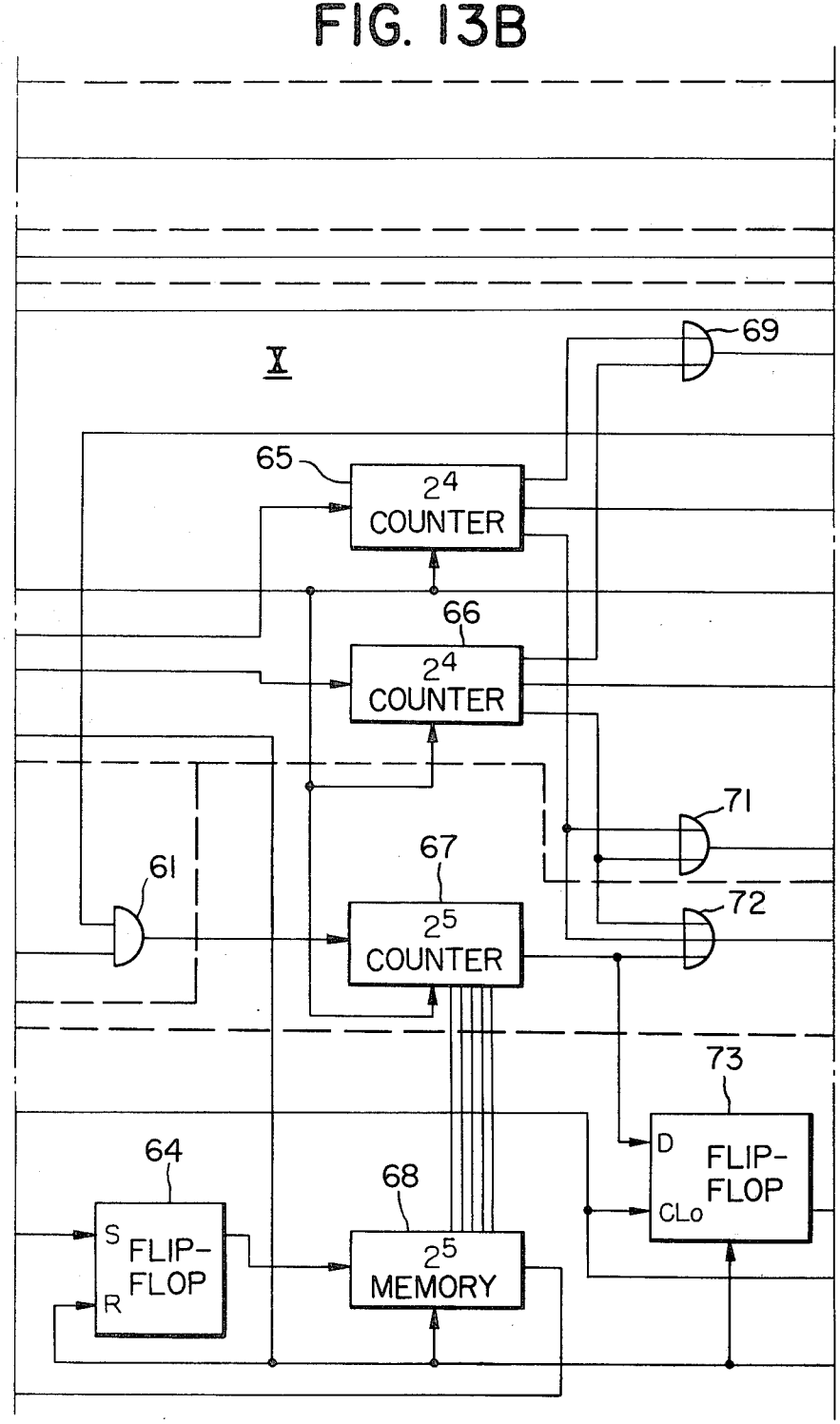
Figure 13D:
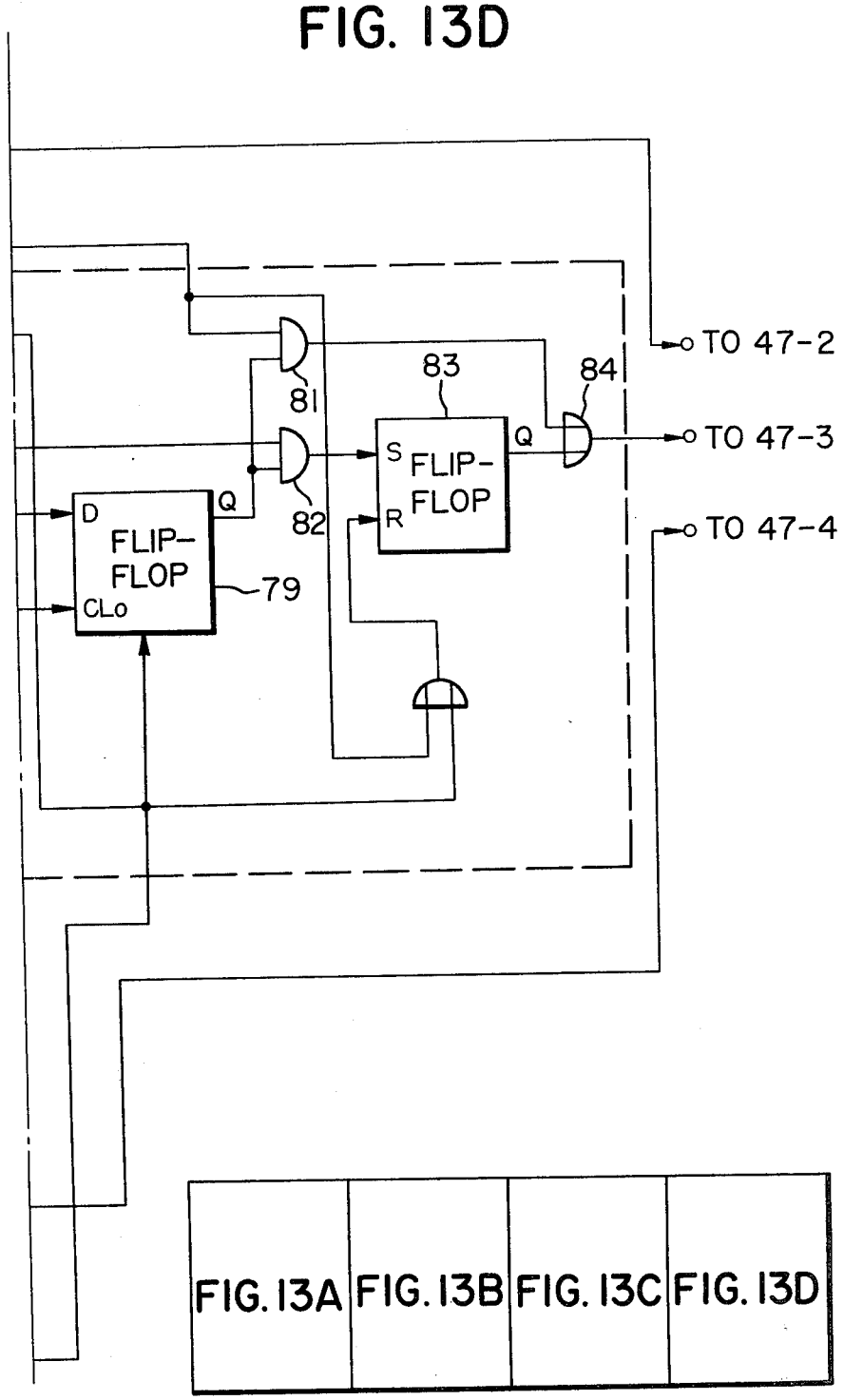

Third Embodiment, FIGS. 10 and 11

In the third embodiment, the output $J_0$ of the bandpass filter 9 (FIG. 10) is fed into an AC-DC converter 30 through a highpass filter 29 with a roll-off rate of 20 db/dec., so that the AC-DC converter 30 gives a output DC voltage signal in proportion to the frequency of the $J_0$ signal. In this case, the faster the velocity $v_r$, the higher the output DC voltage signal becomes. A multiplier 31 with an input terminal 31a is similar in construction and function to the multiplier 25 with the input terminal 25a in the second embodiment. As shown in FIG. 11, in the third embodiment the voltage signal "$e_0$" which is increased by the highpass filter 29 when the velocity is high is decreased by the voltage which is in inverse proportion to the velocity $v_3$ at the distance 2W, and is applied to the terminal 31a of the multiplier 31, and the distance $R_1$ at which the curves $K_O(v_r/v_3)$ and $e_1$ intersect with each other is detected. A comparator 32 with an output terminal 32a is similar in construction and function to the comparator 26 with the output terminal 26a in the second embodiment.

Figure 7:
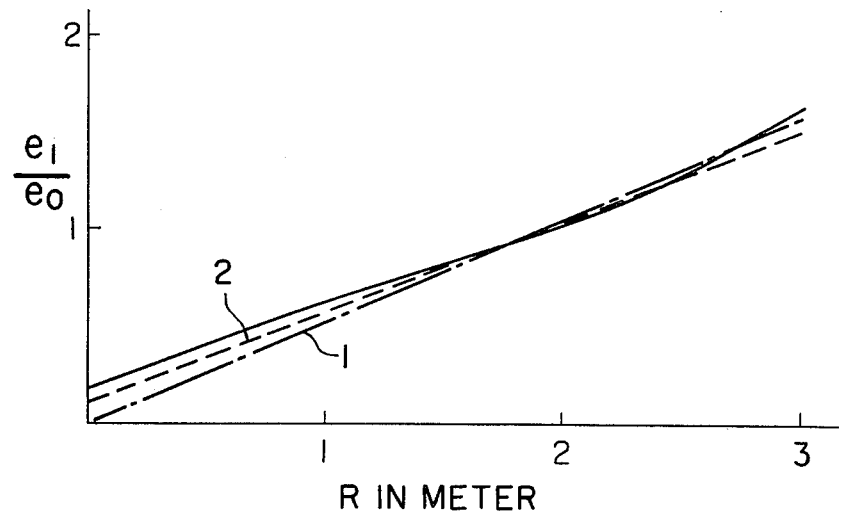
FIG. 7 is a graph illustrating the relation between the distance R and the amplitude ratio between the signals $e_0$ and $e_1$ representing the Bessel functions $J_0$ and $J_1$ derived by processing a low frequency wave or a difference-frequency signal.

As shown in FIG. 7, the ratio $e_1/e_0$ is uniquely related with the distance R. In the above embodiments, the relation between them is approximated by a straight line 1 in FIG. 7, which passes through the origin of the coordinate system and has a predetermined sloping, but it may be approximted by the line 2 in FIG. 7. The line 2 passes through the intercept in the coordinate system, and has a predetermined slope. It is represented by the equation (9).

$$R = A_2(e_1/e_0) + B \qquad (9)$$

The predetermined slope $A_2$ and intercept B of the line 2 are determined in such a manner that the line 2 better approximated the relation between the ratio $e_1/e_0$ and the distance R than does the line 1. As is evident from FIG. 7, the accuracy of distance is especially improved at a distance less than 2 meters.

In the fourth embodiment which will be described with reference to FIGS. 16-A and 16-B, an object entering the predetermined distance range is detected by detecting that the distance obtained by the equation (9) has become equal to the value $C_2(v_r/v_3)$ obtained from the constant $C_2$ weighted by the velocity $v_r$ and the velocity $v_3$ at a predetermined distance from the vehicle, whereby a collision anticipating signal is generated. As a result the accuracy of the collision anticipation based on the line 2 is better than that of the first embodiment based on the line 1. In the fourth embodiment, the equation to detect the object entering the predetermined distance range is as follows.

$$A_2(e_1/e_0) + B = = C_2(v_r/v_3) \qquad (10)$$

The following two equations are obtained by rearranging equation (10).

$$(C_2(e_0/v_3) - B(e_0/v_r)) = A_2(e_1/v_r) \qquad (11)$$

$$(C_2(e_0V_r/v_3) - Be_0) = A_2e_1 \qquad (12)$$

the collision state decision unit in FIG. 16-A is based upon the equation (11), and the collision state decision unit in FIG. 16-B is based upon the equation (12).

Fourth Embodiment, FIGS. 16A – 16B

The Doppler signal from the bandpass filter 9R is weighted by the frequency or relative velocity by a lowpass filter 87R with a roll-off rate of −20db/dec., and an AC-DC converter 88R converts the output signal of the lowpass filter 87R into the DC signal. Reference numerals 89R, 90R, and 91R denote multipliers for multiplying by a constant; 92R, adds the output voltages of the multipliers 89R and 90R. The multiplier 89R has its input terminal connected to the output terminal of the multiplier 25R; the multiplier 90R has the input terminal connected to its output terminal of the AC-DC converter 88R; and the adder 92R has one input terminal connected to the output terminal of the multiplier 89R and the other input terminal connected to the output terminal of the multiplier 90R. The comparator 26R has one input terminal connected to the output terminal of the adder 92R and the other input terminal connected to the output terminal of the coefficient multiplier 91R. Therefore, the signal in proportion to $(K(e_0/v_3) - \lambda B(e_0/v_r))$ is applied to one input terminal of the comparator 26R and the signal in proportion to $A_2(e_1/v_r)$ is applied to the other input terminal, so that the straight curve 2 in FIG. 7 may be obtained.

A modification shown in block diagram in FIG. 16-B is substantially similar to the fourth embodiment described above with reference to FIG. 16-A except the lowpass filters 87R and 23R are eliminated and a highpass filter 86R with a roll-off rate of 20db/dec. is interconnected between the bandpass filter 9R and the AC-DC converter 10R. A signal in proportion to $(K(e_0v/v_3) - Be_0)$ is applied to one input terminal of the comparator 26R and a signal in proportion to $A_2e_1$, to the other input terminals so that the straight curve 2 shown in FIG. 7 may be obtained.

Figure 17B:
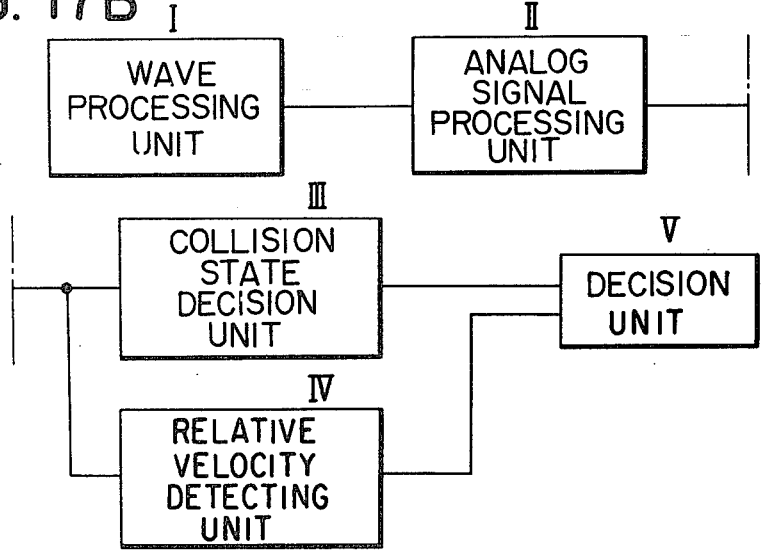

Fifth Embodiment, FIG. 17B

As shown in FIG. 17B the fifth embodiment is different from the first embodiment shown in FIg. 17A in that the former further comprises a relative velocity detecting unit IV and a decision unit V.

The relative velocity detecting unit IV comprises a frequency-voltage converter whose input terminal is connected to the output terminal of the bandpas filter 14 in the analog signal proceeding unit II, a potentiometer for setting a reference voltage and a comparator whose one input terminal is connected to the output terminal of the frequency-voltage converter and whose other input terminal is connected to the reference voltage setting terminal or arm of the potentiometer.

The decision unit V comprises an AND circuit whose one input terminal is connected to the output terminal of the relative velocity detecting unit IV and whose other input terminal to the output terminal of the collision state decision unit III so that only when the two units IV and III simultaneously give the output signals to the decision unit V does the latter given an output signal.

As described in the first embodiment, the apparent relative velocity is in proportion to the Doppler angular frequency $\omega_d$ derived from the analog signal processing unit II. This Doppler angular frequency $\omega_d$ is directly converted into a voltage signal in an analog manner and is compared with the reference voltage. In the fifth embodiment, the reference voltage set by the potentiometer is set to 25 Km/h so that the comparator outputs the signal only when the apparent relative velocity is in excess of 25 Km/h.

In addition to the effects and features of the first embodiment, the fifth embodiment has an additional novel feature in that no collision signal is given when a vehicle is traveling at a low speed or at rest so that a driver will not be seriously injured even in case of collision. Thus the inadvertent operation of the safeguarding device may be more positively prevented. In the fifth embodiment the collision signal is given only when the relative velocity is in excess of 25 Km/h so that the frequency band width of the signal processed in the relative velocity detecting unit IV is narrow. As a result, the electronic circuitry may become simple in construction, more reliable in operation and inexpensive to manufacture. As a modification of the fifth embodiment, the Doppler angular frequency $\omega_d$ may be processed in a digital manner.

Figure 17C:
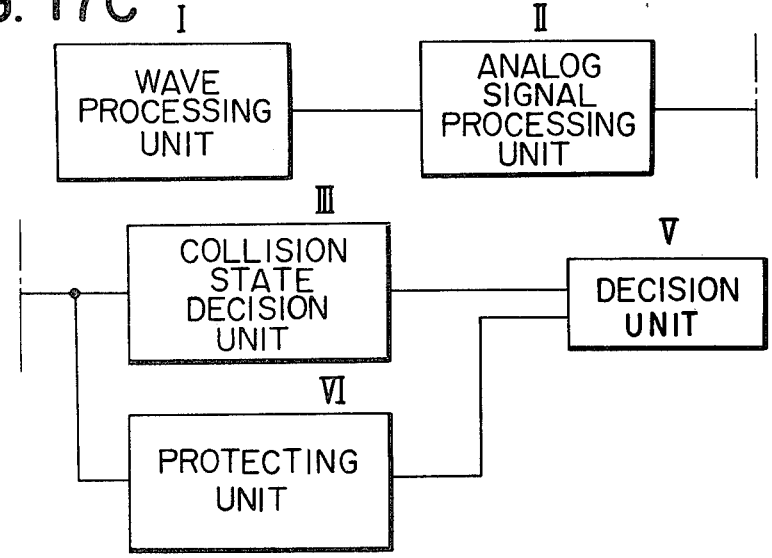

Sixth Embodiment, FIGS. 17C and 20

The circuit components in the sixth embodiment similar and common to those of the first and fifth embodiments are designated by the same reference numerals and will not be described.

The sixth embodiment is different from the first embodiment only in that the former further comprises a protection unit VI and the decision unit V which has been described in the fifth embodiment. The protecting unit VI comprises a relative velocity detecting unit and a ground speed detecting unit.

The relative velocity detecting unit is similar in function to the relative velocity detecting unit IV in the fifth embodiment. That is, the Doppler angular frequency $\omega_d$ is directly converted into voltage in an analog manner in proportion to the relative velocity.

As shown in FIG. 20, the ground speed detective unit generally comprises an electromagnetic pickup 108, a frequency-voltage converter 110, a reference voltage source 112, a comparator 113 voltage generators 115 and 117, a gate circuit 114, a NOT circuit 116, another gate circuit 118, a Schmitt circuit 109, a frequency-voltage converter 111, a multiplier 119, a comparator 120 and a reference voltage source 121.

The electromagnetic pickup 108 comprises an electromagnetic tachometer consisting of four magnets and relays actuated by the electromagnetic forces. A rotary shaft thereof is coupled to a flexible cable of a speed meter. The frequency-voltage converter 110 comprises a conventional circuit including an operational amplifier for converting frequency into DC voltage. The input terminal of the frequency-voltage converter 110 is connected to the output terminal of the pickup 108. The reference voltage sources 112 and 121 and the voltage generators 115 and 117 are DC voltage dividers consisting of resistors. The comparator 113 comprises a conventional operational amplifier whose input terminals are connected to the output terminals of the frequency-voltage converter 110 and the reference voltage source 112. The gate circuit 114 comprises a conventional gate circuit using a field-effect transistor and has the signal input terminal connected to the output terminal of the voltage generator 115 and the gate input terminal connected to the output terminal of the comparator 113. The NOT circuit 116 consists of digital circuit components and has the input terminal connected to the output terminal of the comparator 113. Like the gate circuit 114, the gate circuit 118 is of the type using a field-effect transistor, and has a signal input terminal connected to the output terminal of the voltage generator 117 and a gate input terminal connected to the output terminal of the NOT circuit 116. The Schmitt circuit 109 is of a conventional type and has the input terminal connected to the output terminal of the bandpass filter 14 in the analog signal processing unit II. The frequency-voltage converter 111 which has the input terminal connected to the output terminal of the Schmitt circuit 109 is of an operational amplifier type for converting frequency into a DC voltage. The multiplier 119 has input terminals connected to the output terminals of the gate circuit 118 and the frequency-voltage converter 111. The comparator 120 is of an operational amplifier type and has input terminals connected to the output terminals of the multiplier 119 and the reference voltage source 121. The output terminal of the comparator 120 is connected to the input terminal of the decision unit V hereinafter described.

Like the decision unit V in the fifth embodiment, the decision unit V comprises an AND circuit and has input terminals connected to the collision state decision unit III and the protection unit VI.

In the sixth embodiment, the relative velocity to be compared is not fixed to 25 Km/h, but the speed the flexible cable of the speed meter in the vehicle is converted into electrical pulses to detect the ground speed or car speed so that the relative velocity may be weighted depending upon the detected ground speed in a manner different from that of the relative velocity detecting unit IV in the fifth embodiment.

More particularly, the rotational speed or number or rotations of the flexible cable of the speed meter in the vehicle is converted into electrical pulses by the electromagnetic pickup 108 and is further converted by the frequency-voltage converter 110 into a DC voltage in proportion to the pulse frequency or ground speed of the vehicle. The DC voltage is compared with reference voltage from the reference voltage source 112 which corresponds to a ground speed of 5 Km/h, and when the detected ground speed is less than 5 Km/h, the comparator 113 gives no output signal. As a result the gate circuit 114 is opened (nonconductive), but the gate circuit 118 is closed (conductive) as the output signal of the NOT circuit 116 is applied thereto. Therefore only the output voltage of the voltage generator 117 is applied to the one input terminal of the multiplier 119. On the other hand, when the ground speed is in excess of 5 Km/h, the gate circuit 118 is opened whereas the gate circuit 114 is closed so that the output voltage of the voltage generator 115 is applied to one input terminal of the multiplier 119.

The frequency of the pulses derived from the Schmitt circuit 109 is the Doppler signal frequency, and the DC voltage derived from the frequency-voltage converter 111 is in proportion to the Doppler signal frequency, i.e. the relative velocity of an object with respect to a vehicle. The output voltage of the voltage generator 117 is set to one half of that of the voltage generator 115 so that the output voltage of the multiplier 119 is one half of the voltage corresponding to the relative velocity of an object with respect to a vehicle when the latter has a ground speed less than 5 Km/h. The reference voltage supplied from the source 121 is set to a voltage corresponding to the relative velocity 25 Km/h, so that the comparator 120 gives the output signal when the relative velocity is in excess of 50 Km/h and the ground speed is less than 5 Km/h, and also when the ground speed is in excess of 5 Km/h and the relative velocity is in excess of 25 Km/h. Therefore the sixth embodiment outputs the collision signal only when the comparator 120 gives the collision signal and the collision state decision circuit III simultaneously gives the output signal to the decision unit V.

In addition to the effects and features of the first embodiment, the sixth embodiment has an additional novel feature that the inadvertent operation of the safeguarding device may be more positively prevented when the collision takes place at a low speed, or an object is merely passing across the course of a vehicle or a vehicles is at rest as for example at an intersection waiting for a green signal.

In the sixth embodiment the relative velocity of an object with respect to a vehicle is compared with two different references which may be switched from one to another depending upon the ground speed of the vehicle, but it is understood that the present invention is not limited to the above arrangement. For example, the output voltage of the reference voltage source 121 may be switched or the reference with which the relative velocity is compared may be varied in inverse proportion to the ground speed. Furthermore the signal may be processed in a digital manner. Moreover the signal representative of the intensity of the reflected wave derived from the Doppler signal which is obtained from the low frequency wave or the difference frequency signal may be weighted by the ground speed of the vehicle to attain the same effects and features.

Figure 17D:
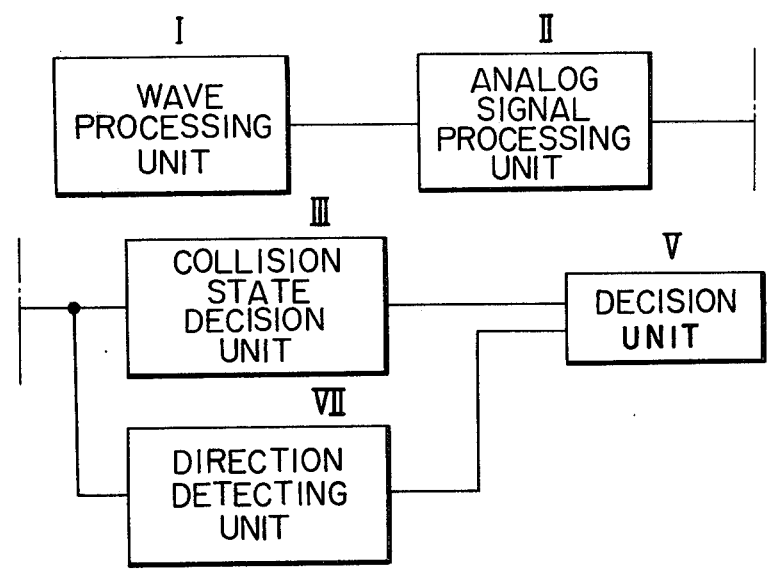

Seventh Embodiment, FIG. 17D

As shown in FIG. 17D, the seventh embodiment is different from the first embodiment in that the former further comprises a direction detecting unit VII for detecting whether an object is closing to or receding away from a vehicle and the decision unit V of the type described above.

The first and second terms of Eq. (1) are different in phase in the positive and negative directions. That is, the phase of the first term advances or lags behind the phase of the second term by 90° depending upon the closing or receding target. Therefore it becomes possible to detect whether the target is closing to or receding away from the vehicle from the phase relation between the first and second terms. Based upon the above described principle, the direction detecting unit VII generally comprises a D-type flip-flop, an integrator, a reference voltage source and a comparator. The D-type flip-flop has the clock input terminal connected to the bandpass filter 9 in the analog signal processing unit II through a wave shaping circuit and the D input terminal connected to the output terminal of the bandpass filter 14 in the analog signal processing unit II through a wave shaping circuit. The output terminal is connected to an input terminal of the integrator. The integrator which has the output terminal connected to one input terminal of the comparator is adapted to integrate the output pulses of the D-type flip-flop and to hold the integrated pulses until the reset or clear signal to be described hereinafter is applied. The reference voltage source is connected to the other input terminal of the comparator to supply a reference voltage thereto. The comparator compares the output voltage of the integrator with the reference voltage and only when the former is higher than the latter does the comparator give the output signal.

The decision unit which comprises an AND circuit gives the collision signal only when the output signals of the collision state decision unit III and the direction detecting unit VII are simultaneously applied to input terminals of the AND circuit.

When an object is approaching or closing to a vehicle, that is, when the distance between the object and the vehicle is decreasing, the D-type flip-flop gives the output signal. The reference voltage is so set as to correspond to the output voltage of the integrator when it has integrated 12 input pulses. Therefore the comparator gives the output signal only when the integrator has integrated more than 12 input pulses. When the object is receding, the D-type flip-flop will not output the signal so that the comparator will not give the output signal at all. In summary the direction detecting unit VII gives the signal only when the object is closing to the vehicle. Hence the seventh embodiment gives the output signal only when the output signals of the collision state decision unit III and the direction detecting unit VII are simultaneously applied to the decision unit V.

In addition to the effects and features of the first embodiment, the seventh embodiment has an additional novel feature that the inadvertent operation of the safeguarding device may be more positively prevented when an object is merely passing across the course of the vehicle, when the vehicle is passing past the object, when the object is passing past the vehicle or when the object is receding away from the vehicle so that no collision will take place at all.

Figure 17E:
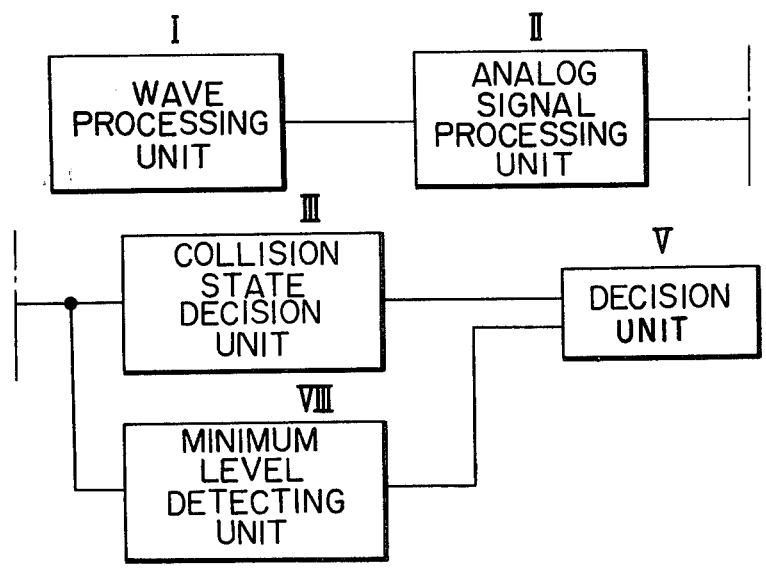

Eighth Embodiment, FIG 17E

The eighth embodiment of the present invention is, as shown in FIG. 17E, different from the first embodiment in that the former further comprises a minimum level detecting unit VIII and the decision unit V of the type described above.

The minimum level detecting unit VIII generally comprises a comparator and a reference voltage source. The comparator has the input terminals connected to the reference voltage source and to the AC-DC converter 15 in the analog signal processing unit II, and compares the output voltage of the former with the output voltage of the latter. The comparator gives the output signal only when the latter is higher than the former.

The decision unit V generally comprises an AND circuit whose input terminals are connected to the output terminals of the collision state decision unit III and the minimum level detecting unit VIII.

In the instant embodiment the reference voltage is set to a voltage surrounding to the distance to an object equal to two meters so that the comparator outputs the signal only when the distance to an object is less than two meters. The decision unit V gives the collision signal only when the output signals of the collision state decision unit III and the minimum level detecting unit VIII are simultaneously applied to the decision unit V.

In addition to the effects and features of the first embodiment, the eighth embodiment has an additional novel feature that the minimum level detecting unit VIII detects whether the intensity of the signal reflected from an object entering the predetermined intensity range which is determined by positions and angles of the transmitting and receiving antennas, is in excess of a predetermined level or not, independently of the reflection factor and shape or dimension of an object. In other words, independently of the reflection factor and shape or dimension of an object, the latter is detected in a reliable manner when it once enters the predetermined intensity range, and the inadvertent operation of the safeguarding device can be prevented.

In the radar system employed in the above embodiments of the present invention, the same intensity ratio of the reflected signal gives sometimes two different distances to the same object. Therefore an object which strongly reflects the signal may be mistaken as being at a relatively short distance from a vehicle even though the object is far away from the vehicle. However the minimum level detecting unit VIII incorporated in the eighth embodiment serves to overcome this problem and to prevent the inadvertent operation of the safeguarding device. In addition to the above radar system any other suitable radar system such as AM or two-frequency radar system may be employed in the present invention.

Figure 17F:
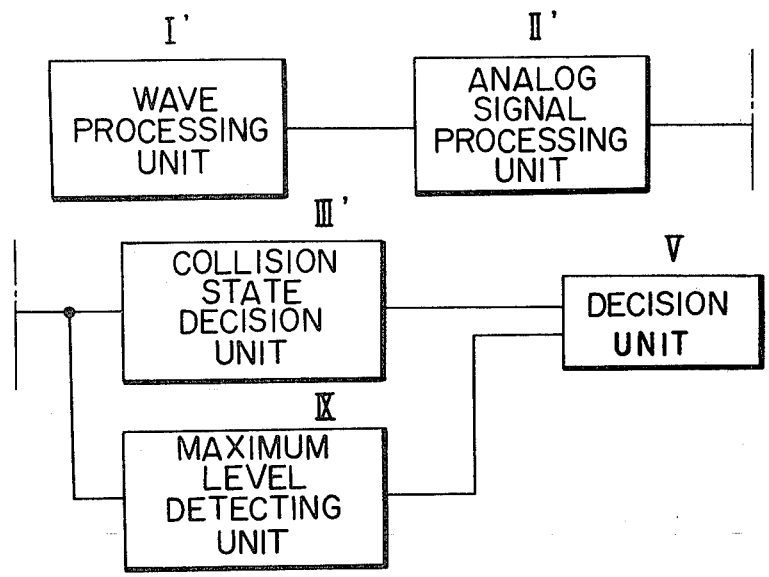

Ninth Embodiment, FIG. 17F

The ninth embodiment of the present invention generally comprises a pair of wave processing units I' having right and left bistatic transmitting and receiving antennas as shown in FIG. 3, a pair of analog signal processing units II' connected to the wave processing units I', a pair of collision state decision units III' connected to the analog signal processing units II', a pair of maximum level detecting units IX, and the decision unit V.

The right and left transmitting and receiving antennas of the wave processing units I' are inclined inwardly in a fashion similar to the toe-in on the front wheels of a vehicle so that the angle of radiation of the beams may be limited within 10–30 degrees. Furthermore, the right and left antennas are spaced apart from each other by a predetermined distance of the order of 50–140 centimeters. As a result, the intensity of the Doppler signal is made extremely small when an object is merely passing across the course of a vehicle so that no collision is expected. On the other hand the Doppler signal has a considerably high intensity when an object is very close to a transmitting and receiving antennas so that the collision is unavoidable.

The maximum level detecting units IX detect whether the level of the Doppler signal reaches a predetermined intensity level or not and thereby detects whether an object has or has not entered a predetermined intensity range defined by the beams of the transmitting and receiving antennas. When an object enters this range, the intensity of the signal reflected by the object is in excess of a predetermined level. Each of the maximum level detecting units IX comprises a comparator and a reference voltage source. The comparator has input terminals connected to the output terminal of the AC-DC converter 15 (15') in the analog signal processing units II' and to the output terminal of the reference voltage source, and comparates the output voltage of the AC-DC converter 15 (15') with the reference voltage so that only when the former is higher than the latter, the comparator gives the output signal.

The decision unit V comprises an OR circuit whose input terminals are connected to the output terminals of the comparators in the maximum level detecting units IX, and AND circuit connected to the output terminals of the collision state decision units III', and an OR circuit whose input terminals are connected to the output terminals of the OR and AND circuits. The decision unit V gives the output signal only when either of the AND circuit connected to the collision state decision units III' or the OR circuit connected to the maximum level detecting units IX gives the output signal.

The diameter of the predetermined distance range defined by the collision state decision units III' in the ninth embodiment is selected to be smaller than twice the width W of the vehicle, that is 2W, so that an object which collides against the vehicle close to one end of the vehicle will not be detected by the collision state decision units III'. Furthermore, the predetermined intensity ranges having an area smaller than the predetermined distance range defined by the collision state decision units III' are formed on both right and left ends of the predetermined distance range near and in front of the vehicle. Unlike the monostatic radar system, the Doppler signal derived from the bistatic radar system varies considerably depending upon the distance to an object. That is, the intensity of the Doppler signal changes over a wide range depending upon the reflection factor and shape or dimension of an object, but in the instant embodiment the transmitting and receiving antennas are spaced apart from each other by 50–140 centimeters so that the range of the variation in intensity of the Doppler signals may be equal to or less than the range of the variation in distance to an object. The intensity of the Doppler signal from an object which is off the predetermined intensity range defined by the transmitting and receiving antennas may be measured from the beams of the side lobes whose angles are wider than that of the main beams (the intensity of the beams in the side lobe being generally of the order of some hundredths of the intensity of the signal at the center of the main beams). However, the intensity is extremely low so that either an object is within a main beam pattern or not may be detected from the intensity of the Doppler signal independently of the distance to an object, and the reflection factor and shape of the object. The intensity of the Doppler signal is increased as an object approaches to the vehicle (or the transmitting and receiving antennas), reaches the maximum value and then decreases. The same is true when the vehicle and object pass each other in the opposite directions. In the instant embodiment, it is apparent that the effects of the shape and reflection factor of an object are smaller than the effects of the distance to the object and the position of the object so that the maximum value of the Doppler signal from a small object with a small reflection factor which will collide against the vehicle is greater than that of the Doppler signal from a large object with a large reflection factor which will not collide against the vehicle.

The ninth embodiment detects only such an object as will collide against the vehicle, independently of the reflection factor and shape of the object, and gives the collision signal. Moreover, even an object which approaches toward one end of the vehicle to collide against it may be detected when the object enters the predetermined intensity ranges formed by the maximum level detecting units IX. As a result the malfunction of the safeguarding device in that it is not actuated when it must be actuated may be prevented. Furthermore, the ranges defined by the collision state decision units III' may be made smaller so that the inadvertent operation of the safeguarding device may be prevented when an object is approaching to the vehicle with a large approaching angle so that collision may be avoided. The organic combination of the collision state decision units III' with the maximum level detecting units IX may compensate for their inherent defects and enhance their advantages so that only when collision will take place is the collision signal given. Thus, the accuracy and reliability of the collision anticipating may be much enhanced.

Figure 17G:
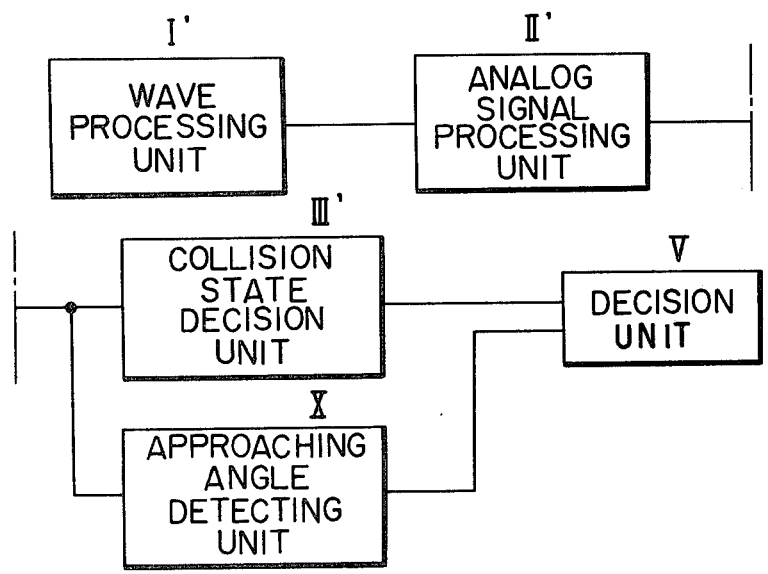

The Tenth Embodiment, FIGS. 17G and 19

The tenth embodiment of the present invention generally comprises a pair of wave processing units I', a pair of signal processing units II', a pair of collision state decision units III', an approaching angle detecting unit X and the decision unit V, as shown in FIG. 17G.

As shown in FIG. 19, the approaching angle detecting unit X generally comprises counters 100 and 101, RS flip-flops 102 and 103, an OR circuit 104, an AND circuit 105, a delay circuit 106 and a D-type flip-flop 107.

The counters 100 and 101 are four-bit digital counters, and the delay circuit 106 comprises a conventional AND gate for delaying by a few hundred nanoseconds. The RS flip-flops 102 and 103 and the D-type flip-flop 107 are of the conventional type, and the OR circuit 104 and the AND circuit 105 are also of the conventional type.

The counter 100 has the input terminal connected to the output terminal of the Schmitt circuit 34R and output terminals connected to the input terminals of the RS flip-flop 102 and the OR circuit 104. In like manner, the counter 101 has the input terminal connected to the output terminal of the Schmitt circuit 34L and output terminals connected to the input terminals of the RS flip-flop 103 and the OR circuit 104. The AND circuit 105 has input terminals connected to the output terminals of the RS flip-flops 102 and 103, and the output terminal connected to the D terminal of the D-type flip-flop 107, whose output terminal is connected to the decision unit V. The OR circuit 104 has the output terminal connected to the input terminal of the delay circuit 106 and to the C terminal of the D-type flip-flop 107. The delay circuit 106 has the output terminal connected to the reset terminals of the RF flip-flops 102 and 103 and to the clear terminals of the counters 100 and 101.

The frequency of the output pulses from each of the Schmitt circuits 34R and 34L is in proportion to the relative velocity measured by each of the right and left antennas. One of the output terminals of the counter 100 or 101 connected to the set input terminal of the RS flip-flop gives the output signal after counting a first predetermined number of pulses (not full number of pulses). The other output terminal of the counter 100 or 101 connected to the OR circuit gives the output signal after counting a second predetermined number of pulses (full number of pulses). When the output signals of the RS flip-flops 102 and 103 are simultaneously applied to the AND circuit 105, the latter gives the output signal to the D-type flip-flop 107.

The OR circuit 104 gives the output signal when either of the counters 100 or 101 outputs the signal after counting the second predetermined full number of pulses. The D-type flip-flop 107 gives the output signal when one of the counters 100 and 101 counts the second predetermined full number of input pulses after the counters 100 and 101 have already counted a first predetermined number of input pulses. Thus whether the approaching angle or the ratio between the relative velocities measured by the right and left units is within a predetermined range or not may be detected.

When one of the counters 100 and 101 has counted a second predetermined full number of input pulses, the delay circuit 106 gives the output signal which is delayed in time by a few hundred nanoseconds behind the output signal of the OR circuit 104 so that the counters 100 and 101 are cleared or reset. Thereafter the above operation is cycled.

As is clear from Eq. (5), the velocities $v_r^l$ and $v_r^r$ measured by the left and right antennas are given by $$v_r^l = v \cos(\theta_l - \theta_1), \text{ and}$$

$$v_r^r = v \cos(\theta_r - \theta_1)$$

where $\theta_l$ = angle of approach of object with respect to the left antenna in the polar coordinate system with the position of the antenna being as an origin; and $\theta_r$ = angle of approach of object with respect to the right antenna in the polar coordinate system with the position of the right antenna being as an origin.

When $\theta_1$ is determined, the ratio $C_4 = v_r^l/v_r^r$ falls within a predetermined range when the object will collide against the vehicle. This has been confirmed by the experiments conducted by the inventors.

In the tenth embodiment, whether the approaching angle $\theta_1$ is within 30° or not is detected so that the approaching angle detecting unit X may give the output signal only when the approaching angle is within a range between 0° and 30°.

In addition to the effects and features of the first embodiment, the tenth embodiment has an additional novel feature that the inadvertent operation of the safeguarding device can be prevented when the approaching angle is large, that is, when an object is going to collide against one side of a vehicle so that the safeguarding device cannot provide an effective measure in case of collision. In other words, the safeguarding device is actuated only when it is required to do so. When the collision time circle $T_p$ is made larger in case of the large approaching angle $\theta_1$, the inadvertent operation of the collision state decision units III' tends to occur as is apparent from FIG. 1. However, the approaching angle detecting unit X functions to prevent the malfunction.

The tenth embodiment can give the collision signal in a more reliable and dependable manner than the first embodiment when the safeguarding device must be actuated, and may also prevent the inadvertent operation of the safeguarding device.

In the tenth embodiment, the approaching angle detecting unit X has been described as being a digital circuit, but it is understood that an analog approaching angle detecting unit comprising a frequency-voltage converter, a divider and a comparator may be employed without departing from the true spirit of the tenth embodiment.

11th Embodiment, FIGS. 3, 12A–12D, 13A–13D and 17H

Figure 17H:
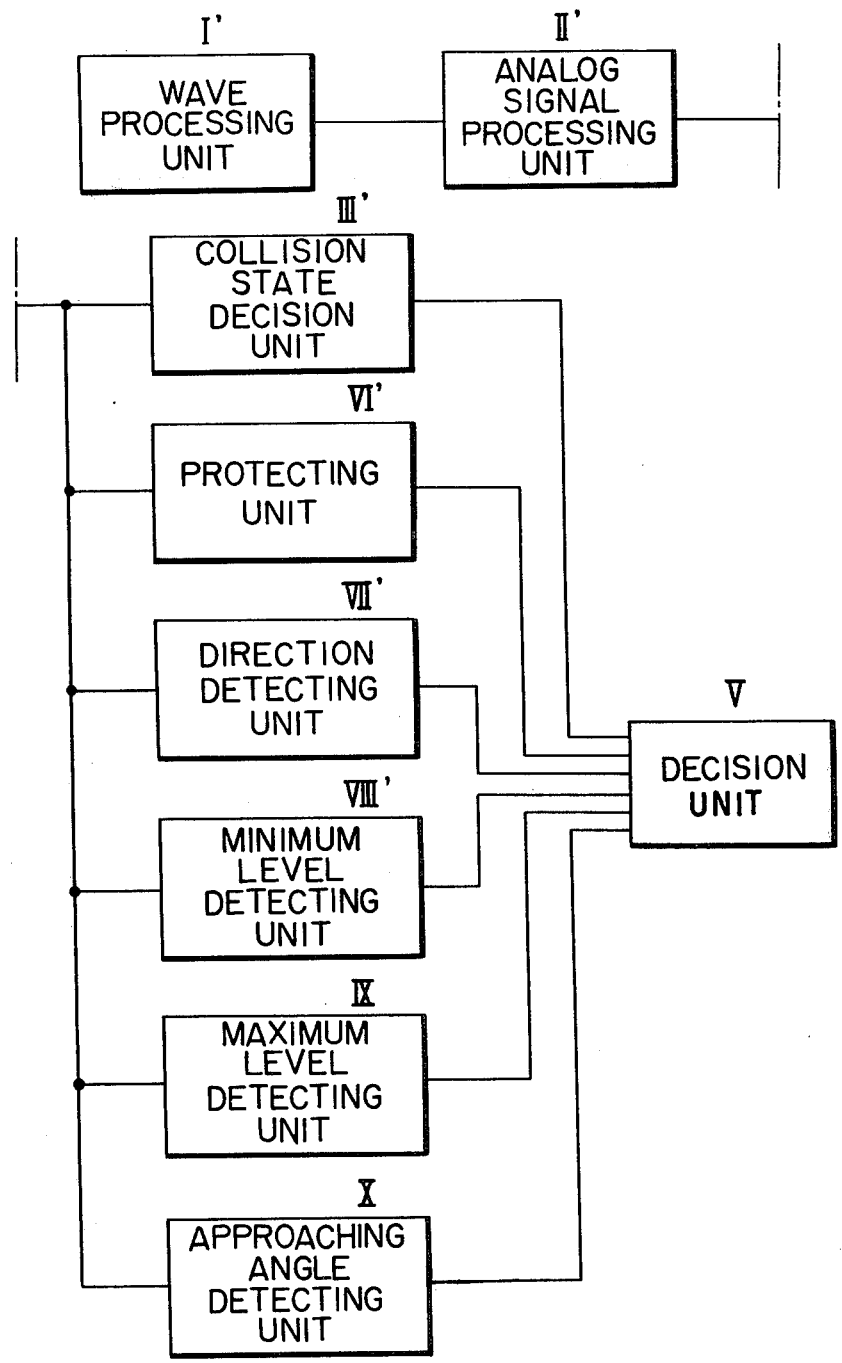

As shown in FIG. 17H, the embodiment generally comprises a pair of wave processing units I', a pair of analog processing units II', a pair of collision state decision units III', the protection unit VI', the direction detecting unit VIII', the minimum level detecting unit VIII', the maximum level detecting units IX, the approaching angle detecting unit X, and the decision unit V. The circuit components similar in construction and function to those in the embodiments described hereinbefore will not be described.

The 11th embodiment shown in block diagrams in FIGS. 12A—12D and 13A–13D is connected to the wave processing units I' of the type described with reference to FIGS. 5A–5D. The component parts or circuits designated by reference numerals with a suffix R belong to the right units, and it is understood that the 11th embodiment includes the similar component parts or circuits designated by the reference numeral with a suffix L in the left units. The component parts or circuits designated by 8, 9, 10, 11, 12, 13, 14, 15, 23, 24, 25, 26 and 27 have been already described so that they will not be described in the 11th embodiment.

Figure 14:
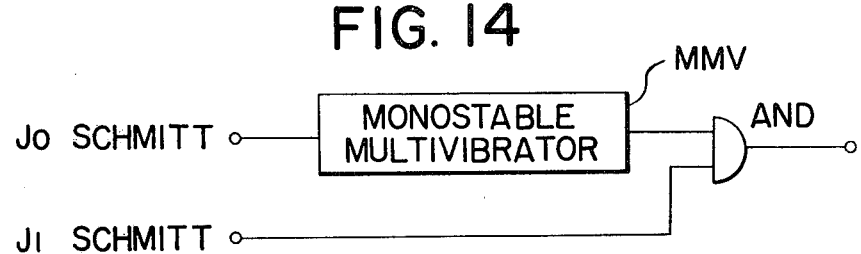
FIG. 14 is a block diagram illustrating the detail of a direction discriminator in the 11th embodiment.

Referring to FIGS. 12A–12D, Schmitt circuits 33R and 34R which have the input terminals connected to the output terminals of the bandpass filters 9R and 14R respectively, have the function of giving the output signal "1" in the positive or negative half cycle of the signals $J_0$ and $J_1$ which are the output signals of the bandpass filters 9R and 14R, respectively. As described hereinbefore, the signals $J_0$ and $J_1$ are different in phase by 90°. More particularly, the phase of the signal $J_1$ advances or lags behind the phase of the signal $J_0$ depending upon the closing or receding target. Thus it is possible to determine whether the target is closing or receding by the comparison of the phases of these signals $J_0$ and $J_1$ by a discriminator 35R. The discriminator 35R gives the signal "1" at each cycle of the Doppler signal when an object is approaching. The detail of the discriminator 35R is shown in FIG. 14 as comprising a monostable multivibrator MMV and an AND circuit. A comparator 36R is adapted to detect the dimensions of an object from the intensity of the received signal or the signal reflected by the object in the range "$S_{RL}$" described hereinbefore. In other words, the comparator 36R functions to prevent the actuation of the safeguarding device when an object entering the range "$S_{RL}$" is so small that a driver will not be seriously injured even when the object collides against the vehicle. The comparator 36R is adapted to give the output signal "1" only when the intensity of the received signal in terms of the voltage is in excess of a predetermined reference voltage. A comparator 37R is similar in construction and function to the comparator 36R, and gives the output signal "1" when the intensity of the received signal is in excess of a predetermined level. It should be noted that the comparator 36R or 36L gives the output signal "1" depending upon the logic product of the logic product range $S_{RL}$ of the ranges $S_R$ and $S_L$ described hereinbefore multiplied by the logic sum of the outputs of the right and left comparators 36R and 36L, whereas the comparator 37R detects the intensity of the received signal reflected by an object in a range closer to the vehicle than the range "$S_{RL}$". The comparator 27bR (FIG. 12C) defines said close range, and gives the output signal "1" when the ratio between $e_0$ and $e_1$, that is, the output signals of the AC-DC converters 10 and 15, is in excess of a predetermined level as described hereinbefore. The comparator 27 gives the signal when the object is for example three meters (equal to twice the width W of the vehicle) whereas the comparator 27b gives the output signal "1" when the object is, for example, 1.5 meters away from the vehicle. A detector 38 (FIG. 12B) gives the output signal "1" or "0" depending upon whether the vehicle is travelling or at rest so that the digital circuits to be described in detail with reference to FIG. 13 may process the signals in different manners. An AND gate 40 (FIG. 12D) defines the common range "$S_{RL}$" of the ranges $S_R$ and $S_L$; an OR gate 41 gives the output signal "1" when either of the comparators 36R or 36L gives the output signal "1" and AND gate 42 gives the output signal "1" when the output signals "1" are simultaneously applied thereto from the AND and OR gates 40 and 41; an OR gate 43 gives the output signal "1" when either of the comparators 27bR or 27bL gives the output signal "1"; an OR gate 44 gives the output signal "1" when either of the comparators 37R or 37L gives the output signal "1"; and AND gate 45 gives the output signal "1" only when both OR gates 43 and 44 give the output signals "1"; and an OR gate 46 gives the output signal "1" when either of the AND gates 42 or 45 gives the output signal "1". By the arrangement of the AND and OR gates described above, the OR gate 46 outputs the signal "1" when an object enters the common range "$S_{RL}$" and the intensity of the received signal therefrom is in excess of a predetermined level, or when the intensity of the received signal frm an object in the closer predetermined range is in excess of a predetermined level. A final AND gate 47 gives the output signal "1" only when the OR gate 46 as well as the digital operation circuits to be described hereinafter simultaneously gives the output signals "1" so that a thyristor 48 is conductive. As a result, a device 49 for actuating the safeguarding device is energized, the device being connected to the electric detonator in case of the safeguarding device of the type being actuated by the explosion of powder or an energizing coil in case of the safeguarding device of the type being actuated by the solenoid valve.

The detail of the digital operation unit 39 shown in FIGS. 12A–12D is illustrated in FIGS. 13A–13D. Three-bit counters 51 and 52 count the pulses from the direction discriminators 35R and 35L when an object is closing, and RS flip-flops 53 and 54 output the signals "1" on the Q terminals when they are set when the counters 51 and 52 have counted a predetermined full number of pulses. An AND gate 55 gives the output signal "1" only when the RS flip-flops 53 and 54 simultaneously give the output signals "1". That is, the AND gate 55 gives the output signal "1" when the direction discriminators 35R and 35L detect the closing object and after the counters 51 and 52 have counted a predetermined full number of pulses. The counters 51 and 52 and the flip-flops 53 and 54 have the reset terminals R.

In the digital circuits in the instant embodiment, all operations are based upon a reference number of pulses or a pulse of four bits or fifteen waves of the Doppler signal so that the above described direction discriminating counters give the output signals when they have counted eight of the 15 reference pulses.

A D-type flip-flop 56 is adapted to give the output signal "1" on the Q terminal and the inverted output signal "0" on the $\overline{Q}$ terminal. The clock pulse divider 13b divides the frequency of the oscillator 13 into the frequency of the clock pulses. The clock pulse divider 13b may be a clock pulse generator. The clock pulses from the clock pulse divider 13b are stepped down in frequency by 1/2 by a flip-flop 57, and an AND gate 58 gives the output signal "1" only when the output signals "1" are applied from the $\overline{Q}$ terminal of the D-type flip-flop 56 when the vehicle is at rest and from the output terminal of the clock pulse divider 13b. An AND gate 59 gives the logic product of the output signal "1" appearing on the Q terminal of the D-type flip-flop 56 when the vehicle is travelling and the output signal of the flip-flop 57. An OR gate 60 gives the logic sum of the output signals of the AND gates 58 and 59. Thus when the vehicle is at rest, by the arrangement of the circuits 13b, 56, 57, 58, 59 and 60, the OR gate gives the output pulses of a frequency twice the frequency when the vehicle is running. An AND gate 61 (FIG. 13B) gives the logic product of the output signals of the OR gate 60 and of an RS flip-flop 70 (FIG. 13C) to be described hereinafter, and an OR gate 62 (FIG. 13A) gives the logic sum of the output signals of the comparators 27R and 27L for storing the velocity $V_3$ measured at the distance 2W away from the vehicle in the manner described hereinbefore. An AND gate 63 gives the output signal "1" when the output signals "1" of the OR gate 25 and an OR gate 72 to be described hereinafter are applied. An RS flip-flip 64 (FIG. 13B) gives the output signal "1" on its Q terminal when the output signal "1" of the AND gate 63 is applied to the set terminal S.

Figure 15:
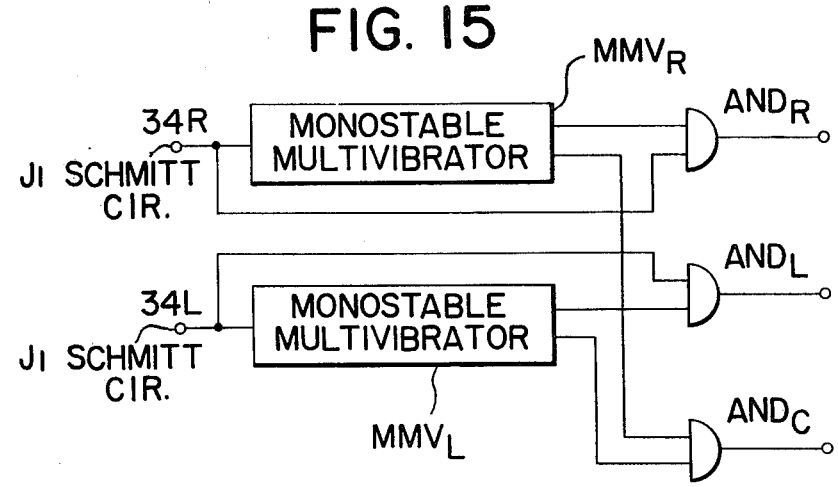
FIG. 15 is a block diagram of a re-trigger circuit shown in FIGS. 13A-13D.

The output signals of the Schmitt circuits 34R (FIG. 13A) and 34L are applied through a re-trigger circuit 50 to the input terminals of four-bit counters 65 and 66 for measuring the ratio between the frequencies of the Doppler signals measured by the right and left units or the relative velocity ratio. The detail of the re-trigger circuit 50 is illustrated in FIG. 15. It comprises a pair of right and left monostable multivibrators $MMV_R$ and $MMV_L$ which are triggered in response to the output pulses from the Schmitt circuits 34R and 34L respectively, and three AND gate circuits $AND_R$, $AND_l$, and $AND_C$. When the pulses are applied to the AND gate circuits within a predetermined time, they are closed so that the output pulses of the Schmitt circuits 34R and 34L may pass through the AND circuits. When the interval between the output pulses of the Schmitt circuits 34R and 34L exceeds a predetermined time, the clear or reset signal "1" is gives in order to reset the RS slip-flop 64 (FIG. 13B), a memory circuit 68 and flip-flops 73 (FIG. 13B), 79 (FIG. 13D), 80 (FIG. 13C) and 83 (FIG. 13D) to be described hereinafter.

When either of the counters 65 (FIG. 13B) or 66 starts counting, the AND gate 61 is closed and the clock pulses are counted by a five-bit counter 67. The counter 67 stops counting when one of the counters 65, 66 or 67 has counted a predetermined full number of pulses. The counter 67 will be referred to as the "relative velocity counter" hereinafter in this specification. In summary, the content of the counter 67 is in inverse proportion to the velocity or $1/v_3$, and the counter is reset when one of the counters 65, 66 has counted a predetermined full number of pulses and the same operation is cycled so that when the number of pulses counted is in excess of a predetermined full number or when the relative velocity is less than a predetermined velocity, the output signal is given and is transferred into the flip-flop 73 for storage through the OR gate 72. As a result, the output signal "0" appears on the $\overline{Q}$ terminal of the flip-flop 73, and is applied to the input terminal of the AND gate 47. This means that the collision velocity is less than a predetermined velocity.

When the signal "1" appears on one of the terminals 27R or 27L, that is, when an object enters the range (2W) and when one of the relative velocity ratio counters 65 or 66 or the relative velocity counter 67 counts a predetermined full number of pulses, the content of the relative velocity counter 67 is transferred into the five-bit memory circuit 68. The number of pulses stored in the memory circuit 68 represents the right or left relative velocity which is higher than the left or right relative velocity within the predetermined range which satisfies the approximation of $v_r = v \cos(\theta - \theta_1) \approx v$, and represents the signal which is in proportion to $1/V_3$ with a higher degree of accuracy. The output terminals of the memory circuit 68 are connected to transistor switch circuits in the multipliers 25R and 25L of the type employing the D-A converters consisting of the resistor networks as illustrated in detail in FIG. 18. The output voltages of the AC-DC converters 10R and 10L are applied to the reference voltage terminals of the D-4 converters whose digital input terminals are connected to the output terminals of the memory circuit 68 respectively so that the product $e_0$ multiplied by $1/V_3$ is given.

When either of the counters 65 or 66 starts counting, an OR gate 69 gives the output signal to set the RS flip-flop 70 so that the output signal "1" appears on the 1Q terminal. As a result the AND gate 61 is closed that the relative velocity counter 67 starts to count the clock pulses. An OR gate 71 gives the output signal "1" when either of the counters 65 or 66 counts a predetermined full number of pulses whereas the OR gate 72 gives the output signal "1" when one of the counters 65, 66 or 67 counts a predetermined full number of pulses so that the RS flip-flop 70 is reset and the content in the D-type flip-flop 73 is replaced. A delay circuit 74 functions to reset the D-type flip-flop 80 in order to replace the information concerning the cirection detection. A delay circuit 74 functions to reset the RS flip-flops 76 and 77 which store the output signals of the relative velocity ratio counters 65 and 66, the relative velocity ratio counters 65 and 66, and the relativelocity counter 67. The output terminals of the RS flip-flops 76 and 77 are connected to an AND gate 78 which gives the output signal "1" when the velocity ratio is in excess of a predetermined level. (In this case, one of the counters 65 or 66 has already counted a predetermined full number of pulses whereas the other counter 66 or 65 almost finishes counting a predetermined number of pulses). The approaching angle is smaller as the velocity ratio is closer to unity. That is, an object is heading toward the midpoint between the right and left points of observation or between the right and left antennas. In other words, only when the safeguarding device must be actuated to protect a driver, the AND gate 78 gives the output signal "1" so that the inadvertent operation of the safeguarding device when an object and vehicle are passing each other in the opposite directions may be prevented. A D-type flip-flop 79 stores the output signal of the AND gate 78 whenever the OR gate 71 gives the output signal "1", and an AND gate 81 gives the output signal "1" when a vehicle is at rest and when the output signal "1" of the flip-flop 79 is applied to the AND gate 81. On the other hand, an AND gate 82 gives the output signal "1" when the vehicle is running and when the output signal is applied thereto from the flip-flop 79. An RS flip-flop 83 gives the output signal "1" when it is set by the output signal "1" of the AND gate 82. Therefore when the vehicle is at rest, the result of operation is given from the AND gate 81 whereas when the vehicle is running, the RS flip-flop 83 gives the output signal and holds it until either the clear signal or the rest signal representing the vehicle at rest is applied when the detected angle of an object is such that a collision is unavoidable. An OR gate 84 gives the output signal "1" to the input terminal 3 of the AND gate 47 when either the RS flip-flop 83 or the AND gate 81 gives the output signal "1". The output signal of a OR gate 84 means that the collision is unavoidable from the relative velocity ratio detected. When the lowest speed described hereinbefore is in excess of a predetermined level, the output signal "1" appears on the Q terminal of the D-type flip-flop 73 and is applied to the input terminal 4 of the AND gate 47. When the closing object is detected, the output signal "1" appears on the Q terminal of the D-type flip-flop 80 and is applied to the input terminal 2 of the AND gate 47. Therefore the AND gate 47 gives the output signal "1" or collision signal to actuate the safeguarding device under the condition that three inputs 47-2, 3, 4 are all "1" and when either the intensity of the signal reflected by an object in the range "$S_{RL}$" or in the closer range gives "1".

In addition to the features and effects of the first to tenth embodiments described above, the 11th embodiment has an additional novel feature that the inadvertent operation of the safeguarding device when an object is receding from the vehicle may be prevented. More particularly, when an object is passing across the course of the vehicle from the left to right with a velocity, the right unit detects a closing object whereas the left unit detects a receding object. When the object passes across the course of the vehicle from the right to the left, the right unit detects a receding object whereas the left unit detects a closing object. In both cases the right or left comparator will not give the output signal because the object is receding so that no collision signal is given. Therefore, the inadvertent operation of the safeguarding device may be prevented. When an object is passing the vehicle, the right and left comparators will not give the output signal at all so that the inadvertent operation of the safeguarding device may be prevented. In summary, because of the organic combination among the various circuits in the 11th embodiment, the inadvertent operaion of the safeguarding device may be more positively prevented.

In the 11th embodiment the transmitting and receiving antennas 4 and 6 (See FIGS. 5A-5D) are installed on the vehicle as shown in FIG. 3 so that the predetermined intensity range may be defined by the transmitting and receiving antennas. The intensity of the signal reflected by an object which is off the width of the vehicle is detected by one unit to be considerably lower than the intensity of the signal detected by the other unit. Therefore when the object is merely passing across the course of the vehicle, the minimum level detecting unit VIII' will not give the output signal so that the inadvertent operation of the safeguarding device may be prevented. The minimum level detecting unit VIII' also functions to detect whether the intensity of the signal reflected by an object entering that part of the predetermined intensity range which is farthest from the vehicle is in excess of a predetermined level or not regardless of the reflection factor and shape or dimension of an object, and the bistatic radar system is employed so that the safeguarding device may be actuated at the optimum time regardless of the reflection factor and shape or dimensions of an object. In summary the minimum level detecting unit VIII' gives the output signal when an object enters the predetermined minimum intensity range regardless of the reflection factor and shape or dimension of the object.

The radar system employed in the present invention gives sometimes two different distances to an object from the same intensity ratio and the incorrect interpretation of the measurements that an object which is far from the vehicle and which reflects the signal with a strong intensity is erroneously taken as being at a relatively small distance from the vehicle. However, because of the arrangements of the transmitting and receiving antennas 4 and 6 and the function of the minimum level detecting unit VIII', the inadvertent operation of the safeguarding device may be prevented. The same effects and features of the present invention may be attained even when other radar systems such as AM or two-frequency radar systems are employed.

In the 11th embodiment the inadvertent operation of the safeguarding device is completely prevented by the provision of the predetermined distance range (by the collision state detecting unit III), by the measurement of the approaching or collision angle of an object, by the detection whether an object is closing or receding, and by the detection of the minimum level. Furthermore, the 11th embodiment detects the maximum Doppler signal level so that even an object which may collide against one side of a vehicle may be detected. Moreover the relative velocity of an object with respect to the vehicle is also measured so that a safeguarding device such as a gas bag may be actuated only when the relative velocity is in excess of a predetermined level. The 11th embodment further detects whether a vehicle is at rest or not so that the actuation of the safeguarding device just for fun may be prevented.

From the foregoing description, it is seen that the collision anticipating device in accordance with the present invention is simple in design, compact in size, very reliable and dependable in operation and inexpensive to manufacture, and is especially adapted for use with an automotive vehicle.

It is understood that various modificatins and variations of the logic circuits, the analog arithmetic operation system and the circuit arrangement in the above embodiments are possible based upon the principle of the present invention. In summary, according to the method and device for anticipating the collision in accordance with the present invention, the relative velocity of an object is measured at a distance as far away from a vehicle as possible and is stored; the arithmetic operation is carried out in response to the signals representative of the ever-changing distance to an object and the velocity thereof, thereby defining a special range "S" in front of the collision anticipating device; and the collision signal for actuating the safeguarding device will be given only when the collision is unavoidable and a driver will be seriously injured judging from the direction of an object in said range, the intensity of the signal reflected by the object in said range and so on. The collision anticipating device in accordance with the present invention has a fail-safe function because the collision signal is given by detecting the object entering the predetermined intensity range based upon the intensity of the signal reflected by an object in said predetermined distance range. Thus the present invention can completely overcome the problem of reliability of the prior art collision anticipating devices.

What is claimed is:

1. A vehicle collision anticipating method comprising establishing a predetermined distance range S in front of said vehicle, S representing a time, which is the ratio of the distance R of said object from said vehicle to the apparent velocity $v_r$ of said object as viewed from said vehicle, multiplied by the real relative velicity v which is the magnitude of the relative velocity vector of the object with respect to the vehicle ($vR/v_r$), transmitting a wave to an object,
receiving a wave reflected from said object,
generating a low frequency wave by mixing said transmitted and reflected waves, said low frequency wave containing a Doppler signal having first and second components of difference frequencies,
separating said components by frequency-responsive means,
obtaining the distance R from the ratio of the amplitude of said first component to that of said second component
determining the Doppler angular velocity from said low frequency wave,
determining from said Doppler angular velocity the apparent velocity $v_r$,
determining v from said Doppler signal components when R is sufficiently large so that $v_r$ and v are substantially equal, and
detecting the object entering said predetermined distance range in front of the vehicle by comparing S with a distance obtained as the object approaches said vehicle by taking a time which is the ratio of the determined R to the determined $v_r$ and multiplying said time by the determined v,
thereby anticipating a collision of the object against the vehicle.

2. A vehicle collision anticipating method comprising establishing a predetermined distance range S in front of said vehicle, S representing a time, which is the ratio of the distance R of said object from said vehicle to the apparent velocity $v_r$ of said object as viewed from said vehicle, multiplied by the real relative velocity v which is the magnitude of the relative velocity vector of the object with respect to the vehicle ($vR/v_r$), transmitting a wave to an object,
receiving a wave reflected from said object,
generating a low frequency wave by mixing said transmitted and reflected waves, said low frequency wave containing a Doppler signal having first and second components of different frequencies,
separating said components by frequency-responsive means,
obtaining the distance R from the ratio of the amplitude of said first component to that of said second component,
determining the Doppler angular velocity from said low frequency wave,
determining from said Doppler angular velocity the apparent velocity $v_r$,
determining from said Doppler signal the real relative velocity v, and
detecting the object entering said predetermined distance range in front of the vehicle by detecting a value representative of $vR/v_r$ using said determined v, R and $v_r$,
thereby anticipating a collision of the object against the vehicle.

3. The vehicle collision anticipating method of claim 2, wherein the real relative velocity v is the relative vector velocity equal to the sum of the velocity vector of the object and the negative of the velocity vector of the vehicle.

4. The vehicle collision anticipating method of claim 2, further comprising the step of activating a protective device when a collision of the object against the vehicle is anticipated.

5. A vehicle collision anticipating device comprising wave processing means for transmitting a wave by a transmitting antenna installed at a predetermined position on a vehicle, for receiving a reflected wave from the object by a receiving antenna installed at a predetermined position on a vehicle, and for generating a low frequency wave by mixing said transmitted and reflected, waves said low frequency wave containing a Doppler signal having first and second components of different frequencies, frequency-responsive means for separating said Doppler signal components,
means for determining the distance R of said object from said vehicle from the ratio of the amplitude of said first component to said second component,
means for determining the Doppler angular velocity of said low frequency wave,
means for determining from said Doppler angular velocity the apparent velocity $v_r$ of said object with respect to said vehicle,
means for substantially determining from said Doppler signal components the real relative velocity v of the object at a predetermined distance from the vehicle, said real relative velocity being taken as said apparent velocity at said predetermined distance, said real relative velocity being the magnitude of the relative velocity vector of the object with respect to the vehicle, and
collision state decision means including means for setting a predetermined distance range S in front of said vehicle, said range S being represented by the expression $vR/v_r$, where $R/v_r$ has the dimension of time, and means for determining when said object is entering said predetermined distance range S in front of said vehicle from the expression $vR/v_r$, using the determined values v, R and $v_4$,
thereby anticipating a collision of the object against the vehicle.

6. A vehicle collision anticipating method comprising establishing a predetermined distance range S in front of said vehicle, S representing a time, which is the ratio of the distance R of said object from said vehicle to the apparent velocity $v_r$ of said object as viewed from said vehicle, multiplied by the real relative velocity v which is the magnitude of the relative velocity vector of the object with respect to the vehicle ($vR/v_r$), transmitting a wave to an object,
receiving a wave reflected from said object,
generating a low frequency wave by mixing said transmitted and reflected waves, said low frequency wave containing a Doppler signal having first and second components of different frequencies,
separating said components by frequency-responsive means,
obtaining the distance R from the ratio of the amplitude of said first component to that of said second component, determining the Doppler angular velocity from said low frequency wave, determining from said Doppler angular velocity the apparent velocity $v_r$, determining the real relative velocity v of said object with respect to said vehicle from said Doppler signal at a distance where $v_r$ is substantially independent of the approach angle between said object and said vehicle, detecting the object entering said predetermined distance range in front of the vehicle from substantially the expression $vR/v_r$, using said determined v, R and $v_r$, thereby anticipating a collision of the object against the vehicle.

7. A vehicle collision anticipating method comprising establishing a predetermined distance range S in front of said vehicle, S representing a time, which is the ratio of the distance R of said object from said vehicle to the apparent velocity $v_r$ of said object as viewed from said vehicle, multiplied by the real relative velocity v which is the magnitude of the relative velocity vector of the object with respect to the vehicle ($vR/v_r$), transmitting a wave to an object, receiving a wave reflected from said object, generating a low frequency wave by mixing said transmitted and reflected waves, said low frequency wave containing a Doppler signal having first and second components of different frequencies, separating said components by frequency-responsive means, obtaining the instantaneous distance R from said vehicle from the ratio of the amplitude of said first component to that of said second component, determining the Doppler angular velocity from said low frequency wave, determining from said Doppler angular velocity an apparent velocity $v_r$ between said object and said vehicle at each said distance R, determining from said Doppler angular velocity the real velocity v of the object with respect to the vehicle at a predetermined distance from the vehicle at which the apparent velocity $v_r$ is substantially independent of the approach angle between said object and said vehicle by setting v as the apparent velocity $v_r$ substantially at said predetermined distance, and detecting the object entering said predetermined distance range in front of the vehicle by continuously comparing S with a distance obtained as the object approaches the vehicle by taking a series of times which are each the ratios of the determined instantaneous R to the determined instantaneous $v_r$, and multiplying each such time by the determined set v, thereby anticipating a collision of the object against the vehicle.

8. A vehicle collision anticipating device comprising wave processing means for transmitting a wave by a transmitting antenna installed at a predetermined position on a vehicle, for receiving a reflected wave from the object by a receiving antenna installed at a predetermined position on the vehicle, and for generating a low frequency wave by mixing said transmitted and reflected waves, said low frequency wave containing a Doppler signal having first and second components of different frequencies, frequency-responsive means for separating said Doppler signal components, means for determining the instantaneous distance R of said object from said vehicle from the ratio of the amplitude of said first component to that of said second component, means for determining the Doppler angular velocity of said low frequency waves, means for determining from said Doppler angular velocity the instantaneous apparent velocity $v_r$ of said object with respect to said vehicle, means for substantially determining from said Doppler signal a real relative velocity v, which is the magnitude of the relative velocity vector of the object with respect to the vehicle, by setting v at a value of $v_r$ selected to be substantially independent of the approach angle between said object and said vehicle, and collision state decision means including means for setting a predetermined distance range S in front of the vehicle represented by the expression $vR/v_r$, where said distance range S is dependent on the approach angle between said object and said vehicle and is independent of the determined values of v and $v_r$, and means for detecting the object entering said predetermined distance range in front of said vehicle by detecting values representative of $vR/v_r$ using said determined v, R and $v_r$.

9. A vehicle collision anticipation method comprising establishing a predetermined distance range S in front of said vehicle, S representing a time, which is the ratio of the distance R of said object from said vehicle to the apparent velocity $v_r$ of said object as viewed from said vehicle, multiplied by the real relative velocity v which is the magnitude of the relative velocity vector along the absolute direction of movement of said object between said object and the line normal to the absolute direction of movement of said object which passes through said vehicle ($vR/v_r$), whereby S is dependent on the approach angle of said object to said vehicle and independent of the real relative velocity therebetween, transmitting a wave to an object, receiving a wave reflected from said object, generating a low frequency wave by mixing said transmitted and reflected wave, said low frequency wave containing a Doppler signal having first and second components of different frequencies, separating said components by frequency-responsive means, obtaining the instantaneous distance R from the ratio of the amplitude of said first component to that of said second component, determining the Doppler angular velocity from said low frequency wave, determining from said Doppler angular velocity the instantaneous apparent velocity $v_r$, determining v from said Doppler signal, and detecting an object entering said predetermined distance range S in front of said vehicle by detecting values representative of $vR/v_r$ using said determined v, R and $v_r$, thereby anticipating a collision of the object against the vehicle.

10. A vehicle collision anticipating device comprising wave processing means for transmitting a wave by a transmitting antenna installed at a predetermined position on a vehicle, for receiving a reflected wave from the object by a receiving antenna installed at a predetermined position on the vehicle, and for generating a low frequency wave by mixing said transmitted and reflected waves, said low frequency wave containing a Doppler signal having first and second components of different frequencies, frequency-responsive means for separating said Doppler signal components, means for determining the instantaneous distance R of said object from said vehicle from the ratio of the amplitude of said first component to that of said second component, means for determining the Doppler angular velocity of said low frequency wave, means for determining from said Doppler angular velocity an instantaneous apparent velocity $v_r$ of said object with respect to said vehicle, means for dividing each said determined R by a corresponding determined $v_r$, means for determining a real relative velocity v which is the magnitude of a relative velocity vector along the absolute direction of movement of the object between the object and the line normal to the absolute direction of movement of the object which passes through the vehicle, means for multiplying each result of said division by said determined v, and collision state decision means including means for establishing a predetermined distance range S representing the expression $vR/v_r$, S being dependent on the approach angle between said object and said vehicle and independent of relative velocity therebetween, and means for detecting the object entering said predetermined range S from a series of results from said multiplication.

11. A vehicle collision anticipating method comprising establishing a predetermined distance range S in front of said vehicle at each of first and second spaced points thereon, S representing a time, which is the ratio of the distance R of said object from said vehicle at said point to the apparent velocity $v_r$ of said object as viewed from said vehicle at said point, multiplied by the real relative velocity v which is the magnitude of the relative velocity vector of the object with respect to said vehicle ($vR/v_r$), transmitting first and second waves from said spaced points respectively to an object, receiving first and second waves reflected from said object at said first and second points respectively, generating first and second low frequency waves by mixing said transmitted and reflected first waves and mixing said transmitted and reflected second waves respectively, said first and second low frequency waves each containing a Doppler signal having first and second components of different frequencies, separating said components by frequency responsive means, obtaining the distance R from the ratio of the amplitude of the first component of each Doppler signal to that of the second component thereof, determining first and second Doppler angular velocities from said first and second low frequency waves, determining from said first and second Doppler angular velocities the respective first and second apparent velocities $v_r$, determining from said Doppler signals the real relative velocity v, and detecting the object entering each of said predetermined distance ranges in front of the vehicle by detecting a value for each predetermined distance range representative of $vR/v_r$ using said determined v, R and $v_r$ associated with each, thereby anticipating a collision of the object against the vehicle.

12. A vehicle collision anticipating method comprising establishing a predetermined distance range S in front of said vehicle, S representing a distance from a location on said vehicle represented by the relationship $R'/\cos \theta' = C_2$, where $C_2$ is a constant, $R'$ is the distance from said location on said vehicle to the periphery of said predetermined distance range at each point on said periphery, and $\theta'$ is the approach angle of the object relative to the vehicle at each point of said periphery corresponding to $R'$, transmitting a wave to an object, receiving a wave reflected from said object, generating a low frequency wave by mixing said transmitted and reflected waves, said low frequency waves containing a Doppler signal, determining the instantaneous distance R between said location on the vehicle and said object from said Doppler signal, determining a value substantially representation of the instantaneous $\cos \theta$ where $\theta$ is the actual approach angle of the object relative to the vehicle, and detecting the object entering said predetermined distance range in front of the vehicle by detecting a value representative of $R/\cos \theta$ using said determined R and $\cos \theta$, thereby anticipating a collision of the object against the vehicle.

13. A vehicle collision anticipating device comprising wave processing means for transmitting a wave by a transmitting antenna installed at a predetermined position on a vehicle, for receiving a reflected wave from the object by a receiving antenna installed at a predetermined position on the vehicle, and for generating a low frequency wave by mixing said transmitting and reflected waves, said low frequency wave containing a Doppler signal, means for determining the instantaneous distance R of said object from said vehicle from said Doppler signal, means for determining a value substantially representative of $\cos \theta$, where $\theta$ is the instantaneous approach angle of the object relative to the vehicle, and collision state decision means including means for setting a predetermined distance range S in front of said vehicle, range S being represented by the expression $C_2 = R'/\cos \theta'$, where $C_2$ is a constant, $R'$ is the distance from said receiving antenna on said vehicle to each point on the periphery of said predetermined distance range and $\theta'$ is the approach angle of the object relative to the vehicle at each point on the periphery of the predetermined distance range corresponding to $R'$, and means for determining when said object is entering said predetermined distance range S in front of said vehicle from the expression $R/\cos\theta$ using the instantaneous determined values of R and $\cos\theta$, thereby anticipating a collision of the object against the vehicle.

14. A vehicle collision anticipating device comprising wave processing means for transmitting a wave by a transmitting antenna installed at a predetermined position on a vehicle, for receiving a reflected wave from the object by a receiving antenna installed at a predetermined position on a vehicle, and for generating a low frequency wave by mixing said transmitted and reflected waves, said low frequency wave containing a Doppler signal having first and second components of different frequencies, frequency-responsive means for separating said Doppler signal components, means for determining the instantaneous distance R of said object from said vehicle from the ratio of the amplitude of said first component to that of said second component, means for determining the Doppler angular velocity of said low frequency wave, means for determining from said Doppler angular velocity the instantaneous apparent velocity $v_r$ of said object with respect to said vehicle which is the relative velocity along the direct line between the object and vehicle, means for substantially determining the real relative velocity v of the object relative to said vehicle, which is the magnitude of the relative velocity vector of the object with respect to the vehicle by setting v substantially at the value of $v_r$ at a predetermined distance from said vehicle at which said apparent velocity $v_r$ is substantially independent of the approach angle between said object and said vehicle, and collision state decision means including means for setting a predetermined distance range S in front of said vehicle represented by the expression $vR/v_r$, and means for continuously dividing the instantaneous determined R by the corresponding instantaneous determined $v_r$ and multiplying each result by the set determined v to detect said object entering said predetermined distance range S, thereby anticipating a collision of the object against the vehicle.

15. The vehicle collision anticipating device of claim 14 wherein said wave processing means comprises an osciallator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means.

16. The vehicle collision anticipating device of claim 14 further comprising an amplifier connected to receive said low frequency wave, a first bandpass filter and a high pass filter connected to the output of said amplifier, a source of oscillations, a mixer connected to said source of oscillation and said high pass filter, a second bandpass filter connected to the output of said mixer, and first and second AC-DC converters connected to the outputs of said first and second bandpass filters respectively.

17. The vehicle collision anticipating device of claim 16 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, wherein said signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal components are derivable from the outputs of said first and second bandpass filters respectively, and first and second analog signals are derivable from the outputs of said first and second AC-DC converters respectively, and wherein said collision state decision means comprises a first divider connected to receive said first and second analog signals, a first frequency to voltage converter connected to receive one of said Doppler signals, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signals, a monostable multivibrator coupled to the output of said first comparator, a sample and hold circuit having an input terminal coupled to the output of said second frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce an output signal.

18. The vehicle collision anticipating device of claim 14, wherein said predetermined distance is at least two times the width of said vehicle.

19. A vehicle collision anticipating device comprising wave processing means for transmitting a wave by a transmitting antenna installed at a predetermined position on a vehicle, for receiving a reflected wave from the object by a receiving antenna installed at a predetermined position on a vehicle, and for generating a low frquency wave by mixing said transmitted and reflected waves, analog signal processing means for signal processing said low frequency to provide first and second Doppler signal components and first and second analog signals corresponding respectively, to said first and second Doppler signal components, and collision state decision means for setting a predetermined distance range S in front of the vehicle by processing said signals, said predetermined distance range being represented by the relation $vR/v_r$, where v is the magnitude of the relative velocity vector of the object with respect to the vehicle denoted the real relative velocity, R is the distance between the vehicle and object and $v_r$ is the apparent velocity, of the object relative to the vehicle as seen from the vehicle, for determining the instantaneous distance R from the ratio of said first and second analog signals, for determining the Doppler angular velocity of said Doppler signal components and the instantaneous apparent velocity $v_r$ therefrom, for setting v as the value of $v_r$ at a predetermined distance of said object from said vehicle, and for detecting the object entering said predetermined distance range in front of the vehicle substantially from the expression $vR/v_r$ using the determined values of R and $v_r$ and the set value of v to produce an output signal in response to such entering, thereby anticipating a collision of the object against the vehicle.

20. The vehicle collision anticipating device of claim 19 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means.

21. The vehicle collision anticipating device of claim 19 wherein said analog signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second bandpass filter connected to the output of said mixer, and first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively.

22. The vehicle collision anticipating device of claim 21 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, wherein said signal processing means comprises an amplifier connected to receive said low frequency signal, a first bandpass filter and a high pass filter coupled tp the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal components are derivable from the outputs of said first and second bandpass filters respectively, and first and second analog signals are derivable from the outputs of said first and second AC-DC converters respectively, and wherein said collision state decision means comprises a first divider, connected to receive said first and second analog signal components, a first frequency to voltage converter connected to receive one of said Doppler signal components, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signal components, a monostable multivibrator coupled to the output of said first comparator, a sample and hold circuit having an input terminal coupled to the output of said second frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce an output signal.

23. The vehicle collision anticipating device of claim 19, wherein said collision state decision means comprises a first divider connected to receive said first and second analog signals, a first frequency to voltage converter connected to receive one of said Doppler signal components, a second divider connected to receive the outputs of said first divider and first frequency to voltage converter, first and second sources of adjustable reference voltages, first comparator means connected to compare the output of said first divider with said first reference voltage, a second frequency to voltage converter connected to receive one of said Doppler signal components, a monostable multivibrator coupled to the output of said first comparator, a sample and hold circuit having an input terminal coupled to the output of said second frequency to voltage converter and a control terminal coupled to the output of said monostable multivibrator, a multiplier circuit connected to receive the outputs of said second divider and said sample and hold circuit, and a comparator coupled to compare the output of said multiplier with said second reference potential to produce an output signal.

24. The vehicle collision anticipating device of claim 23 wherein said wave processing means comprises an oscillator, a frequency modulator for modulating the output of said oscillator, transmitting and receiving antennas, an isolator connected to said transmitting antenna, mixing means, and coupling means connected to couple said frquency modulator to said isolator, to couple said receiving antenna to said mixing means, and to couple a portion of the output of said frequency modulator to said mixing means, whereby said low frequency wave is derived at the output of said mixing means, and wherein said signal processing means comprises an amplifier connected to receive said low frequency wave, a first bandpass filter and a high pass filter connected to the output of said amplifier, a source of oscillations, a mixer connected to said source of oscillations and said high pass filter, a second bandpass filter connected to the output of said mixer, and first and second AC-DC converters connected to the output of said first and second bandpass filters respectively.

25. The vehicle collision anticipating device of claim 19, wherein said collision state decision means comprises a low pass filter coupled to receive one of said Doppler signal components, an AC-DC converter coupled to the output of said low pass filter, comparing means connected to compare the ratio of said first and second analog signals with a reference voltage, multiplier means coupled to multiply one of said output signals with a voltage inversely proportional to the velocity of a detected object at a determined distance from said device upon detection of a comparison in said first comparator, and a second comparator coupled to compare the output of said AC-DC converter with the output of said multiplier means to produce an output voltage.

26. The vehicle collision anticipating device of claim 25 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, and wherein said analog signal processing means comprises an amplifier connected to receive said low frequency signal, a first band pass filter and a high pass filter coupled to the output of said amplifier, a source of oscillations, a mixer connected to receive the output of said source of oscillations and said high pass filter, a second bandpass filter connected to the output of said mixer, and first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively.

27. The vehicle collision anticipating device of claim 19 wherein said collision state decision means comprises a high pass filter coupled to receive one of said Doppler signal component, an AC-DC converter connected to the output of said high pass filter, a first comparator for comparing the ratio of said first and second analog signals with a reference potential, multiplier means connected to multiply the output of said AC-DC converter with a voltage inversely proportional to the velocity of an object at a determined distance from said device when a comparison is detected in said first comparator, and a second comparator connected to compare the output of said multiplier means with one of said analog signals to produce an output voltage.

28. The vehicle collision anticipating device of claim 27 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, and wherein said analog signal processing means comprises an amplifier connected to receive said low frequency signal, a first band pass filter and a high pass filter coupled to the output of said amplifier, a source of oscillations, a mixer connected to receive the output of said source of oscillations and said high pass filter, a second bandpass filter connected to the output of said mixer, and first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively.

29. The vehicle collision anticipating device of claim 19 in which said analog signal processing means further comprises means providing a third analog signal component corresponding to said first Doppler signal, and wherein said collision state decision means comprises a first multiplier connected to multiply said first analog voltage with a voltage proportinal to the inverse of the velocity of an object at a determined distance from said device, first, second and third coefficient multiplying means connected to receive the output of said multiplier, and said third and second analog signals respectively, adding means coupled to add the output of said first and second coefficient multiplying means, and a comparator connected to compare the output of said adding means with the output of said third coefficient multiplier means to produce an output signal.

30. The vehicle collision anticipating device of claim 29 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, and wherein said analog signal processing means comprises an amplifier connected to receive said low frequency signal, a first band pass filter and a high pass filter coupled to the output of said amplifier, a source of oscillations, a mixer connected to receive the output of said source of oscillation and said high pass filter, a first low pass filter coupled to the output of said mixer, a second low pass filter coupled to the output of said first bandpass filter, and first, second and third AC-DC converters connected respectively to the output of said first band pass filter, said second low pass filter and said first low pass filter, whereby said first and second Doppler signal components are derivable from the outputs of said first band pass filter and first low pass filter respectively, said first and second analog signals are derivable from the outputs of said first and third AC-DC converters respectively, and said third analog signal is derivable from the output of said second AC-DC converter.

31. The vehicle collision anticipating device of claim 29 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, and wherein said analog signal processing means comprises an amplifier connected to receive said low frequency signal, a first band pass filter and a first high pass filter coupled to the output of said amplifier, a source of oscillations, a mixer connected to receive the output of said source of oscillations and said first high pass filter, a second high pass filter coupled to the output of said first bandpass filter, a second bandpass filter coupled to the output of said mixer, and first, second and third AC-DC converters coupled respectively to the output of said second high pass filter, said first bandpass filter and said second bandpass filter, whereby said first and second Doppler signal components are derivable from the outputs of said second high pass filter and said second bandpass filter, said first and second analog signals are derivable from the outputs of said first and third AC-DC converters respectively, and said third analog signal is derivable from the output of said second AC-DC converter.

32. The vehicle collision anticipating device of claim 19 further comprising a direction detecting means for detecting the direction of relative movement of the object with respect to the vehicle and for generating a signal when the object approaches the vehicle, and decision means for generating a signal when said, collision state decision means and direction detecting means simultaneously produce output signals, said direction detecting means comprising a D-type flip-flop, means applying said first and second Doppler signal components to the clock and D-input terminals of said flip-flop respectively, an integrator circuit connected to the output of said flip-flop, a comparator havinhg a first input connected to the output of said integrator, and a reference voltage source connected to the other input terminal of said comparator, said decision unit comprising an AND circuit having a first input connected to the output of said collision state decision means and a second input connected to the output of said comparator.

33. The vehicle collision anticipating device of claim 32 wherein said wave processing means comprises an oscillator, a frequency modulator for modulating the output of said oscillator, transmitting and receiving antennas, an isolator connected to said transmitting antenna, mixing means, and coupling means connected to couple said freqeuncy modulator to said isolator, to couple said receiving antenna to said mixing means, and to couple a portion of the output of said frequency modulator to said mixing means, whereby said low frequency wave is derived at the output of said mixing means, wherein said analog signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively, and wherein said collision state decision means comprises a first divider connected to receive said first and second analog signals, a first frequency to voltage converter connected to receive one of said Doppler signals, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signals, a monostable multivibrator coupled to the output of said first comparator, a sample and hold circuit having an input terminal coupled to the output of said second frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce an output signal.

34. A vehicle collision anticipating device comprising wave processing means for transmitting a wave by a transmitting antenna installed at a predetermined position on a vehicle, for receiving a reflected wave from the object by a receiving antenna installed at a predetermined position on the vehicle, and for generating a low frequency wave by mixing said transmitted and reflected waves, said low frequency wave containing a Doppler signal having first and second components of different frequencies, signal processing means including frequency-responsive means for separating said Doppler signal components, means for determining the distance R of said object from said vehicle from the ratio of the amplitude of said first component to that of said second component, means for determining the Doppler angular velocity of said low frequency wave, means for determining from said Doppler angular velocity the apparent velocity $v_r$ of said object with respect to said vehicle, and means for substantially determining from said Doppler signal the magnitude v of the real relative velocity of said object with respect to said vehicle which is the magnitude of the relative velocity vector of the object with respect to the vehicle, and collision state decision means including means for setting a predetermined distance range S in front of said vehicle, range S being represented by the expression $vR/v_r$, where $R/v_r$ has the dimension of time, and means for determining when said object is entering said predetermined distance range S in front of said vehicle from the expression $vR/v_r$ using the determined values of v, R and $v_r$ and for producing a signal respresentative of such entering, thereby anticipating a collision of the object against the vehicle.

35. A vehicle collision anticipating device as set forth in claim 34, further comprising direction detecting means for detecting a direction of a relative movement of the object with respect to the vehicle, and for generating a signal when the object approaches the vehicle, and decision means for generating a signal when said collision state decision means and direction detecting means simultaneously generate their respective signals.

36. A vehicle collision anticipating device as set forth in claim 34, further comprising minimum level detecting means for detecting an intensity of a Doppler signal obtained from said low frequency wave so as to detect the object entering a predetermined minimum intensity range determined by positions and angles of the transmitting and receiving antennas installed on the vehicle, and for generating a signal when said intensity reaches a predetermined minimum level, and decision means for generating a signal when said collision state decision means and minimum level detecting means simultaneously generate their respective signals.

37. The vehicle collision anticipating device of claim 34, wherein the real relative velocity v is the relative vector velocity equal to the sum of the velocity vector of the object and the negative of the velocity vector of the vehicle.

38. The vehicle collision anticipating device of claim 34, further comprising a protective device activatable by a signal from said collision state decision means when a collision of the object against the vehicle is anticipated.

39. The vehicle collision anticipating device of claim 34, wherein said means for determining v is a means for measuring $v_r$ at a distance between said object and said vehicle great enough so that v is essentially equal to $v_r$.

40. The vehicle collision anticipating device of claim 34, wherein said means for determining v includes means for establishing a predetermined Doppler signal intensity value, and
means for storing the maximum value of said Doppler signal intensity commensing when said Doppler intensity reaches said predetermined intensity value, the maximum stored value of $v_r$ being taken as v.

41. A vehicle collision anticipating device as set forth in claim 34, further comprising
relative velocity detecting means for generating a signal when said apparent velocity of the object reaches a predetermined level, and
decision means for generating a signal when said collision state decision means and relative velocity detecting means simultaneously generate their respective signals.

42. A vehicle collision forecasting device as set forth in claim 41, wherein
said relative velocity detecting means comprises
a frequency-voltage converter,
a potentiometer for setting a reference voltage to determine said predetermined apparent velocity level, and
a comparator, and
said decision means comprises
an AND circuit for generating a signal when said collision state decision means and said relative velocity detecting means simultaneously generate each signal.

43. A vehicle collision anticipating device as set forth in claim 34, further comprising
means for determining the ground speed V of said vehicle,
means for determining the intensity of said Doppler signal,
protecting means for detecting a relative characteristic of vehicle and object selected from the group including the apparent velocity of the vehicle relative to the object, the position of the vehicle relative to the object and the intensity of a Doppler signal, weighting said selected characteristic by said ground speed V and generating a signal when said weighted characteristic reaches a predetermined value, and
decision means for generating a signal when said collision state decision means and protecting means simultaneously generate their respective signals.

44. The vehicle collision anticipating device of claim 43 wherein said protecting means comprises a relative velocity detecting unit and a ground speed detecting unit, said relative velocity detecting unit comprising a first voltage to frequency converter, and said ground speed detecting unit comprising an electromagnetic pickup for producing a signal corresponding to the ground speed of said device, a second frequency to voltage converter coupled to said electromagnetic pickup, first and second reference voltage sources, first and second voltage generators for producing voltages of different amplitude, a first comparator for comparing the output of said second frequency to voltage converter with said first reference voltage, a NOT circuit, first and second gate circuits having input terminals coupled to receive the outputs of said first and second voltage generators respectively, and control terminals coupled to said first comparator and said NOT circuit respectively, a multiplier having a first input terminal coupled to said first frequency to voltage converter and a second input terminal coupled to the outputs of said first and second gate circuits, and a second comparator coupled to compare the outputs of said multiplier and said second reference voltage source, and said decision means comprising an AND circuit coupled to said collision state decision means and said second comparator for providing an output when each of said collision state decision means and second comparator generates an output signal.

45. The vehicle collision anticipating device of claim 44 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, wherein said analog signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively, and wherein said collision state decision means comprises a first divider connected to receive said first and second analog signals, a first frequency to voltage converter connected to receive one of said Doppler signal components, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signal components, a monostable multivibrator coupled to the output of said first comparator, a sample and hold circuit having an input terminal coupled to the output of said second frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce an output signal.

46. A vehicle collision anticipating device as set forth in claim 34, wherein
said wave processing means comprises at least two wave processing units each of which comprises at least one transmitting antenna installed on the vehicle in transversely spaced apart relation from the other transmitting antenna for transmitting a wave to the object, and at least one receiving antenna installed on the vehicle in transversely spaced apart relation from the other receiving antenna for receiving a reflected wave from the object,
said signal processing means comprising at least two signal processing units for signal processing the low frequency wave from each wave processing unit and the Doppler signal contained in said low frequency wave,
said collision state decision means comprising at least two collision state decision units each connected to a signal processing unit and setting a predetermined distance range S in front of the vehicle and determining when said object is entering the associated predetermined distance range to generate a signal, and further comprising
decision means for generating a signal when said at least two collision state decision units simultaneously generate their respective signals,
thereby anticipating a collision of the object against the vehicle.

47. A vehicle collision anticipating device as set forth in claim 46, further comprising
maximum level detecting means comprising at least two maximum level detecting units, one associated with each wave processing unit designated respectively as the right and left unit, for detecting an intensity of a Doppler signal obtained from said low frequency wave so as to detect the object entering right and left predetermined maximum intensity ranges determined by positions and angles of the right and left transmitting and receiving antennas installed on the vehicle, and for generating a signal when said intensity reaches a predetermined maximum level, and wherein
said decision means generates a signal when said at least two collision state decision units or one of said maximum level detecting units generates a signal.

48. A vehicle collision anticipating device as set forth in claim 47, wherein
each of said maximum level detecting units comprises a comparator and a reference voltage source set to a voltage corresponding to said predetermined maximum intensity level, and
said decision means comprises an OR circuit for generating a signal when said at least two collision state decision units or one of said maximum level detecting units generates a signal.

49. A vehicle collision anticipating device as set forth in claim 46, further comprising
approaching angle detecting means for detecting an approaching angle of the object with respect to the vehicle, and for generating a signal when said approaching angle of the object reaches a predetermined angle, and wherein
said decision means generates a signal when said at least two collision state decision units and approaching angle detecting means simultaneously generate their respective signals.

50. The vehicle collision anticipating device of claim 49 wherein said approaching angle detecting means comprises first and second counters, means applying a Doppler signal component from each said signal processing unit to one of said counters, first and second RS flip-flops connected to the outputs of said first and second counters respectively, an OR circuit having separate inputs connected to the outputs of said first and second counters, an AND circuit having first and second inputs connected to the outputs of said first and second flip-flops respectively, a delay circuit having an input connected to the output of said OR circuit and an output connected to reset said first and second counters, and a D-type flip-flop having a D terminal connected to the output of said AND circuit and a clock terminal connected to the output of said OR circuit, and wherein said decision means comprises means for generating an output signal when said two collision state decision means and said D-type flip-flop simultaneously generate output signals.

51. The vehicle collision anticipating device of claim 50 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, wherein said signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal component are derivable from the outputs of said first and second bandpass filters respectively, and first and second analog signals are derivable from the outputs of said first and second AC-DC converters respectively, and wherein said collision state decision means comprises a first divider connected to receive said first and second analog signals, a first frequency to voltage converter connected to receive one of said Doppler signal components, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signal components, a monostable multivibrator coupled to the output of said first comparator, a sample and hold circuit having an input terminal coupled to the output of said frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce and output signal.

52. A vehicle collision anticipating device as set forth in claim 46, further comprising maximum level detecting means comprising at least two maximum level detecting units one associated with each wave processing unit designated respectively as right and left units for detecting an intensity of a Doppler signal obtained from said low frequency wave so as to detect the object entering right and left predetermined maximum intensity ranges determined by positions and angles of the right and left transmitting and receiving antennas installed on the vehicle, and for generating a signal when said intensity reaches a predetermined maximum level, approaching angle detecting means for detecting an approaching angle of the object with respect to the vehicle, and for generating a signal when said approaching angle of the object reaches a predetermined angle, protecting means including means for detecting a signal representative of the ground speed V of the vehicle and means for detecting a relative characteristic of the vehicle and object selected from the group including the apparent velocity of the vehicle relative to the object, the position of the vehicle relative to the object and the intensity of a Doppler signal, weighting said selected characteristic by said ground speed V and generating a signal when said weighted signal reaches a predetermined value, direction detecting means for detecting a direction of a relative movement of the object with respect to the vehicle, and for generating a signal when the object approaches the vehicle, minimum level detecting means for detecting an intensity of a Doppler signal obtained from said low frequency wave so as to detect the object entering a predetermined minimum intensity range determined by positions and angles of the transmitting and receiving antennas installed on the vehicle, and for generating a signal when said intensity reaches a predetermined minimum level, and wherein said decision means generates a signal when said at least two collision state decision units or one of said maximum level detecting units generates a signal, and said approaching angle detecting means, protecting means, direction detecting means, and minimum level detecting means simultaneously generate their respective signals.

53. A vehicle collision anticipating device as set forth in claim 52, further comprising relative velocity detecting means for generating a signal when said apparent velocity of the object reaches a predetermined level, and wherein said decision means generates a signal when said at least two collision state decision units or one of said maximum level detecting units generates a signal, and said approaching angle detecting means, protecting means, direction detecting means, minimum level detecting means and relative velocity detecting means simultaneously generate their respective signals.

54. The vehicle collision anticipating device of claim 52 wherein each of said maximum level detecting units comprises a reference voltage source set to a voltage corresponding to said predetermined maximum intensity level, and comparator means connected to compare the output of said reference voltage source with said Doppler signal obtained from said low frequency wave.

55. The vehicle collision anticipating device of claim 54 wherein said approaching angle detecting means comprises first and second counters each connected to receive a separate Doppler signal component from one of said signal processing units, first and second RS flip-flops connected to the outputs of said first and second counters respectively, an OR circuit having first and second inputs connected to the outputs of said first and second counters respectively, an AND circuit having first and second inputs connected to the outputs of said first and second flip-flops respectively, delay means connected to reset said first and second counters from the output of said OR circuit, and a D-type flip-flop having a D terminal connected to the output of said AND circuit and a clock terminal connected to the output of said OR circuit.

56. The vehicle collision anticipating device of claim 55 wherein said protecting means comprises a relative velocity detecting unit and a ground speed detecting unit, said relative velocity detecting unit comprising a first voltage to frequency converter, and said ground speed detecting unit comprising an electromagnetic pickup for producing a signal corresponding to the ground speed of said device, a second frequency to voltage converter coupled to said electromagnetic pickup, first and second reference voltage sources, first and second voltage generators for producing voltages of different amplitude, a first comparator for comparing the output of said second frequency voltage converter with said first reference voltage, a NOT circuit, first and second gate circuits having input terminals coupled to receive the outputs of said first and second voltage generators respectively, and control terminals coupled to said first comparator and said NOT circuit respectively, a multiplier having a first input terminal coupled to said first frequency to voltage converter and a second input terminal coupled to the outputs of said first and second gate circuits, and a second comparator coupled to compare the outputs of said multiplier and said second reference voltage source, said direction detecting means comprising a D-type flip-flop having a D input terminal connected to receive one of said Doppler signal components of a signal processing unit and a clock input connected to receive the other of said Doppler signal components of said signal processing unit, an integrator connected to the output of said D-type flip-flop, a source of reference voltage and a comparator connected to compare the output of said integrator with the output of said last mentioned reference voltage source, wherein said minimum level detecting means comprises a reference voltage source set to such a voltage that the farthest point of the predetermined minimum intensity range is at least 2 meters from the vehicle, and a comparator connected to compare the output of said last mentioned reference voltage source with a corresponding Doppler signal.

57. The vehicle collision anticipating device of claim 56 wherein said two wave processing units, two signal processing units and two collision state decision circuits correspond to two channels, and wherein said decision means comprises a first OR circuit having inputs connected to the outputs of the comparators of the maximum level detecting units of each channel, a second OR circuit connected to the outputs of the comparators of the minimum level detecting means of each of said channels, a first AND circuit having separate inputs connected to the outputs of the collision state decision units of each of said channels, said signal processing units further comprising means for providing first and second analog signals corresponding to said first and second Doppler signals respectively, and means for comparing the first and second analog signals, said decision means further comprising third OR gate means connected to said last mentioned comparator means of each channel, a second ANd gate having separate inputs connected to the outputs of said first AND gate and said second OR gate, a third AND gate having separate inputs connected to the outputs of said first and third OR gates, a fourth OR gate connected to the outputs of said second and third AND gates, and a fourth AND gate for producing an output signal and having an input connected to the output of said fourth OR gate.

58. The vehicle collision anticipating device of claim 46 wherein said wave processing means comprises an oscillator, a frequency modulator for modulating the output of said oscillator, transmitting and receiving antennas, an isolator connected to said transmitting antenna, mixing means, and coupling means connected to couple said frequency modulator to said isolator, to couple said receiving antenna to said mixing means, and to couple a portion of the output of said frequency modulator to said mixing means, whereby said low frequency wave is derived at the output of said mixing means, wherein said signal processing means comprises an amplifier connected to receive said low frequency signal, a first bandpass filter and a high pass filter coupled to the output of said amplifier, a source of oscillations, a mixer connected to receive the output of said source of oscillation and said high pass filter, a second high pass filter connected to the output of said mixer, a first and second AC-DC converters coupled to the outputs of said first and second bandpass filters, whereby said first and second Doppler signal components are derivable from the outputs of said first and second bandpass filters respectively, and said first and second analog signals are derivable from the outputs of said first and second AC-DC converters respectively, and wherein said collision state decision means comprises a first divider connected to receive said first and second analog signals, a first frequency to voltage converter connected to receive one of said Doppler signals, a second divider connected to receive the outputs of said first divider and first voltage to frequency converter, first and second sources of adjustable reference voltages, first comparator means connected to compare the output of said first divider with said first reference voltage, a second frequency to voltage converter connected to receive one of said Doppler signals, a monostable multivibrator coupled to the output of said first comparator, a sample and hold circuit having an input terminal coupled to the output of said second frequency to voltage converter, and a control terminal coupled to the output of said monostable multivibrator, a multiplier circuit connected to receive the outputs of said second divider and said sample and hold circuit, and a comparator coupled to compare the outputs of said multiplier with said second reference potential to produce an output signal, said two transmitting and receiving antennas are inclined inwardly in the longitudinal direction of the vehicle as a toe-in on the front wheels of a vehicle so that a radiation signal of the wave beams may be limited within 10°–30°, said two antennas are spaced apart from each other by a predetermined distance of the order of 50–140 cm.

59. A vehicle collision anticipating device as set forth in claim 36, wherein
said minimum level detecting means comprises a comparator and a reference voltage source set to such a voltage that the farthest point of the predetermined minimum intensity range is at least 2 meters from the vehicle, and
said decision means comprises an AND circuit for generating a signal when said collision state decision means and said minimum level detecting means simultaneously generate each signal.

60. The vehicle collision anticipating method of claim 7, wherein said predetermined distance from said vehicle is at least two times the width of said vehicle.

* * * * *